US008692815B2

(12) United States Patent
Deslippe et al.

(10) Patent No.: US 8,692,815 B2
(45) Date of Patent: Apr. 8, 2014

(54) TOUCH-BASED USER INTERFACE USER SELECTION ACCURACY ENHANCEMENT

(75) Inventors: Mark H. Deslippe, Marlborough, MA (US); Robert Preston Parker, Westborough, MA (US); John Michael Sakalowsky, West Newton, MA (US); Santiago Carvajal, West Newton, MA (US)

(73) Assignee: Bose Corporation, Framingham, MA (US)

(*) Notice: Subject to any disclaimer, the term of this patent is extended or adjusted under 35 U.S.C. 154(b) by 721 days.

(21) Appl. No.: 12/886,998

(22) Filed: Sep. 21, 2010

(65) Prior Publication Data

US 2011/0109573 A1 May 12, 2011

Related U.S. Application Data

(63) Continuation-in-part of application No. 12/613,943, filed on Nov. 6, 2009.

(51) Int. Cl.
*G06F 3/033* (2013.01)

(52) U.S. Cl.
USPC .......................................... 345/179

(58) Field of Classification Search
USPC .............................. 345/173–179
See application file for complete search history.

(56) References Cited

U.S. PATENT DOCUMENTS

| | | | |
|---|---|---|---|
| 4,786,767 A | 11/1988 | Kuhlman | |
| 4,825,209 A | 4/1989 | Sasaki et al. | |
| 5,222,895 A | 6/1993 | Fricke | |
| 5,327,160 A | 7/1994 | Asher | |
| 5,367,199 A | 11/1994 | Lefkowitz et al. | |
| 5,371,553 A | 12/1994 | Kawamura et al. | |
| 5,408,275 A | 4/1995 | Song et al. | |
| 5,508,703 A | 4/1996 | Okamura et al. | |
| 5,545,857 A | 8/1996 | Lee et al. | |
| 5,589,893 A | 12/1996 | Gaughan et al. | |
| 5,691,778 A | 11/1997 | Song | |
| 5,790,820 A | 8/1998 | Vayda et al. | |

(Continued)

FOREIGN PATENT DOCUMENTS

| | | |
|---|---|---|
| EP | 0838945 A2 | 4/1998 |
| EP | 1052849 A1 | 11/2000 |

(Continued)

OTHER PUBLICATIONS

Invitation to Pay Additional Fees dated Feb. 18, 2011 for PCT/US2010/055628.

(Continued)

*Primary Examiner* — Waseem Moorad

(57) ABSTRACT

A user interface for an audio/visual device takes measurements of a touch sensor that are indicative of the current position of a tip of a finger of a user against a touch-sensitive surface of the touch sensor on a recurring basis, maintains a predetermined quantity of those measurements in a storage accessible to a processing device implementing at least a portion of the user interface, and employs measurements taken of the touch sensor at a predetermined amount of time into the past in response to an indication of the user having exerted increased pressure against the touch-sensitive surface via the tip to determine the position of that tip at a time relatively shortly before the user began to exert the increase in pressure.

6 Claims, 41 Drawing Sheets

(56) References Cited

U.S. PATENT DOCUMENTS

| | | |
|---|---|---|
| 5,990,890 A | 11/1999 | Etheredge |
| 6,067,081 A | 5/2000 | Hahlganss et al. |
| 6,094,156 A | 7/2000 | Henty |
| 6,118,435 A | 9/2000 | Fujita et al. |
| 6,128,009 A | 10/2000 | Ohkura et al. |
| 6,215,417 B1 | 4/2001 | Krass et al. |
| 6,218,966 B1 | 4/2001 | Goodwin et al. |
| 6,313,851 B1 | 11/2001 | Matthews, III et al. |
| 6,317,128 B1 | 11/2001 | Harrison et al. |
| 6,396,523 B1 | 5/2002 | Segal et al. |
| 6,445,284 B1 | 9/2002 | Cruz-Hernandez et al. |
| 6,538,643 B2 | 3/2003 | Mori et al. |
| 6,570,994 B1 | 5/2003 | Berthoud et al. |
| 6,574,083 B1 | 6/2003 | Krass et al. |
| 6,628,195 B1 | 9/2003 | Coudon |
| 6,633,281 B2 | 10/2003 | Lin et al. |
| 6,636,202 B2 | 10/2003 | Ishmael, Jr. et al. |
| 6,701,525 B1 | 3/2004 | Neervoort et al. |
| 6,750,803 B2 | 6/2004 | Yates et al. |
| 6,765,557 B1 | 7/2004 | Segal et al. |
| 6,834,373 B2 | 12/2004 | Dieberger |
| 6,957,386 B2 | 10/2005 | Nishina et al. |
| 7,009,595 B2 | 3/2006 | Roberts et al. |
| 7,034,814 B2 | 4/2006 | Gong et al. |
| 7,036,091 B1 | 4/2006 | Nguyen |
| 7,139,623 B2 | 11/2006 | Adams et al. |
| 7,170,428 B2 | 1/2007 | Himberg et al. |
| 7,174,518 B2 | 2/2007 | Kim |
| 7,269,484 B2 | 9/2007 | Hein |
| 7,336,266 B2 | 2/2008 | Hayward et al. |
| 7,453,442 B1 | 11/2008 | Poynter |
| 7,548,232 B2 | 6/2009 | Shahoian et al. |
| 7,574,672 B2 | 8/2009 | Jobs et al. |
| 7,589,714 B2 | 9/2009 | Funaki |
| 7,616,192 B2 | 11/2009 | Schroeder |
| 7,663,604 B2 | 2/2010 | Maruyama et al. |
| 7,701,445 B2 | 4/2010 | Inokawa et al. |
| 7,745,211 B2 | 6/2010 | Takayama et al. |
| 7,769,417 B2 | 8/2010 | Tierling et al. |
| 7,825,903 B2 | 11/2010 | Anastas et al. |
| 2002/0078445 A1 | 6/2002 | Sharif et al. |
| 2002/0154888 A1 | 10/2002 | Allen et al. |
| 2002/0180707 A1 | 12/2002 | Sato et al. |
| 2003/0022701 A1 | 1/2003 | Gupta |
| 2003/0058265 A1 | 3/2003 | Robinson et al. |
| 2004/0252104 A1 | 12/2004 | Nakamura et al. |
| 2004/0252109 A1 | 12/2004 | Trent et al. |
| 2005/0030292 A1 | 2/2005 | Diederiks |
| 2005/0030434 A1 | 2/2005 | Sata et al. |
| 2005/0054390 A1 | 3/2005 | Tuovinen |
| 2005/0081164 A1 | 4/2005 | Hama et al. |
| 2005/0151727 A1 | 7/2005 | Kwong |
| 2005/0264538 A1 | 12/2005 | Yeh |
| 2006/0119585 A1 | 6/2006 | Skinner |
| 2006/0119586 A1 | 6/2006 | Grant et al. |
| 2007/0105591 A1 | 5/2007 | Chan |
| 2007/0220418 A1 | 9/2007 | Matsui et al. |
| 2007/0231901 A1 | 10/2007 | Takayama et al. |
| 2007/0243627 A1 | 10/2007 | Takayama et al. |
| 2007/0256029 A1 | 11/2007 | Maxwell |
| 2008/0030463 A1 | 2/2008 | Forest |
| 2008/0047765 A1 | 2/2008 | Proctor |
| 2008/0058022 A1 | 3/2008 | Ahn |
| 2008/0161065 A1 | 7/2008 | An et al. |
| 2008/0251364 A1 | 10/2008 | Takala et al. |
| 2009/0002328 A1 | 1/2009 | Ullrich et al. |
| 2009/0109183 A1* | 4/2009 | Carvajal et al. .............. 345/173 |
| 2009/0153288 A1 | 6/2009 | Hope et al. |
| 2009/0181724 A1 | 7/2009 | Pettersson |
| 2009/0195512 A1 | 8/2009 | Pettersson |
| 2009/0210815 A1 | 8/2009 | Cheng et al. |
| 2009/0275406 A1 | 11/2009 | Bytnar et al. |
| 2010/0052880 A1 | 3/2010 | Laitinen et al. |
| 2010/0144395 A1 | 6/2010 | Komiya |
| 2010/0146451 A1 | 6/2010 | Jun-Dong et al. |
| 2010/0156843 A1 | 6/2010 | Paleczny et al. |
| 2010/0171715 A1 | 7/2010 | Peterson et al. |
| 2010/0201652 A1 | 8/2010 | Caliskan et al. |
| 2010/0231367 A1 | 9/2010 | Cruz-Hernandez et al. |
| 2010/0231539 A1 | 9/2010 | Cruz-Hernandez et al. |
| 2010/0231541 A1 | 9/2010 | Cruz-Hernandez et al. |
| 2010/0231550 A1 | 9/2010 | Cruz-Hernandez et al. |
| 2011/0066980 A1 | 3/2011 | Chmielewski et al. |

FOREIGN PATENT DOCUMENTS

| | | |
|---|---|---|
| EP | 1418673 A1 | 5/2004 |
| EP | 1450247 A1 | 8/2004 |
| EP | 1488389 A1 | 12/2004 |
| EP | 1655953 A1 | 5/2006 |
| EP | 1944677 A2 | 7/2008 |
| EP | 2000885 A1 | 12/2008 |
| EP | 2060967 A1 | 5/2009 |
| EP | 2169515 A1 | 3/2010 |
| JP | 2003308009 A | 10/2003 |
| JP | 2005322566 A | 11/2005 |
| JP | 2007066031 A | 3/2007 |
| WO | 9200559 A1 | 1/1992 |
| WO | 9934564 A1 | 7/1999 |
| WO | 2005/109165 A2 | 11/2005 |
| WO | 2007/040531 A1 | 4/2007 |
| WO | 2008/038882 A1 | 4/2008 |
| WO | 2009039433 A1 | 3/2009 |

OTHER PUBLICATIONS

International Search Report and Written Opinion dated Apr. 14, 2011 for PCT/US2010/055628.

Daily Record, Oct. 6, 2007: "Gadgets and Gizmos"; www.sony.co.uk.

* cited by examiner

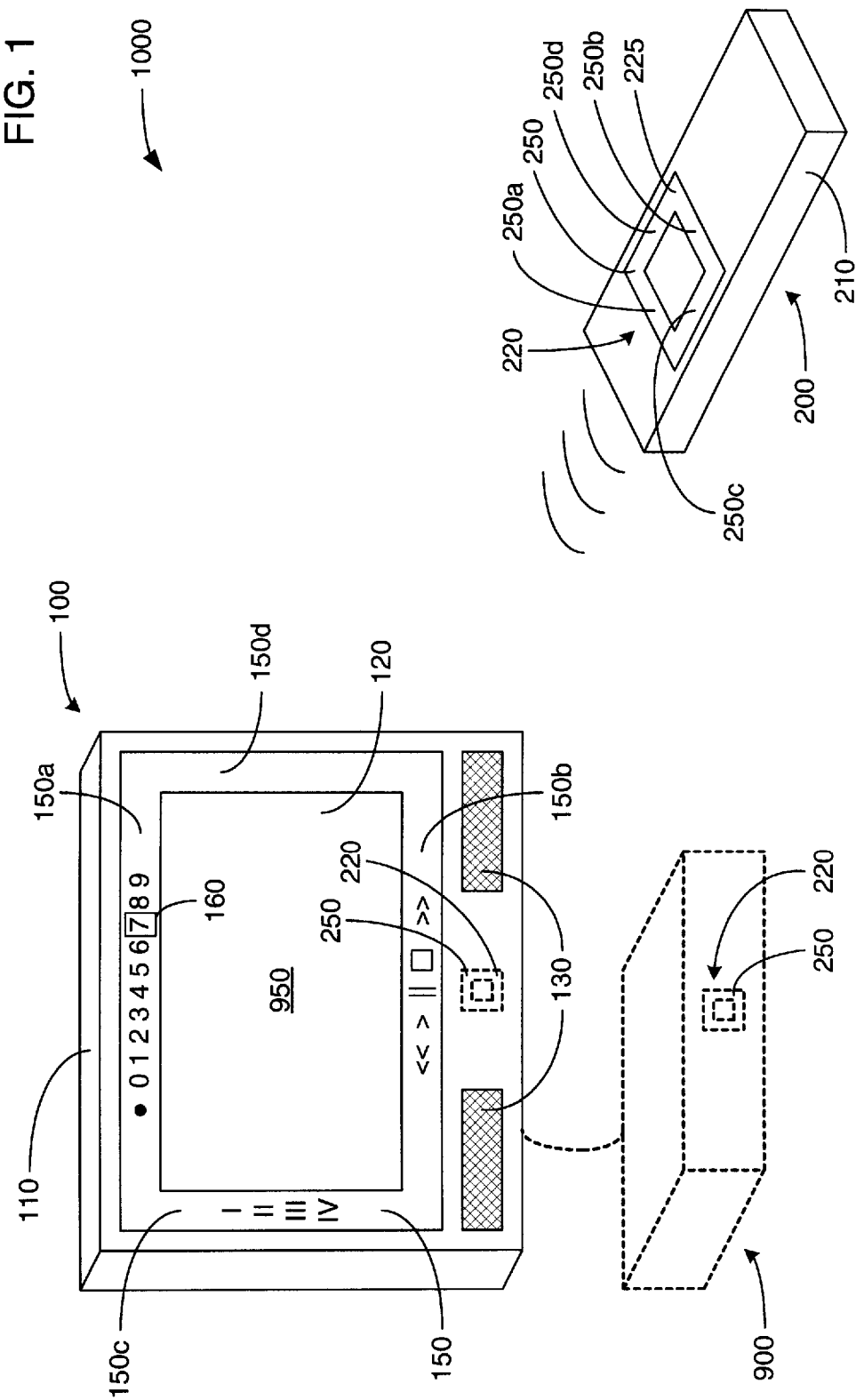

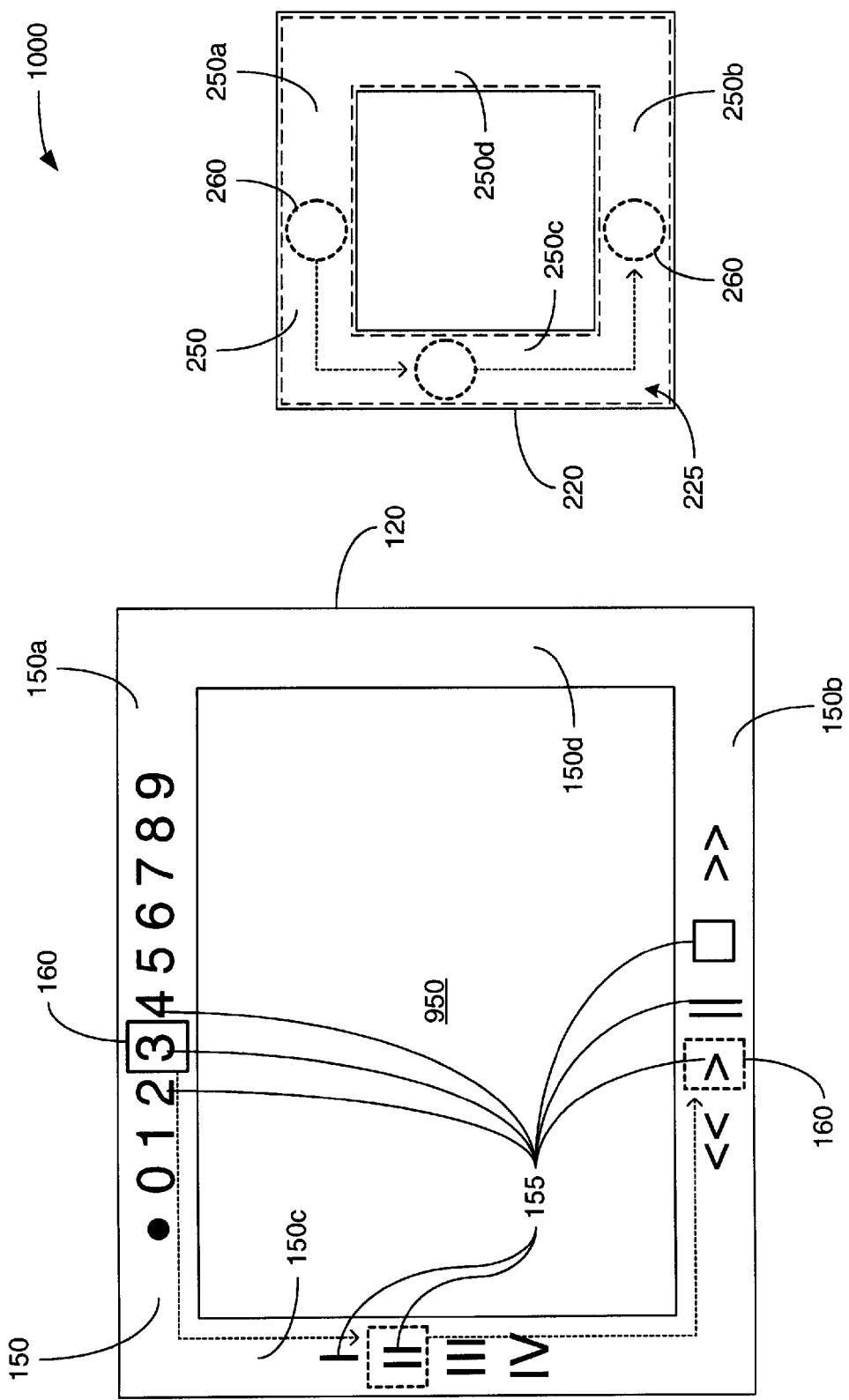

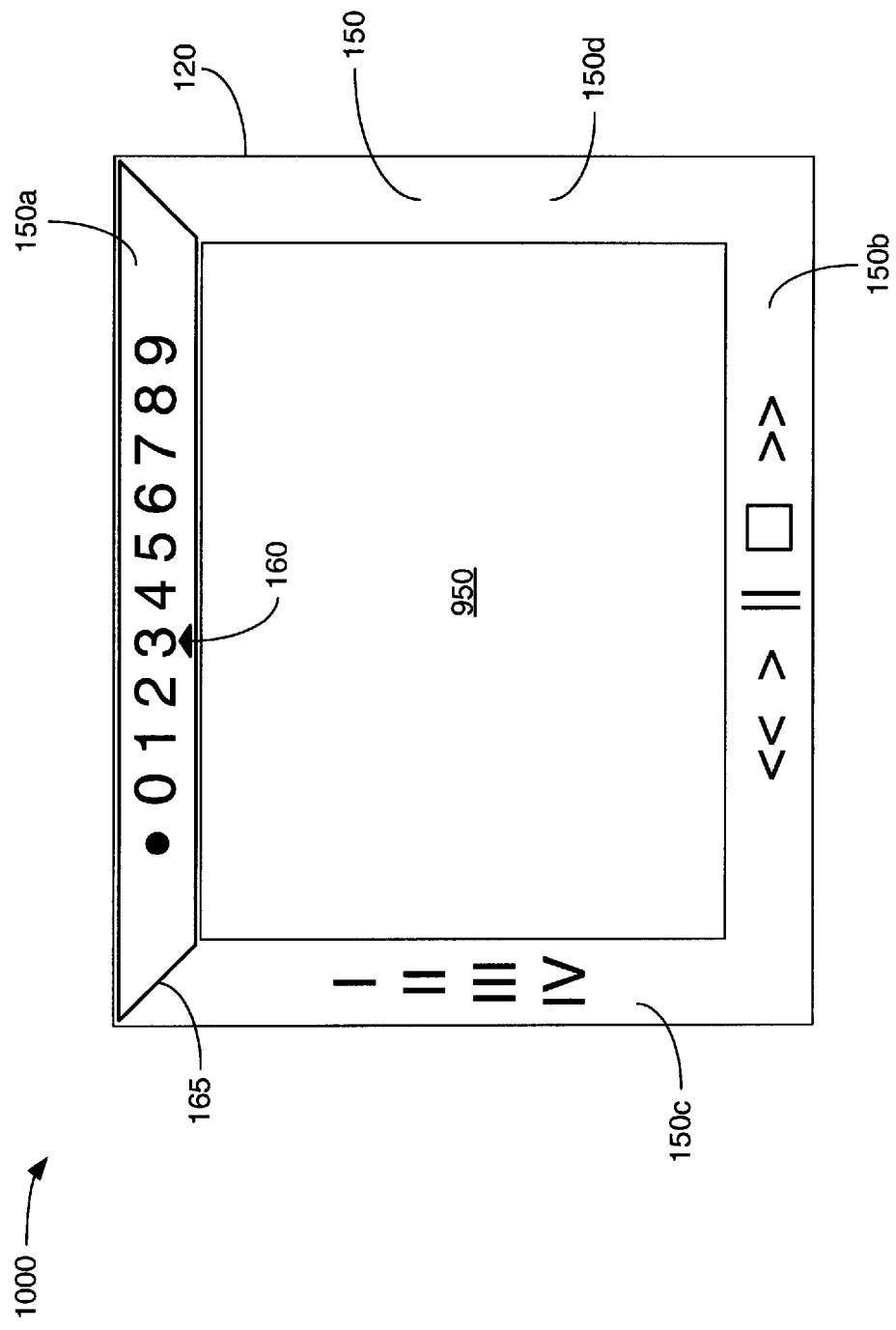

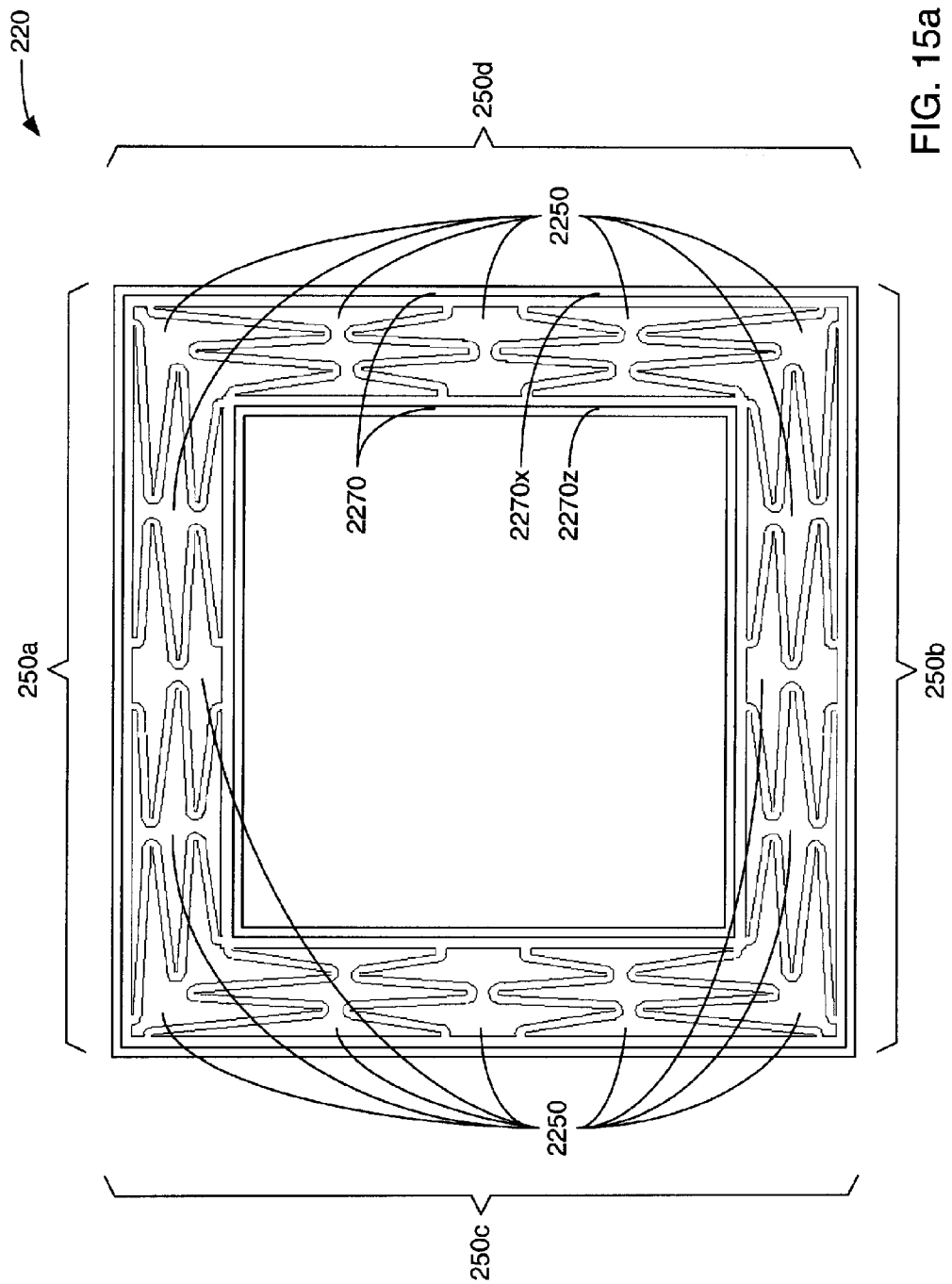

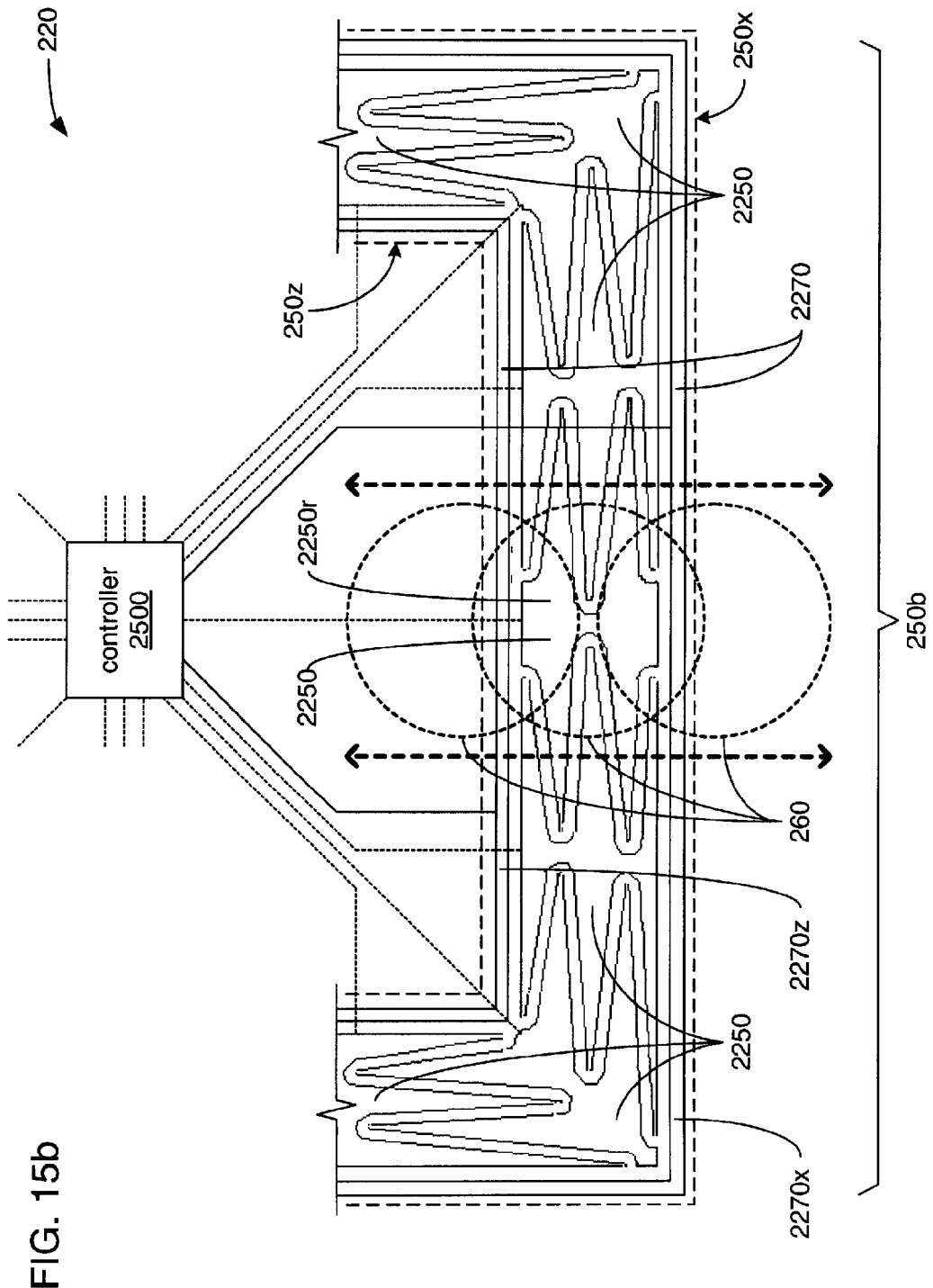

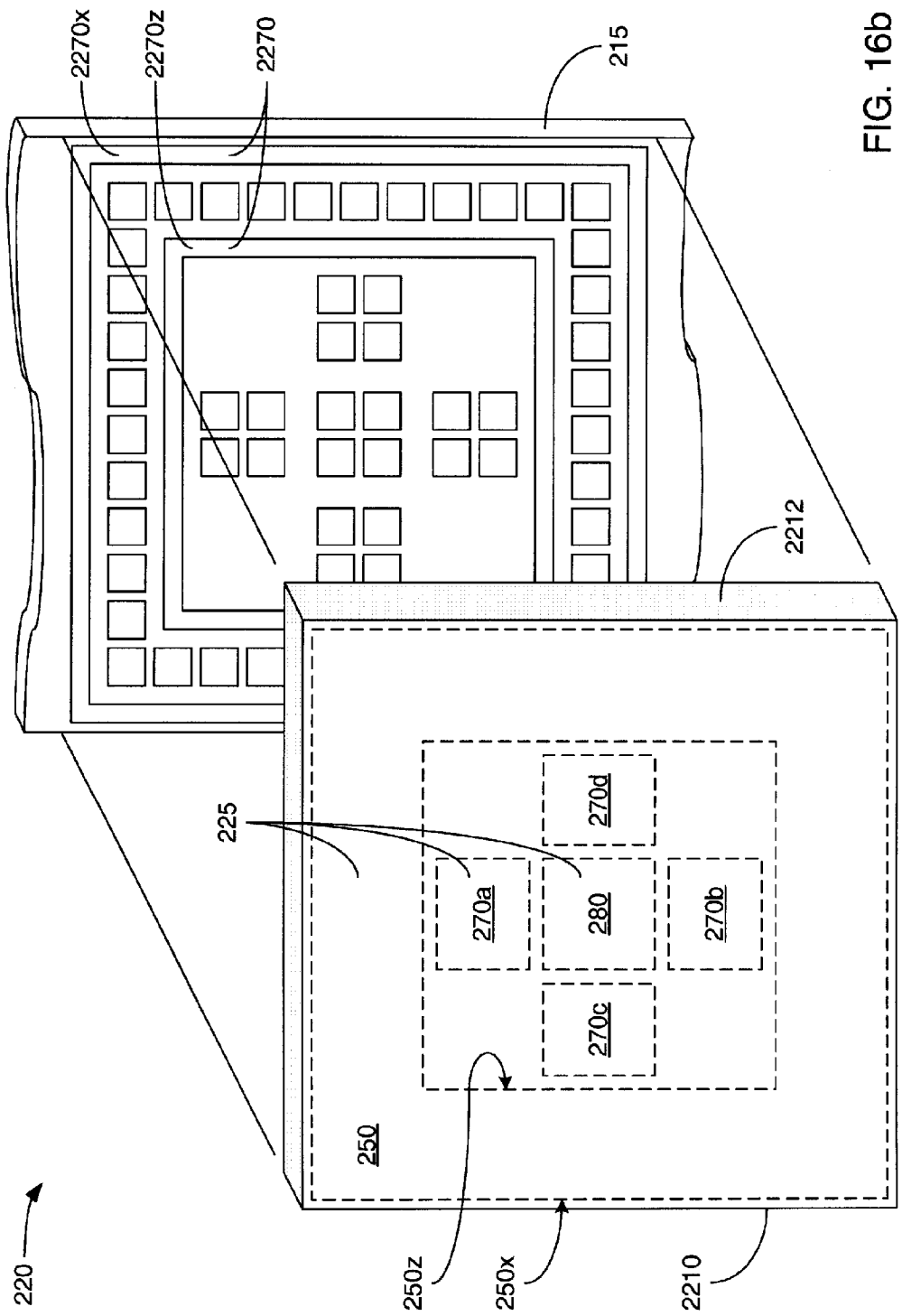

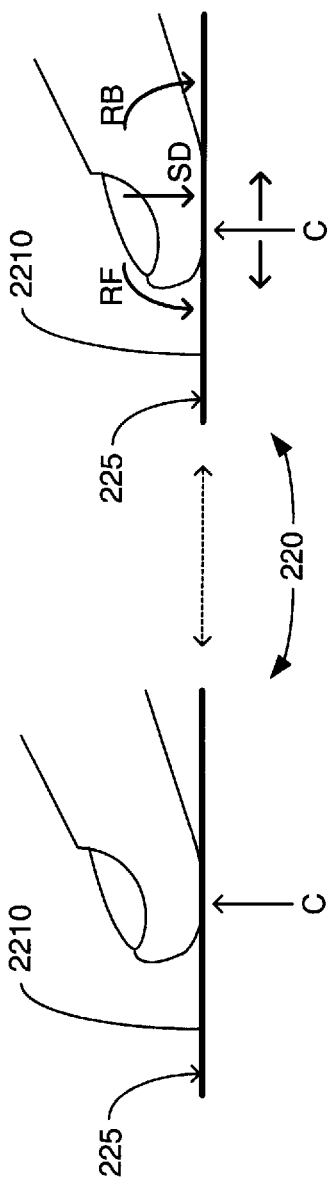
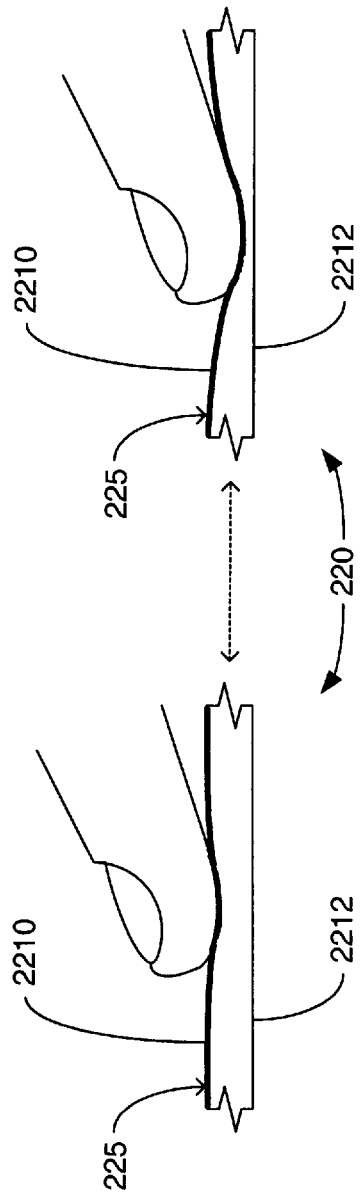

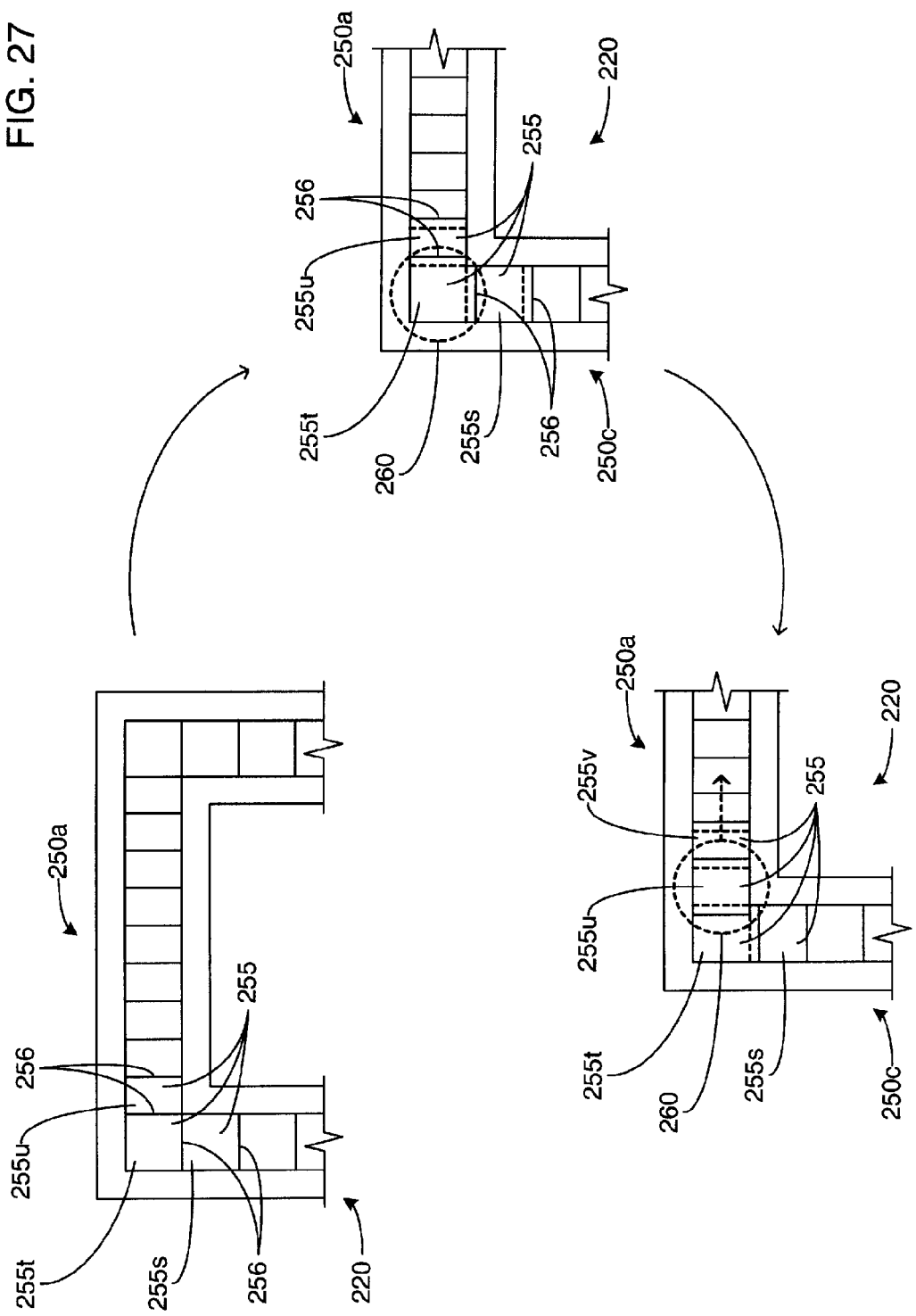

TOUCH-BASED USER INTERFACE USER SELECTION ACCURACY ENHANCEMENT

CROSS-REFERENCE TO RELATED APPLICATION

The present application is a continuation-in-part of application Ser. No. 12/613,943 filed Nov. 6, 2009 by Santiago Carvajal and John M. Sakalowsky, the disclosure of which is incorporated herein by reference.

TECHNICAL FIELD

This disclosure relates to user interfaces incorporating a visual display and/or a touch-sensitive control.

BACKGROUND

Part of enjoying the playing of an audio/visual program (e.g., a piece of music, a recorded lecture, a recorded live performance, a movie, a slideshow, family pictures, an episode of a television program, etc.) is the task of selecting the desired audio/visual program to be played. Unfortunately, the increasing variety of choices of sources of audio/visual programs and the increasing variety of mechanisms by which audio/visual programs are able to be stored and played has greatly complicated what was once the relatively simple act of watching or listening to the playing of an audio/visual program to enjoy it.

For example, those wishing to "tune in" an audio/visual program being broadcast must now select a channel on which to view an audio/visual program from as many as 500 channels available through typical cable and/or satellite connections for television and/or radio. Further, it has become commonplace to employ audio/visual devices that are able to be programmed to autonomously tune in and record an audio/visual program for playing at a later time. Still further, it is now becoming increasingly commonplace to obtain audio/visual programs from websites accessible through the Internet, either by receiving those audio/visual programs as streaming data while they are played, or downloading those audio/visual programs as a storable digital file on an audio/visual device for playing at a later time. Yet further, some of these possible sources of audio/visual programs require paid subscriptions for which key cards and/or decryption keys are required to gain access to at least some audio/visual programs.

Those seeking to avail themselves of even a modest subset of such a wide array of options for playing an audio/visual program have often found themselves having to obtain multiple audio/visual devices (e.g., tuners, descramblers, disc media players, video recorders, web access devices, digital file players, televisions, visual displays without tuners, etc.). Each such audio/visual device often has a unique user interface, and more often than not, is accompanied by a separate handheld wireless remote control by which it is operated. Attempts have been made to grapple with the resulting plethora of remote controls that often accompany a multitude of audio/visual devices by providing so-called "universal remotes" enabling multiple audio/visual devices to be operated using a single remote control. However, a universal remote tends to go only so far in satisfying the desire of many users to simplify the coordination required in the operation of multiple audio/visual devices to perform the task of playing an audio/visual program.

Efforts have recently been made through cooperation among multiple purveyors of audio/visual devices to further ease the coordinated operation of multiple audio/visual devices through the adoption of standardized command codes and various approaches to coupling multiple audio/visual devices to enable the exchange of those standardized command codes among multiple audio/visual devices. An example of this effort is the CEC standardized command set created as part of the HDMI interface specification promulgated by HDMI Licensing, LLC of Sunnyvale, Calif. However, these efforts, even in conjunction with a universal remote, still only go so far in making the playing of an audio/visual program into a truly simple undertaking.

SUMMARY

A user interface for an audio/visual device incorporates one or both of a touch sensor having a touch surface on which is defined a racetrack surface having a ring shape and a display element on which is displayed a racetrack menu also having a ring shape, and where the user interface incorporates both, the ring shapes of the racetrack surface and the racetrack menu are structured to generally correspond such that the position of a marker on the racetrack menu is caused to correspond to the position at which a digit of a user's hand touches the racetrack surface.

In one aspect, an apparatus includes a display element capable of visually displaying a visual portion of an audio/visual program and a racetrack menu having a ring shape; a processing device; and a storage accessible to the processing device and storing a sequence of instructions. When the sequence of instructions is executed by the processing device, the processing device is caused to: cause the racetrack menu to be visually displayed on the display element such that the racetrack menu surrounds a first display area in which the visual portion of the audio/visual program may be visually displayed; cause a plurality of menu items to be visually displayed in the racetrack menu; cause a first marker to be visually displayed in the racetrack menu; receive an indication that a first manually-operable control is being operated to move the first marker; in response to the indication of the first manually-operable control being operated to move the first marker, move the first marker about the racetrack menu and constrain movement of the first marker to remain within the racetrack menu; receive an indication of the first manually-operable control being operated to select a menu item of the plurality of menu items that is in the vicinity of the first marker at a time subsequent to the first manually-operable control being operated to move the first marker about the racetrack; and in response to the indication of the first manually-operable control being operated to select the menu item that is in the vicinity of the first marker, cause the menu item to be selected, wherein causing the menu item to be selected comprises taking an action to cause the audio/visual program to be selected for playing.

Implementations may include, and are not limited to, one or more of the following features. The touch-sensitive surface of the touch sensor may have a ring shape that defines the ring shape of the racetrack surface such that the racetrack surface encompasses substantially all of the touch-sensitive surface. The apparatus may further include a manually operable control, and a casing wherein the touch sensor is disposed on the casing relative to the manually operable control such that the touch-sensitive surface surrounds the manually operable control.

Alternatively, the touch-sensitive surface of the touch sensor may be a continuous surface having no hole interrupting the touch-sensitive surface formed therethrough, where the ring shape of the racetrack surface is defined on the touch-sensitive surface to encompass a first portion of the touch-sensitive surface and is defined to be positioned about the periphery of the touch-sensitive surface so as to surround a second portion of the touch-sensitive surface, and a navigation surface is defined on the touch-sensitive surface to encompass the second portion. At least one ridge may be formed in the touch-sensitive surface, wherein the at least one ridge also at least partly defines the ring shape of the racetrack surface. The processing device may be caused by the sequence of instructions to define the first and second portions of the touch-sensitive surface by: monitoring activity on the touch-sensitive surface; treating the receipt of an indication of the digit touching the touch-sensitive surface at a location within the first portion as the indication of the digit touching the racetrack surface at the position; treating the receipt of an indication of the digit touching the touch-sensitive surface at a location within the second portion as an indication of the digit operating a navigation control; and in response to the indication of the digit touching the navigation control, causing a command to be transmitted to a source of the audio/visual program to operate a function of another menu associated with the source.

The apparatus may further include a source interface operable to transmit commands to a source of the audio/visual program; wherein execution of the sequence of instructions by the processing device further causes the processing device to receive an indication of the manually-operable control being operated; and in response to the indication of the manually-operable control being operated, operate the source interface to transmit a command to the source to cause the source to visually display a navigation menu of the source on the display element. The menu may have a ring shape that substantially corresponds to the ring shape of the racetrack surface. The ring shape of both the racetrack surface and the menu may be a rectangular ring shape such that the racetrack surface comprises four sides and the menu comprises four sides that correspond to the four sides of the racetrack surface. The ring shape of the menu may surround a display area in which a visual portion of the audio/visual program is displayed at a time when the audio/visual program is played.

Execution of the sequence of instructions by the processing device may further causes the processing device to cause the menu to be visually displayed in response to the indication of the digit touching the racetrack surface at the position at a time when the menu is not being visually displayed. Execution of the sequence of instructions by the processing device may further cause the processing device to cause the menu to be visually displayed in response to the indication of the digit touching the racetrack surface followed by an indication of the digit moving about the racetrack surface in a wiping motion starting at the position at a time when the menu is not being visually displayed; and cause a command concerning playing the audio/visual program to be transmitted to a source of the audio/visual program in response to the indication of the digit touching the racetrack surface followed by an indication of the digit ceasing to touch the racetrack surface at a time when the menu is not being visually displayed. Execution of the sequence of instructions by the processing device may further cause the processing device to cause the menu to be visually displayed in response to the indication of the digit touching the racetrack surface followed by an indication of the digit remaining in contact with the racetrack surface for at least a predetermined period of time at a time when the menu is not being visually displayed; and cause a command concerning playing the audio/visual program to be transmitted to a source of the audio/visual program in response to the indication of the digit touching the racetrack surface followed by an indication of the digit ceasing to touch the racetrack surface at a time when the menu is not being visually displayed.

In one aspect, a method includes receiving an indication of a digit of a hand of a user touching a racetrack surface at a position on the racetrack surface, wherein the racetrack surface is defined on a touch-sensitive surface of a touch sensor to encompass at least a portion of the touch-sensitive surface and is operable by the digit; in response to the indication of the digit touching the racetrack surface at the position, causing a marker to be visually displayed at a location that corresponds to the position on the racetrack surface on a menu that is visually displayed on a display element; receiving an indication of the position at which the digit touches the racetrack surface being moved about the racetrack surface; in response to the indication of the position being moved about the racetrack surface, causing the marker to be moved about the menu in a manner that corresponds to the manner in which the position is being moved about the racetrack; receiving an indication of the user increasing the pressure with which the user's digit touches the racetrack surface at the position at a time subsequent to receiving the indication of the position being moved about the racetrack; and in response to the indication of the user increasing pressure with which the user's digit touches the racetrack surface at the position, causing a menu item displayed in the vicinity of the marker to be selected, wherein causing the menu item to be selected comprises taking an action to cause an audio/visual program to be selected for playing.

Implementations may include, and are not limited to, one or more of the following features. The method may further include defining the racetrack surface on a first portion of the touch-sensitive surface and defining a navigation surface on a second portion of the touch-sensitive surface such that the ring shape of the racetrack surface surrounds the navigation surface by: monitoring activity on the touch-sensitive surface; treating the receipt of an indication of the digit touching the touch-sensitive surface at a location within the first portion as the receiving of the indication of the digit touching the racetrack surface at the position; treating the receipt of an indication of the digit touching the touch-sensitive surface at a location within the second portion as receiving an indication of the digit operating a navigation control; and in response to the indication of the digit touching the navigation control, causing a command to be transmitted to a source of the audio/visual program to operate a function of another menu associated with the source. Alternatively and/or additionally, the method may further include displaying the menu on the display element with a ring shape that substantially corresponds to the ring shape of the racetrack surface; and perhaps further include surrounding a display area on the display element with the menu, wherein a visual portion of the audio/visual program is displayed in the display area at a time when the audio/visual program is played. The ring shape of both the racetrack surface and the menu may be a rectangular ring shape such that the racetrack surface comprises four sides and the menu comprises four sides that correspond to the four sides of the racetrack surface.

The method may further include displaying the menu on the display element in response to the indication of the digit touching the racetrack surface at the position at a time when the menu is not being visually displayed. The method may further include displaying the menu on the display element in response to the indication of the digit touching the racetrack surface followed by receiving an indication of the digit moving about the racetrack surface in a wiping motion starting at the position at a time when the menu is not being visually displayed; and transmitting a command concerning playing the audio/visual program to a source of the audio/visual program in response to the indication of the digit touching the racetrack surface followed by receiving an indication of the digit ceasing to touch the racetrack surface at a time when the menu is not being visually displayed. The method may further include displaying the menu on the display element in response to the indication of the digit touching the racetrack surface followed by receiving an indication of the digit remaining in contact with the racetrack surface for at least a predetermined period of time at a time when the menu is not being visually displayed; and transmitting a command concerning playing the audio/visual program to a source of the audio/visual program in response to the indication of the digit touching the racetrack surface followed by receiving an indication of the digit ceasing to touch the racetrack surface at a time when the menu is not being visually displayed.

A user interface for an audio/visual device incorporates a touch sensor having multiple adjacently positioned control surfaces defined thereon by a processing device in which adjacent ones of the control surfaces share boundaries by which a user may move a tip of a digit from one of the control surfaces directly to an adjacent one of the control surfaces by moving that tip across a boundary shared between them, and in which the surface area of whichever one of the control surfaces a user's finger overlies at a given moment is expanded in size to increase the distance by which the user must move that tip to reposition that tip from overlying that one of the control surfaces to overlying an adjacent one, and is reduced in size to a size corresponding to an absolute mapping when a person does so move that tip.

In one aspect, an apparatus includes a touch sensor having a touch-sensitive surface that is manually operable with a digit of a hand of a user, a processing device, and a storage accessible to the processing device and storing a sequence of instructions. When executed by the processing device, the sequence of instructions causes the processing device to: define a plurality of control surfaces on the touch-sensitive surface at adjacent positions that form a geometric shape, that enable a user to move a tip of the digit across the touch-sensitive surface in a manner that moves from one of the control surfaces of the plurality of control surfaces to another of the control surfaces of the plurality of control surfaces, and that enables the user to so move the tip to cross a boundary shared by the one of the control surfaces and the other of the control surfaces; and receive an indication of the digit touching the touch-sensitive surface of the touch sensor at a position overlying a surface area of a first control surface of the plurality of control surfaces. In response to the indication of the digit touching the touch-sensitive surface at the position the processing device is further caused to: cause a marker to be visually displayed at a first location on a menu in the vicinity of a first menu item, wherein the menu is visually displayed on a display element; and shift a first boundary shared by the first control surface with a second control surface of the plurality of control surfaces into a surface area of the second control surface to expand the surface area of the first control surface to increase a distance by which the user must move the tip to cause the tip to cease to overlie the first control surface and cause the tip to overlie the second control surface. The processing device is further caused to receive an indication of the position at which the digit touches the touch-sensitive surface being moved from overlying the surface area of the first control surface to overlying the surface area of the second control surface; and in response to the indication of the digit touching the touch-sensitive surface at the position: cause the marker to be visually displayed at a second location on the menu in the vicinity of a second menu item; and shift the first boundary shared by the first control surface with the second control surface into the surface area of the first control surface to expand the surface area of the second control surface to increase a distance by which the user must move the tip to cause the tip to cease to overlie the second control surface and cause the tip to overlie the first control surface.

Implementations may include, and are not limited to, one or more of the following features. The geometric shape formed by the plurality of control surfaces may be a ring shape such that the plurality of control surfaces form a racetrack surface, and the menu may have a geometric shape that mirrors the ring shape formed by the plurality of control surfaces such that the menu is a racetrack menu. The sequence of instructions may further cause the processing device to, in response to the indication of the digit touching the touch-sensitive surface at the position, shift a second boundary shared by the second control surface with a third control surface of the plurality of control surfaces into a surface area of the third control surface to at least partially maintain the surface area of the second control surface as the first boundary is shifted into the surface area of the second control surface to increase a distance by which the user must move the tip to cause the tip to cease to overlie the first control surface, cause the tip to pass over the second control surface and cause the tip to overlie the third control surface.

In another aspect, a method includes defining a plurality of control surfaces on a touch-sensitive surface of a manually-operable touch sensor at adjacent positions that form a geometric shape, that enable a user to move a tip of the digit across the touch-sensitive surface in a manner that moves from one of the control surfaces of the plurality of control surfaces to another of the control surfaces of the plurality of control surfaces, and that enables the user to so move the tip to cross a boundary shared by the one of the control surfaces and the other of the control surfaces; and receiving an indication of the digit touching the touch-sensitive surface of the touch sensor at a position overlying a surface area of a first control surface of the plurality of control surfaces. The method further includes in response to the indication of the digit touching the touch-sensitive surface at the position: visually displaying a marker at a first location on a menu in the vicinity of a first menu item, wherein the menu is visually displayed on a display element; and shifting a first boundary shared by the first control surface with a second control surface of the plurality of control surfaces into a surface area of the second control surface to expand the surface area of the first control surface to increase a distance by which the user must move the tip to cause the tip to cease to overlie the first control surface and cause the tip to overlie the second control surface. The method further includes receiving an indication of the position at which the digit touches the touch-sensitive surface being moved from overlying the surface area of the first control surface to overlying the surface area of the second control surface; and in response to the indication of the digit touching the touch-sensitive surface at the position: visually displaying the marker at a second location on the menu in the vicinity of a second menu item; and shifting the first boundary shared by the first control surface with the second control surface into the surface area of the first control surface to expand the surface area of the second control surface to increase a distance by which the user must move the tip to cause the tip to cease to overlie the second control surface and cause the tip to overlie the first control surface.

Implementations may include, and are not limited to, one or more of the following features. The geometric shape formed by the plurality of control surfaces may be a ring shape such that the plurality of control surfaces form a racetrack surface, and the menu may have a geometric shape that mirrors the ring shape formed by the plurality of control surfaces such that the menu is a racetrack menu. The method may further include in response to the indication of the digit touching the touch-sensitive surface at the position, shifting a second boundary shared by the second control surface with a third control surface of the plurality of control surfaces into a surface area of the third control surface to at least partially maintain the surface area of the second control surface as the first boundary is shifted into the surface area of the second control surface to increase a distance by which the user must move the tip to cause the tip to cease to overlie the first control surface, cause the tip to pass over the second control surface and cause the tip to overlie the third control surface.

A user interface for an audio/visual device incorporates the ability to allow a user to interact with two different menus that are displayed simultaneously on a single display element, perhaps one a racetrack menu and the other an on-screen menu of a source device, and incorporates a visual indication of user error that is displayed where the user has operated a first manually-operable control associated with a first one of the menus to move its marker about and has then operated a second manually-operable control associated with the second one of the menus in an apparent errant attempt to select a menu item of the first one of the menus within a predetermined period of time or at a time when it is known that operation of the second manually-operable control to select something is not associated with a valid function, perhaps as a result of the selection of a particular source of audio/visual programs.

In one aspect, an apparatus includes a first manually-operable control operable to move a first marker displayed on a first menu about menu items of a first plurality of menu items that are displayed on the first menu, the first menu being displayed within a first portion of a display element; a second manually operable control operable with a second menu displayed within a second portion of the display element simultaneously with the first menu; a processing device; and a storage accessible to the processing device and storing a sequence of instructions. When executed by the processing device, the sequence of instructions causes the processing device to: in response to receiving a first indication of the first manually-operable control being operated to move the first marker about menu items of the first plurality of menu items, cause the first marker to move about menu items of the first plurality of menu items; and in response to receiving a second indication of the second manually-operable control being operated to make a selection within a predetermined period of time of receiving the first indication, cause an error message indicating a user error to be displayed on the display element.

In another aspect, an apparatus includes a display element; a processing device; and a storage accessible to the processing device and storing a sequence of instructions. When executed by the processing device, the sequence of instructions causes the processing device to: cause a first menu comprising a first plurality of menu items to be displayed within a first portion of the display element; cause a first marker to be displayed on the first menu among the first plurality of menu items; cause a second menu to be displayed within a second portion of the display element; in response to receiving a first indication of a first manually-operable control associated with the first menu being operated to move the first marker about menu items of the first plurality of menu items, cause the first marker to move about menu items of the first plurality of menu items; and in response to receiving a second indication of a second manually-operable control associated with the second menu being operated to make a selection at a time that is not appropriate for a user to be operating the second manually-operable control to make a selection.

In yet another aspect a method includes displaying a first menu comprising a first plurality of menu items within a first portion of the display element; displaying a first marker on the first menu among the first plurality of menu items; enabling a second menu provided by a source coupled to an audio/visual device incorporating the display element to be displayed within a second portion of the display element simultaneously with the display of the first menu; in response to receiving a first indication of the first manually-operable control being operated to move the first marker about menu items of the first plurality of menu items, moving the first marker to move about menu items of the first plurality of menu items; and in response to receiving a second indication of the second manually-operable control being operated to make a selection within a predetermined period of time of receiving the first indication, displaying an error message indicating a user error on the display element.

Implementations of the apparatuses and/or the method may include, and are not limited to, one or more of the following features. The first manually-operable control may include a touch sensor having a touch-sensitive surface on which a racetrack surface is able to be defined; the first portion may surround the second portion; the first menu may be a racetrack menu that surrounds the second menu; and the second manually-operable control may include a selection switch operable to select a menu item of a second plurality of menu items displayed on the second menu. The second menu may be an on-screen menu of a source device coupled to an audio/visual device incorporating the display element to provide an audio/visual program to be displayed on the display element.

A user interface for an audio/visual device takes measurements of a touch sensor that are indicative of the current position of a tip of a finger of a user against a touch-sensitive surface of the touch sensor on a recurring basis, maintains a predetermined quantity of those measurements in a storage accessible to a processing device implementing at least a portion of the user interface, and employs measurements taken of the touch sensor at a predetermined amount of time into the past in response to an indication of the user having exerted increased pressure against the touch-sensitive surface via the tip to determine the position of that tip at a time relatively shortly before the user began to exert the increase in pressure.

In one aspect, an apparatus includes a touch sensor providing a touch-sensitive surface enabling the position of a tip of a digit of a user to be recurringly determined as the user moves the tip across the touch-sensitive surface while keeping the tip in contact with the touch-sensitive surface, and able to detect an increase in pressure exerted against the touch-sensitive surface through the tip to make a selection; a processing device; and a storage accessible to the processing device and storing a sequence of instructions. When executed by the processing device, the sequence of instructions causes the processing device to: take a set of measurements from the touch sensor indicative of the position of the tip on a recurring basis; maintain a predetermined quantity of the most recently taken sets of measurements indicative of the position of the tip in the storage; and in response to receiving an indication of an increase in pressure exerted against the touch-sensitive surface through the tip being detected: access one of the sets of measurements indicative of the position of the tip taken at a predetermined amount of time into the past; and employ the one of the sets of measurements to determine a position of the tip at a time prior to the increase in pressure being exerted against the touch-sensitive surface.

Implementations of the apparatuses and/or the method may include, and are not limited to, one or more of the following features. The touch sensor may employ capacitive sensing technology that includes a plurality of conductive pads underneath the touch-sensitive surface and formed on a substrate to enable the position of a tip of a digit of a user to be recurringly determined; the substrate may be disposed on a casing of a device in a manner that is inwardly movable to permit the touch-sensitive surface to be pressed inward into the casing in response to the increase in pressure exerted by the user through the tip; and the touch sensor may include a switch to detect inward movement of the substrate as the indication of the increase in pressure exerted against the touch-sensitive surface through the tip.

In further response to receiving an indication of an increase in pressure exerted against the touch-sensitive surface through the tip being detected, the processing device may be further caused to employ what is determined to be the position of the tip at the time prior to the increase in pressure being exerted against the touch-sensitive surface to determine what menu item of a plurality of menu items was intended to be selected by the user through the exerting of the increase in pressure against the touch-sensitive surface. Further, the processing device may be caused to display the plurality of menu items on a display element.

In another aspect, a method includes recurringly taking a set of measurements from a touch sensor indicative of the position of the tip on a touch-sensitive surface of the touch sensor as a user moves the tip across the touch-sensitive surface while keeping the tip in contact with the touch-sensitive surface; maintaining a predetermined quantity of the most recently taken sets of measurements indicative of the position of the tip in the storage; and in response to receiving an indication of an increase in pressure exerted against the touch-sensitive surface through the tip being detected, employing the one of the sets of measurements to determine a position of the tip at a time prior to the increase in pressure being exerted against the touch-sensitive surface.

Implementations of the apparatuses and/or the method may include, and are not limited to, one or more of the following features. The method may further include displaying a menu on a display element in which the menu comprises a plurality of menu items selectable by a user through operation of the touch sensor via the tip; and further response to receiving an indication of an increase in pressure exerted against the touch-sensitive surface through the tip being detected, employing what is determined to be the position of the tip at the time prior to the increase in pressure being exerted against the touch-sensitive surface to determine what menu item of a plurality of menu items was intended to be selected by the user through the exerting of the increase in pressure against the touch-sensitive surface.

Other features and advantages of the invention will be apparent from the description and claims that follow.

DESCRIPTION OF THE DRAWINGS

FIG. 1 is a perspective view of an embodiment of a user interface.

FIG. 2 depicts correlations between movement of a digit on a racetrack sensor of the user interface of FIG. 1 and movement of a marker on a racetrack menu of the user interface of FIG. 1.

FIGS. 3a, 3b, 3c and 3d, together, depict possible variants of the user interface of FIG. 1 incorporating different forms and combinations of markers.

FIGS. 15a, 15b and 15c, together, depict aspects of an alternate form of the capacitive sensing variant of the touch sensor of FIGS. 13a-c.

FIG. 16b depicts aspects of a resistance sensing variant of the touch sensor employed in the user interface of FIG. 1 having a form of the conductive rings of the alternate form of the capacitive sensing variant of the touch sensor of FIGS. 15a-c.

FIGS. 21a and 21b, together, depict aspects of possible inaccuracies in user operation of the user interface of FIG. 1 to select a menu item.

FIG. 27 depicts aspects of another toggling between the absolute mapping of FIG. 25 and variations of a variable mapping.

DETAILED DESCRIPTION

Figure 3B:
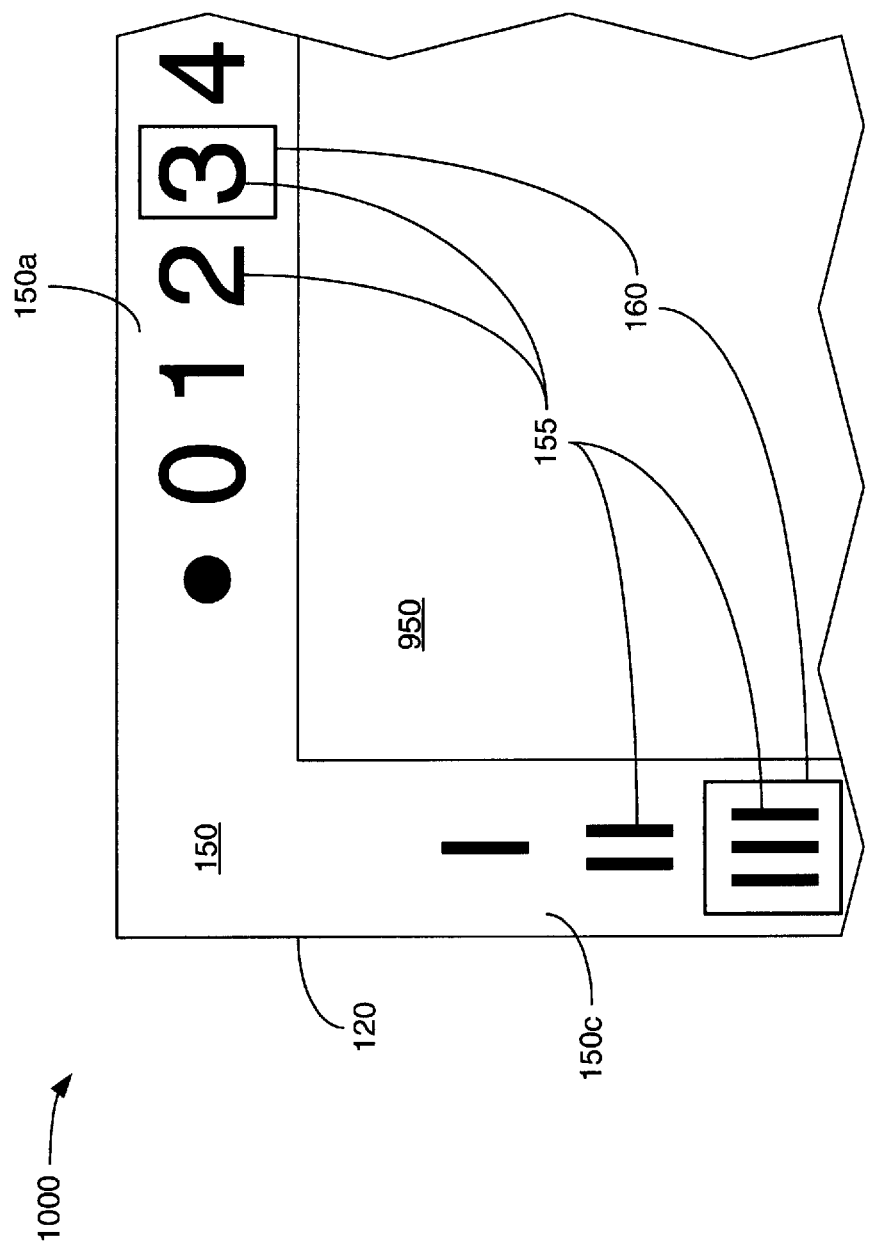

What is disclosed and what is claimed herein is intended to be applicable to a wide variety of audio/visual devices, i.e., devices that are structured to be employed by a user to play an audio/visual program. It should be noted that although various specific embodiments of audio/visual devices (e.g., televisions, set-top boxes and hand-held remotes) are presented with some degree of detail, such presentations of specific embodiments are intended to facilitate understanding through the use of examples, and should not be taken as limiting either the scope of disclosure or the scope of claim coverage.

It is intended that what is disclosed and what is claimed herein is applicable to audio/visual devices that employ a tuner and/or a network interface to receive an audio/visual program. It is intended that what is disclosed and what is claimed herein is applicable to audio/visual devices structured to cooperate with other devices to play an audio/visual program and/or to cause an audio/visual program to be played. It is intended that what is disclosed and what is claimed herein is applicable to audio/visual devices that are wirelessly connected to other devices, that are connected to other devices through electrically and/or optically conductive cabling, or that are not connected to any other device, at all. It is intended that what is disclosed and what is claimed herein is applicable to audio/visual devices having physical configurations structured to be either portable or not. Still other configurations of audio/visual devices to which what is disclosed and what is claimed herein are applicable will be apparent to those skilled in the art.

FIG. 1 depicts a user interface 1000 enabling a user's hand-eye coordination to be employed to more intuitively operate at least one audio/visual device to select and play an audio/visual program. The user interface 1000 incorporates a displayed "racetrack" menu 150 and a corresponding "racetrack" surface 250. As depicted, the user interface 1000 is implemented by an interoperable set of devices that include at least an audio/visual device 100 and a handheld remote control 200, and as will be explained in greater detail, may further include another audio/visual device 900. However, as will also be explained in greater detail, the user interface 1000 may be substantially fully implemented by a single audio/visual device, such as the audio/visual device 100.

The racetrack menu 150 is visually displayed on a display element 120 disposed on a casing 110 of the audio/visual device 100, and as depicted, the audio/visual device 100 is a flat panel display device such as a television, employing a flat panel form of the display element 120 such as a liquid crystal display (LCD) element or a plasma display element. Further, the audio/visual device 100 may further incorporate acoustic drivers 130 to acoustically output sound. However, as those skilled in the art will readily recognize, the racetrack menu 150 may be displayed by any of a variety of types, configurations and sizes of audio/visual device, whether portable or stationary, including and not limited to, a projector or a handheld device.

The racetrack surface 250 is defined on a touch-sensitive surface 225 of a touch sensor 220 disposed on a casing 210 of the handheld remote control 200, and as depicted, the touch-sensitive surface 225 has a rectangular ring shape that physically defines the shape and position of the racetrack surface 250 such that the racetrack surface 250 encompasses substantially all of the touch-sensitive surface of the touch sensor 220. However, as those skilled in the art will readily recognize, the touch sensor 220 may be incorporated into any of a wide variety of devices, whether portable or stationary, including and not limited to, a wall-mounted control panel or a keyboard. Further, it is also envisioned that the touch sensor 220 may have a variant of the touch-sensitive surface 225 (see FIG. 2) that is of a shape other than a ring shape with the racetrack surface 250 defined on that variant of the touch-sensitive surface 225 in another way such that the racetrack surface 250 encompasses only a subset of that variant of the touch-sensitive surface 225 of the touch sensor 220. Further, the touch sensor 220 may be based on any of a variety of technologies.

As depicted, both the racetrack menu 150 and the racetrack surface 250 have a ring shape that is a generally rectangular ring shape with corresponding sets of four sides. More specifically, the four sides 150a, 150b, 150c and 150d of the racetrack menu 150 are arranged to correspond to the four sides 250a, 250b, 250c and 250d of the racetrack surface 250. This four-sided nature of both of the racetrack menu 150 and the racetrack surface 250 are meant to accommodate the rectilinear nature of the vast majority of display elements currently found in audio/visual devices and the rectilinear nature of the visual portion of the vast majority of currently existing audio/visual programs that have a visual portion. However, it is important to note that although the racetrack menu 150 and the racetrack surface 250 are depicted and discussed herein as having a rectangular ring shape, other embodiments are possible in which the ring shape adopted by the racetrack surface 250 has a circular ring shape, an oval ring shape, a hexagonal ring shape or still other geometric variants of a ring shape. Further, where the racetrack menu 150 and/or the racetrack surface 250 have a ring shape that is other than a rectangular ring shape, one or both of the display element 120 and the touch sensor 220 may have a shape other than the rectangular shapes depicted herein.

As will be explained in greater detail, the four sides 150a-d of the racetrack menu 150 surround or overlie the edges of a display area 950 in which the visual portion of an audio/visual program selected via the user interface 1000 may be played. It is this positioning of the racetrack menu 150 about the periphery of the display element 120 and the display area 950 (whether surrounding or overlying the periphery of the display area 950) that supplies the impetus for both the racetrack menu 150 and the racetrack surface 250 having a ring shape that is generally a rectangular ring shape, rather than a ring shape of some other geometry. Where a selected audio/visual program does not have a visual portion (e.g., the audio/visual program is an audio recording having only an audio portion), the display area 950 may remain blank (e.g., display only a black or blue background color) or display status information concerning the playing of the selected audio/visual program as the selected audio/visual program is played, perhaps with the audio portion being acoustically output by the acoustic drivers 130. As depicted, the four sides 150a-d of the racetrack menu 150 are displayed by the display element 120 at the edges of the display element 120. However, it is also envisioned that the four sides 150a-d of the racetrack menu 150 may be positioned about the edges of a "window" of a graphical user interface of the type commonly employed in the operation of typical computer systems, perhaps where the audio/visual device 100 is a computer system on which audio/visual programs are selected and played through the user interface 1000.

As shown in FIG. 2, at various positions along one or more of the four sides 150a-d of the racetrack menu 150 are menu items 155 that may be selected by a user of the user interface 1000. The menu items 155 may include alphanumeric characters (such as those depicted as positioned along the side 150a) that may be selected to specify a channel or a website from which to select and/or receive an audio/visual program, symbols (such as those depicted as positioned along the side 150b) representing commands to control the operation of an audio/visual device capable of playing an audio/visual program (e.g., "play" and "stop" commands for a video cassette recorder, a disc media player, or solid state digital file player, etc.), and indicators of inputs (such as those depicted as positioned along the side 150c) to an audio/visual device that may be selected and through which an audio/visual program may be selected and/or received. Although the various menu items 155 positioned along the racetrack menu 150 could conceivably serve any of a wide variety of purposes, it is envisioned that much of the functionality of the menu items 155 will be related to enabling a user to select an audio/visual program for playing, and/or to actually play an audio/visual program.

To operate the user interface 1000, a user places the tip of a digit of one of their hands (i.e., the tip of a thumb or finger) on a portion of the racetrack surface 250 defined on the touch-sensitive surface 225 of the touch sensor 220, and a marker 160 is displayed on a portion of the racetrack menu 150 that has a position on the racetrack menu 150 that corresponds to the position 260 on the racetrack surface 250 at which the tip of their digit is in contact with the touch-sensitive surface 225 of the touch sensor 220. FIG. 2 also depicts how the marker 160 moves about and is constrained to moving about the racetrack menu 150 to maintain a correspondence between its location on the racetrack menu 150 and the position 260 of the digit on the racetrack surface 250 as the user moves that digit about the racetrack surface 250. In some embodiments, the marker 160 may move about the racetrack menu 150 in a manner in which the marker 160 "snaps" from being centered about one menu item 155 to an adjacent menu item 155 as the marker 160 is moved about a portion of the racetrack menu 150 having adjacent ones of the menu items 155. Further, such "snapping" of the marker 160 between adjacent ones of the menu items 155 may be accompanied by the concurrent acoustic output of some form of sound (e.g., a "click" or "beep" sound that accompanies each "snap" of the marker 160) to provide further feedback to a user of the marker 160 moving from one such menu item 155 to another.

When the marker 160 is positioned over a menu item 155 that the user wishes to select, the user selects that menu item 155 by pressing whichever one of their digits that is already in contact with the racetrack surface 250 with greater pressure than was used in simply placing that digit in contact with the racetrack surface 250. In some embodiments, the touch sensor 220, itself, is capable of distinguishing different degrees of pressure with which the digit is put into contact with the touch-sensitive surface 225 of the touch sensor 220 on which the racetrack surface 250 is defined in order to distinguish an instance in which the user is pressing harder with that digit to select one of the menu items 155. In other embodiments, the touch sensor 220 is able to function in a manner not unlike a mechanically depressible button in which the additional pressure applied through that digit by the user causes the touch sensor 220 to be pressed inward towards the casing 210 as part of selecting a menu item. This may be accomplished by overlying one or more buttons disposed within the casing 210 with the touch sensor 220 so that such buttons are depressed by the touch sensor 220 as the touch sensor 220 is itself depressed towards the casing 210. Where the touch sensor 220 is able to be pressed inward towards the casing 210, such inward movement may be accompanied by a "click" sound that may be heard by the user and/or a tactile "snap" sensation that can be sensed by the user through their digit to give the user some degree of positive feedback that they've successfully selected one of the menu items 155. Regardless of whether the touch sensor 220 is able to be pressed inward towards the casing 210, or not, a "click" or other sound accompanying the user's use of increased pressure on the racetrack surface 250 to select one of the menu items 155 may be acoustically output through an acoustic driver (not shown) incorporated into the remote control 200 and/or through the acoustic drivers 130 of the audio/visual device 100.

FIGS. 3a, 3b, 3c and 3d depict other variations of forms of marker and combinations of markers. As will be made clear, different forms of marker and combinations of multiple markers may be used to enhance the rapidity with which the eyes of a user of the user interface 1000 is drawn to a specific location on the racetrack menu 150, and to aid the hand-eye coordination of that user.

Although the marker 160 was depicted in FIG. 2 as taking the form of a box-shaped graphical element sized to surround one of the menu items 155 at a time when positioned in the vicinity of one or more of the menu items 155, FIG. 3a depicts another variant of the marker 160 having the form of a triangular pointer. Still other possible graphical representations of the marker 160 will occur to those skilled in the art, such as forms of the marker 160 having other geometric shapes (e.g., a dot, a circle, an arrow, etc.) or other ways of being positioned in the vicinity of a given one of the menu items 155 (e.g., overlying, surrounding, pointing to, touching, etc., one of the menu items 155). Still further, instead of the marker 160 being a graphical element that is separate and distinct from any of the menu items 155, the marker 160 may instead be a modified form of a given one of the menu items 155, such as a change in a color of a menu item, an enlargement of a menu item in comparison to others, or some form of recurring animation or movement imparted to a menu item. In other words, the position of the marker 160 (and by extension, the position 260 of the tip of a digit on the racetrack surface 250) may be indicated by one of the menu items 155 changing color, changing font, becoming larger, becoming brighter, or being visually altered in comparison to the others of the menu items 155 in any of a number of ways to draw a user's eyes to it.

FIG. 3a also depicts an optional additional marker 165 that follows the location of the marker 160 and provides a visual "highlight" of which one of the four sides 150a-d the marker 160 is currently positioned within as a visual aid to enable a user's eyes to be more quickly directed to that one of the four sides 150a-d when looking at the racetrack menu 150. Though not specifically depicted, in other embodiments, the additional marker 165 may be implemented as a highlighting, change in color, change in background color, change in font, enlargement or other visual alteration made to all of the menu items 155 that are positioned in that one of the four sides 150a-d.

FIG. 3b depicts the manner in which the marker 160 may be dynamically resized as it is moved about the racetrack menu 150, especially in embodiments where the marker 160 is of a form that in some way overlaps or surrounds one of the menu items 155 at a time in order to take into account the different sizes of different ones of the menu items 155. More specifically, and as depicted in FIG. 3b, the numeral "3" has visibly smaller dimensions (i.e., occupies less space in the racetrack menu 150) than does the numeral "III" that is also present on the same racetrack menu 150. Thus, when the depicted form of the marker 160 (i.e., the "box" form of the marker 160 that has been discussed at length) is positioned on one or the other of these two particular ones of the menu items 155, the marker 160 is resized to be larger or smaller as needed to take into account the different sizes of these two particular ones of the menu items 155.

Figure 3C:
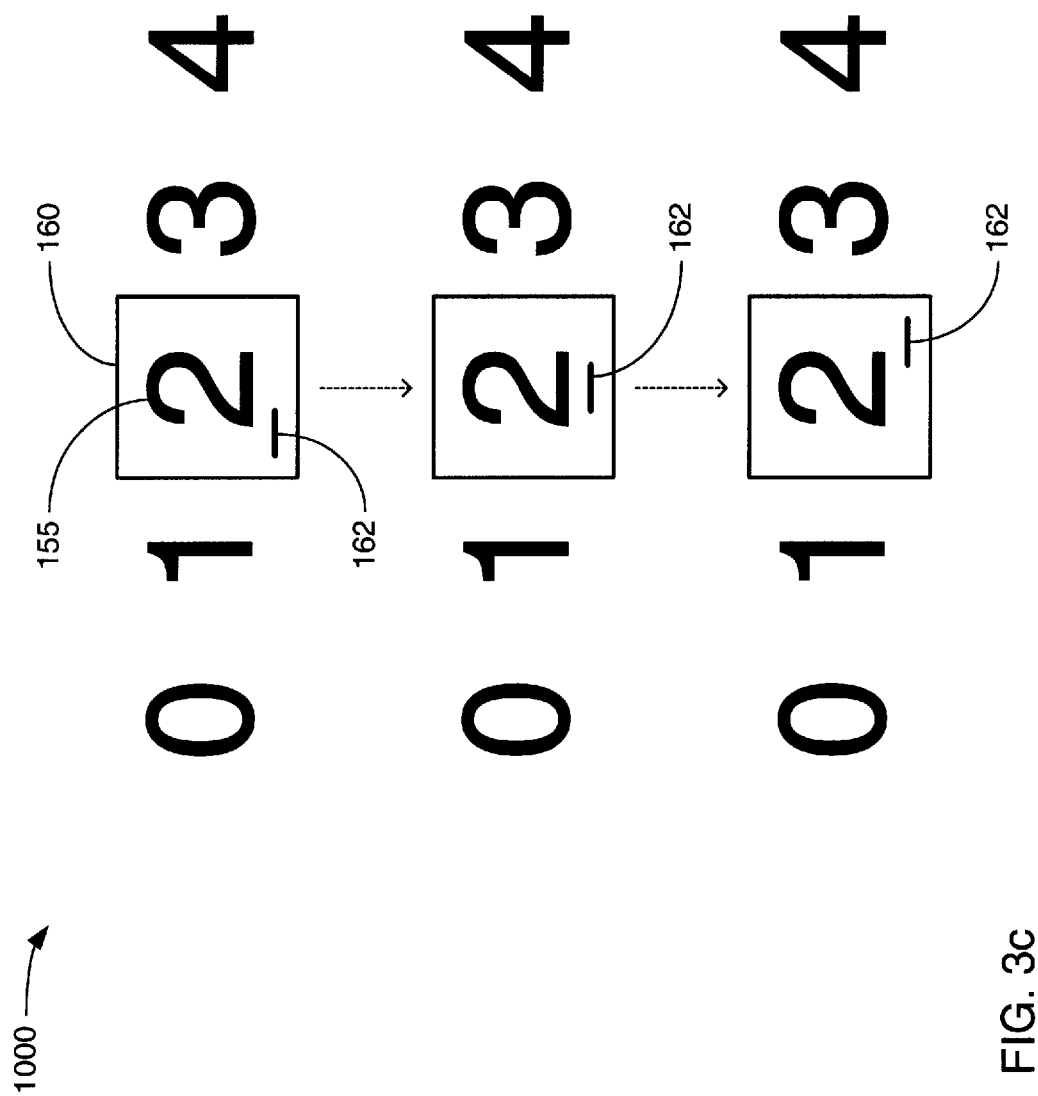

FIG. 3c also depicts an optional additional marker 162 that follows the location of the marker 160 and provides a more precise visual indication than does the marker 160 of the position 260 of the tip of a user's digit along a corresponding portion of the racetrack surface 250. As depicted, the marker 162 takes the form of what might be called a "dash" positioned along one of the edges of the box form of the marker 160. However, it should be noted that the marker 162 may take any of a variety of forms (e.g., a dot, a circle, an arrow, etc.). The provision of the marker 162 may be deemed desirable in embodiments where the marker 160 moves in the manner previously described in which the marker 160 "snaps" between adjacent ones of the menu items 155 such that the marker 160 does not, itself, provide as precise an indication of the position 260 of the tip of the user's digit. More specifically, FIG. 3c depicts a succession of views of a portion of the racetrack menu 150 on which menu items 155 taking the form of the numerals "1" through "5" are positioned. As can be seen in this depicted succession, the marker 162 provides a more precise indication of the movement of the position 260 of the tip of the user's digit along a portion of the racetrack surface 250 from left to right than does the marker 160 which remains on the one of the menu items 155 having the form of the numeral "2" on this portion of the racetrack menu 150. Such a higher precision indication of the position 260 of the tip of the user's digit may aid the user in improving their hand-eye coordination in operating the user interface 1000. Such a higher precision indication of the position 260 may also provide a user with some degree of reassurance that the user interface 1000 is responding to their actions (or more specifically, whatever processing device is incorporated into the user interface 1000 is responding to their actions) by seeing that the exact position 260 of the tip of their digit is being successfully detected.

Figure 3D:
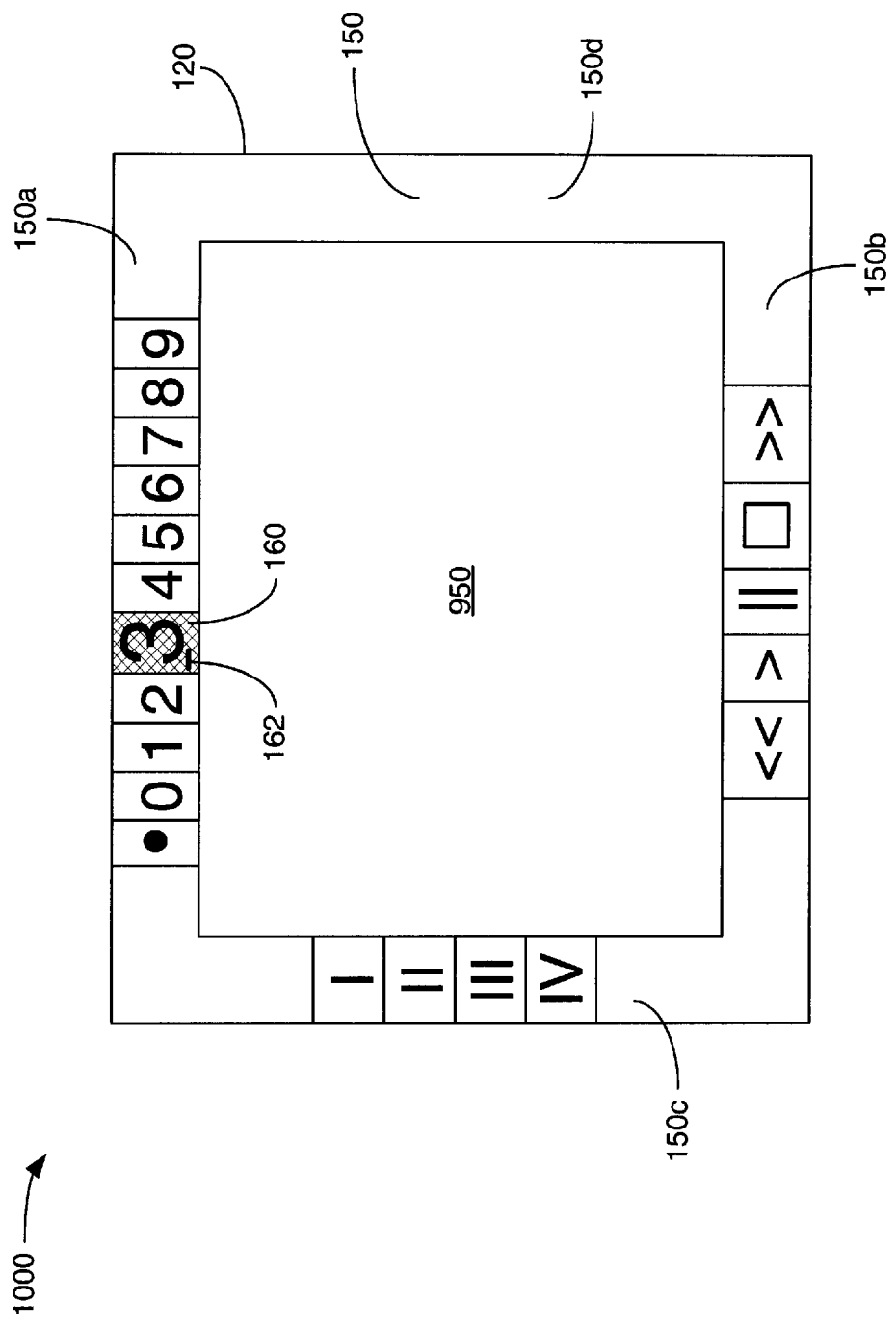

FIG. 3d depicts yet another alternate variation of the marker 160 in a variant of the user interface 1000 in which the racetrack menu 150 is divided into multiple segments, with each such segment serving as a background to one of the menu items 155. As depicted, the marker 160 is implemented as both a change in the color and/or brightness of one of those segments of the racetrack menu 150 and an enlarging of the graphical element representing the one of the menu items 155 (specifically, the numeral "3") positioned within that segment. As so depicted, the marker 160 might be said to have a form that is a variant of the earlier-depicted box, but a box that is made visible by having a color and/or brightness that differs from the rest of the racetrack menu 150, rather than a box that is made visible by a border or outline. FIG. 3d also depicts this alternate variation of the marker 160 being used in combination with the earlier-described additional marker 162 that provides a more precise indication of the position 260 of the tip of a user's digit along a portion of the racetrack surface 250.

FIG. 3d also depicts how this variant of the marker 160 is resized to accommodate the different sizes of the different ones of the menu items 155, although this resizing now corresponds to the differing dimensions of different ones of the segments into which the racetrack menu 150 is divided. In some variants, each of the segments may be individually sized to fit the visual size and shape of its corresponding one of the menu items 155, as depicted in FIG. 3d. Thus, since the numeral "3" of one of the menu items 155 is smaller in at least one dimension than the numeral "III" of another one of the menu items 155 (even with the numeral "3" being enlarged in font size), the segment of the racetrack menu 150 in which the numeral "3" is positioned is smaller than the segment in which the numeral "III" is positioned. However, in other variants, the segments filling at least one of the four sides 150a-d may all be sized based on the quantity of the menu items 155 positioned in that one of the four sides so as to divide that one of the four sides 150a-d into equal-sized segments. Where the ones of the menu items 155 along that one of the four sides 150a-d may change in response to a selection of an input or for other reasons, the size of the segments in that one of the four sides 150a-d may change in response to a change in quantity of the menu items 155 positioned in that one of the four sides 150a-d. Thus, for example, a reduction in the quantity of menu items 155 in that one of the four sides 150a-d results in each of its segments becoming larger in at least one dimension, and an increase in the quantity of menu items 155 results in that one of the four sides 150a-d results in each of its segments becoming smaller.

Figure 4:
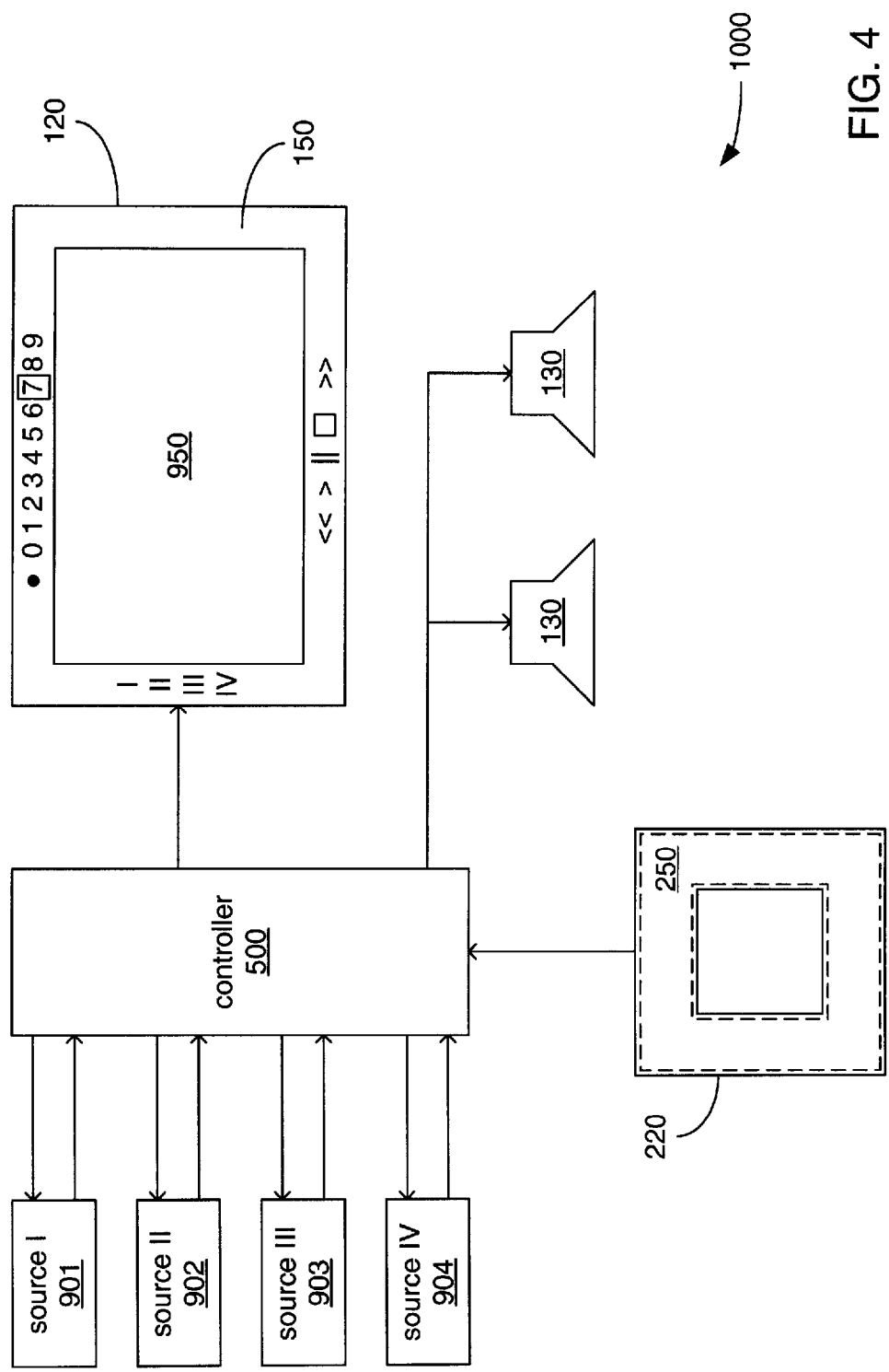
FIG. 4 is a block diagram of a possible architecture of the user interface of FIG. 1.

FIG. 4 is a block diagram of a possible architecture of the user interface 1000 by which a controller 500 receives input through a user's use of at least the racetrack surface 250 defined on at least a portion of a touch-sensitive surface 225 of the touch sensor 220 to which the controller 500 is coupled, and provides at least the racetrack menu 150 as a visual output to the user through at least the display element 120 to which the controller 500 is also coupled. In various possible embodiments, the controller 500 may be incorporated directly into the audio/visual device 100, or into another audio/visual device 900 coupled to the audio/visual device 100 and shown in dotted lines in FIG. 1. As also depicted in FIG. 1, the remote control 200 communicates wirelessly through the emission of radio frequency, infrared or other wireless emissions to whichever one of the audio/visual devices 100 and 900 incorporates the controller 500. However, as those skilled in the art will readily recognize, the remote control 200 may communicate through an electrically and/or optically conductive cable (not shown) in other possible embodiments. Alternatively and/or additionally, the remote control 200 may communicate through a combination of wireless and cable-based (optical or electrical) connections forming a network between the remote control 200 and the controller 500.

Figure 5:
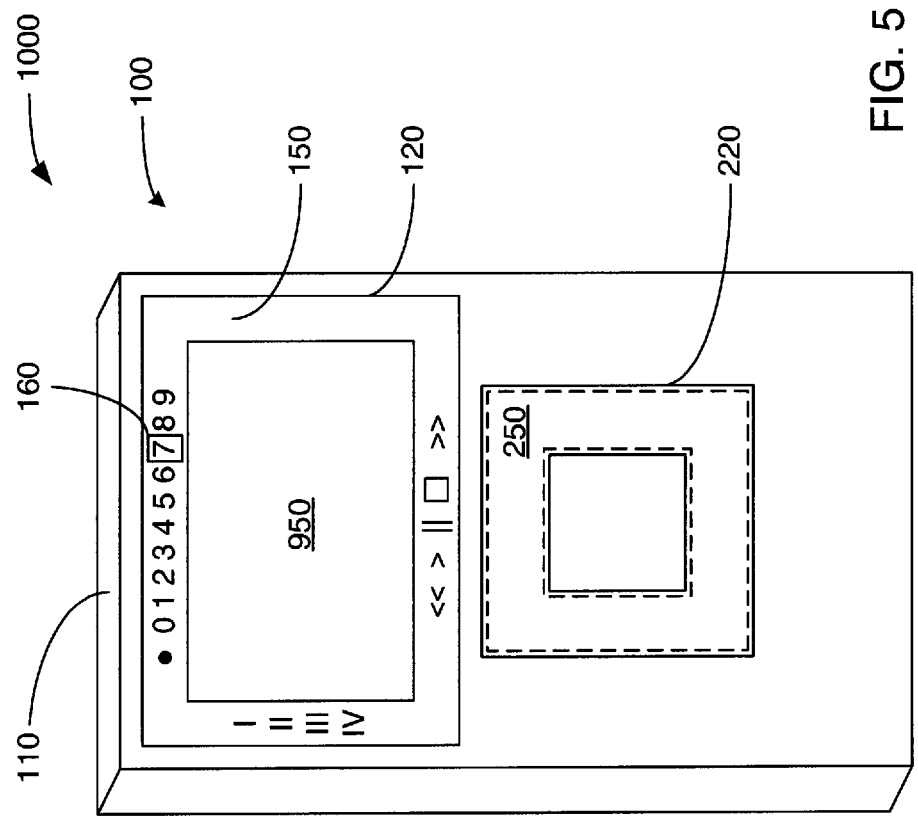
FIG. 5 is a perspective view of another embodiment of the user interface of FIG. 1 combining more of the features of the user interface into a single device.

Still other embodiments may incorporate the touch sensor 220 directly on a user accessible portion of one or both of the audio/visual devices 100 and 900, either in addition to or as an alternative to providing the touch sensor 220 on the remote control 200. Indeed, FIG. 5 depicts an alternate variant of the audio/visual device 100 having more of a portable configuration incorporating both the display element 120 displaying the racetrack menu 150 and the touch sensor 220 with the touch-sensitive surface 225 on which the racetrack surface 250 is defined. This alternative variant of the audio/visual device 100 may also incorporate the controller 500, such that much (if not substantially all) of the user interface 1000 is implemented solely by the audio/visual device 100.

Returning to FIG. 4, regardless of which audio/visual device incorporates the controller 500, the controller 500 incorporates multiple interfaces in the form of one or more connectors and/or one or more wireless transceivers by which the controller 500 is able to be coupled to one or more sources 901, 902, 903 and/or 904. Any such connectors may be disposed on the casing of whatever audio/visual device the controller 500 is incorporated into (e.g., the casing 110 of the audio/visual device 100 or a casing of the audio/visual device 900). In being so coupled, the controller 500 is able to transmit commands to one or more of the sources 901-904 to access and select audio/visual programs, and is able to receive audio/visual programs therefrom. Each of the sources 901-904 may be any of a variety of types of audio/visual device, including and not limited to, RF tuners (e.g., cable television or satellite dish tuners), disc media recorders and/or players, tape media recorders and/or players, solid-state or disk-based digital file players (e.g., a MP3 file player), Internet access devices to access streaming data of audio/visual programs, or docking cradles for portable audio/visual devices (e.g., a digital camera). Further, in some embodiments, one or more of the sources 901-904 may be incorporated into the same audio/visual device into which the controller 500 is incorporated (e.g., a built-in disc media player or built-in radio frequency tuner).

In embodiments where one of the sources 901-904 is not incorporated into the same audio/visual device as the controller 500, and where that one of the sources 901-904 is coupled to the controller 500 via an interface of the controller 500 employing a connector, any of a variety of types of electrical and/or optical signaling conveyed via electrically and/or optically conductive cabling may be employed. Preferably, a single cable is employed both in relaying commands from the controller 500 to that one of the sources 901-904 and in relaying audio/visual programs to the controller 500. However, combinations of cabling in which different cables separately perform these functions are also possible. Some of the possible forms of cabling able to relay both commands and audio/visual programs may conform to one or more industry standards, including and not limited to, Syndicat des Constructeurs d'Appareils Radiorecepteurs et Televiseurs (SCART) promulgated in the U.S. by the Electronic Industries Alliance (EIA) of Arlington, Va.; Ethernet (IEEE-802.3) or IEEE-1394 promulgated by the Institute of Electrical and Electronics Engineers (IEEE) of Washington, D.C.; Universal Serial Bus (USB) promulgated by the USB Implementers Forum, Inc. of Portland, Oreg.; Digital Visual Interface (DVI) promulgated by the Digital Display Working Group (DDWG) of Vancouver, Wash.; High-Definition Multimedia Interface (HDMI) promulgated by HDMI Licensing, LLC of Sunnyvale, Calif.; or DisplayPort promulgated by the Video Electronics Standards Association (VESA) of Milpitas, Calif. Other possible forms of cabling able to relay only one or the other of commands and audio/visual programs may conform to one or more industry standards, including and not limited to, RS-422 or RS-232-C promulgated by the EIA; Video Graphics Array (VGA) maintained by VESA; RC-5720C (more commonly called "Toslink") maintained by the Japan Electronics and Information Technology Industries Association (JEITA) of Tokyo, Japan; the widely known and used Separate Video (S-Video); or S-Link maintained by Sony Corporation of Tokyo, Japan.

In other embodiments where one of the sources 901-904 is not incorporated into the same audio/visual device as the controller 500, and where that one of the sources 901-904 is coupled to the controller 500 via a wireless transceiver, any of a variety of types of infrared, radio frequency or other wireless signaling may be employed. Preferably, a single wireless point-to-point coupling is employed both in relaying commands from the controller 500 to that one of the sources 901-904 and in relaying audio/visual programs to the controller 500. However, combinations of separate wireless couplings in which these functions are separately performed are also possible. Some of the possible forms of wireless signaling able to relay both commands and audio/visual programs may conform to one or more industry standards, including and not limited to, IEEE 802.11a, 802.11b or 802.11g promulgated by the IEEE; Bluetooth promulgated by the Bluetooth Special Interest Group of Bellevue, Wash.; or ZigBee promulgated by the ZigBee Alliance of San Ramon, Calif.

In still other embodiments where one of the sources 901-904 is not incorporated into the same audio/visual device as the controller 500, a combination of cabling-based and wireless couplings may be used. An example of such a combination may be the use of a cabling-based coupling to enable the controller 500 to receive an audio/visual program from that one of the sources 901-904, while an infrared transmitter coupled to the controller 500 may be positioned at or near the one of the sources 901-904 to wirelessly transmit commands via infrared to that one of the sources 901-904. Still further, although FIG. 4 depicts each of the sources 901-904 as being directly coupled to the controller 500 in a point-to-point manner, those skilled in the art will readily recognize that one or more of the sources 901-904 may be coupled to the controller 500 indirectly through one or more of the others of the sources 901-904, or through a network formed among the sources 901-904 (and possibly incorporating routers, bridges and other relaying devices that will be familiar to those skilled in the art) with multiple cabling-based and/or wireless couplings.

Some of the above-listed industry standards include specifications of commands that may be transmitted between audio/visual devices to control access to and/or control the playing of audio/visual programs, including most notably, SCART, IEEE-1394, USB, HDMI, and Bluetooth. Where such an industry standard for coupling the controller 500 to one or more of the sources 901-904 is employed, the controller 500 may limit the commands transmitted to one or more of the sources 901-904 to the commands specified by that industry standard and map one or more of those commands to corresponding ones of the menu items 155 such that a user is able to cause the controller 500 to send those commands to one or more of the sources 901-904 by selecting those corresponding ones of the menu items 155. However, where the benefit of such a standardized command set is unavailable, the controller 500 may employ any of a wide variety of approaches to identify one or more of the sources 901-904 to an extent necessary to "learn" what commands are appropriate to transmit and the manner in which they must be transmitted.

A user of the user interface 1000 may select one of the sources 901-904 as part of selecting an audio/visual program for being played by employing the racetrack surface 250 and the marker 160 to select one or more of the menu items 155 shown on the racetrack menu 150, such as the "I" through "IV" menu items 155 depicted as displayed by the controller 500 on the side 150c of the racetrack menu 150. Those menu items 155 depicted on the side 150c correspond to the sources 901 through 904, which are depicted as bearing the labels "source I" through "source IV" in FIG. 4. The controller 500 receives input from the touch sensor 220 indicating the contact of the user's digit with a portion of the racetrack surface 250, indicating movement of the position 260 of contact of the digit about the racetrack surface 250, and indicating the application of greater pressure by the user through that digit against the touch sensor 220 at the position 260 (wherever the position 260 is at that moment) when selecting one of the menu items 155. The selection of one of the sources 901-904 by the user causes the controller 500 to switch to receiving audio/visual programs from that one of the sources 901-904, and to be ready to display any visual portion in the display area 950 and acoustically output any audio portion through the acoustic drivers 130 (or whatever other acoustic drivers may be present and employed for playing audio/visual programs).

The selection of one of the sources 901-904 may further cause the controller 500 to alter the quantity and types of menu items 155 displayed on one or more of the sides 150a-d of the racetrack menu 150 such that the displayed menu items 155 more closely correspond to the functions supported by whichever one of the sources 901-904 that has been selected. This changing display of at least a subset of the menu items 155 enables the user to operate at least some functions of a selected one of the sources 901-904 by selecting one or more of the menu items 155 to thereby cause the controller 500 to transmit one or more commands corresponding to those menu items to the selected one of the sources 901-904. By way of example, where the one of the sources 901-904 with the ability to record an audio/visual program was previously selected, the racetrack menu 150 may include one or more menu items 155 that could be selected to cause the controller 500 to transmit a command to that previously selected one of the sources 901-904 to cause it to start recording an audio/visual program. However, if the user then selects another one of the sources 901-904 that does not have the ability to record an audio/visual program, then the controller 500 would alter the menu items 155 displayed on the racetrack menu 150 to remove one or more menu items associated with recording an audio/visual program. In this way, at least a subset of the menu items 155 displayed on the racetrack menu 150 are "modal" in nature, insofar as at least that subset changes with the selection of different ones of the sources 901-904.

The coupling and/or uncoupling of one or more of the sources 901-904 to and/or from whatever audio/visual device into which the controller 500 is incorporated may also cause the controller 500 to alter the quantity and/or types of menu items 155 that are displayed in another example of at least a subset of the menu items 155 being modal in nature. By way of example, the uncoupling of one of the sources 901-904 where that one of the sources 901-904 had been coupled through cabling may cause the controller 500 to remove the one of the menu items 155 by which that now uncoupled one of the sources 901-904 could be selected. Alternatively and/or additionally, where that uncoupled one of the sources 901-904 was already selected at the time of such uncoupling such that a subset of the menu items 155 is displayed that is meant to correspond to the functions able to be performed by that now uncoupled one of the sources 901-904, the controller 500 may respond to such an uncoupling by autonomously selecting one of the other of the sources 901-904 and altering the subset of the menu items 155 to correspond to the functions able to be performed by that newly selected one of the sources 901-904. In contrast, and by way of another example, the uncoupling of one of the sources 901-904 where that one of the sources 901-904 had been wirelessly coupled may or may not cause the controller 500 to remove the one of the menu items 155 by which that now uncoupled one of the sources 901-904 could be selected. If there is a mechanism provided in the chosen form of wireless communications used in the coupling that indicates that the uncoupling is due simply to that one of the sources 901-904 entering into a low-power or "sleep" mode, then it may be that no change is made by the controller 500 to the menu items 155 that are displayed, especially if the form of wireless communications used allows the controller 500 to signal that one of the sources 901-904 to "wake up" in response to the user selecting one of the menu items 155 that is associated with it. However, if no such mechanism to indicate the circumstances of an uncoupling are available, then the uncoupling may well result in an alteration or removal of at least some of the menu items 155 displayed on the racetrack menu 150. Where a previously uncoupled one of the sources 901-904 is subsequently coupled, once again, regardless of the type of coupling, the controller 500 may be caused to automatically select that now coupled one of the sources 901-904. This may be done based on an assumption that the user has coupled that source to whatever audio/visual device into which the controller 500 is incorporated with the intention of immediately playing an audio/visual program from it.

While at least some of the menu items 155 may be modal in nature such that they are apt to change depending on the selection and/or condition of one or more of the sources 901-904, others of the menu items 155 may not be modal in nature such that they are always displayed whenever the racetrack menu 150 is displayed. More specifically, where one or more of the sources 901-904 are incorporated into the same audio/visual device as the controller 500, the ones of the menu items 155 associated with those sources may remain displayed in the racetrack menu 150, regardless of the occurrences of many possible events that may cause other menu items 155 having a modal nature to be displayed, to not be displayed, or to be displayed in some altered form. By way of example, where a radio frequency tuner is incorporated into the same audio/visual device into which the controller 500 is incorporated, then a subset of the menu items 155 associated with selecting a radio frequency channel (e.g., the decimal point and numerals "0" through "9" depicted as displayed within the side 150a) may be a subset of the menu items 155 that is always displayed in the racetrack menu 150. It may be that the selection of any menu item of such a subset of the menu items 155 may cause the controller 500 to automatically switch the selection of a source of audio/visual programs to the source associated with those menu items 155. Thus, in the example where an audio/visual device incorporates a radio frequency tuner and menu items 155 associated with selecting a radio frequency channel are always displayed, the selection of any one of those menu items would cause the controller 500 to automatically switch to that radio frequency tuner as the source from which to receive an audio/visual program if that tuner were not already selected as the source. By way of another example, one or more of the menu items 155 associated with selecting a source of audio/visual programs (e.g., the roman numerals "I" through "IV" depicted as displayed within the side 150c) may be menu items that are always displayed in the racetrack menu 150.

Regardless of what source is selected or how the source is selected, if an audio/visual program received by the controller 500 from that source has a visual portion, then the controller 500 causes that visual portion to be displayed in the display area 950. As has so far been depicted and described, the racetrack menu 150 has a rectilinear configuration with the four sides 150a-d that are configured to surround or overlie edges of the display area 950. However, in some embodiments, it may be that the racetrack menu 150 is not always displayed such that what is shown on the display element 120 of the audio/visual device 100 could be either the display area 950 surrounded by the racetrack menu 150, or the display area 950 expanded to fill the area otherwise occupied by the racetrack menu 150.

Figure 6:
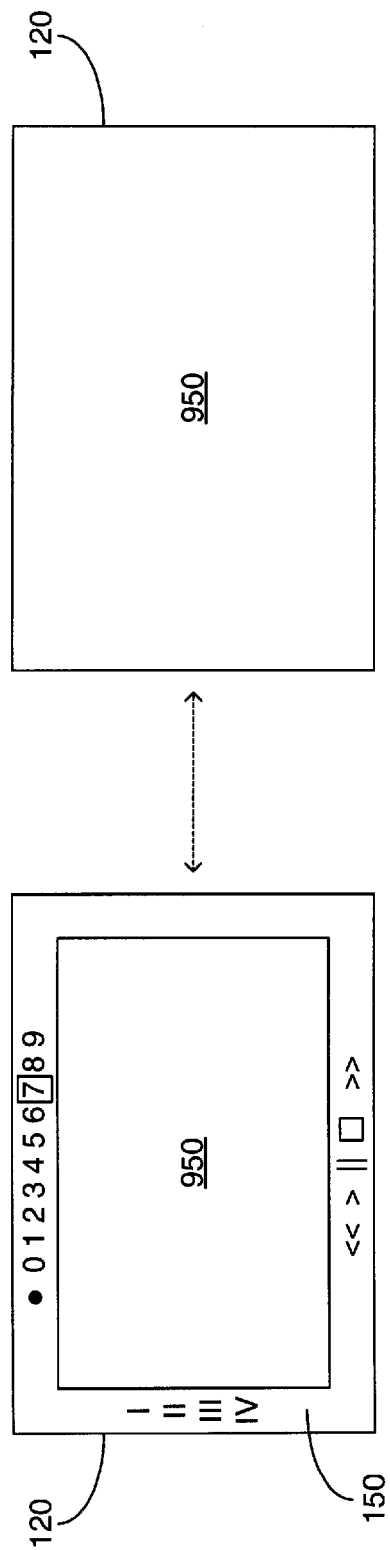
FIG. 6 depicts a possibility of switching between displaying and not displaying the racetrack menu of the user interface of FIG. 1.

As depicted in FIG. 6, what is shown on the display element 120 could toggle between these two possibilities, and this toggling could occur in response to observed activity and/or a lack of observed activity in the operation of at least the racetrack surface 250. More specifically, on occasions where no indication of contact by a user's digit on the racetrack surface 250 has been received by the controller 500 for at least a predetermined period of time, the controller 500 may provide the display element 120 with an image that includes substantially nothing else but the display area 950 such that a visual portion of an audio visual program is substantially the only thing shown on the display element 120. However, once the controller 500 has received an indication of activity such as the tip of a digit making contact with racetrack surface 250, the controller 500 then provides the display element 120 with an image that includes a combination of the display area 950 and the racetrack menu 150.

In some embodiments, at a time when both the display area 950 and the racetrack menu 150 are displayed, the controller 500 reduces the size of the display area 950 to make room around the edges of the display area 950 for the display of the racetrack menu 150 on the display element 120, and in so doing, may rescale the visual portion (if there is one) of whatever audio/visual program may be playing at that time. In other embodiments, the display area 950 is not resized, and instead, the racetrack menu 150 is displayed in a manner in which the racetrack menu 150 overlies edge portions of the display area 950 such that edge portions of any visual portion of an audio/visual program are no longer visible. However, in those embodiments in which the racetrack menu overlies edge portions of the display area 950, the racetrack menu 150 may be displayed in a manner in which at least some portions of the racetrack menu have a somewhat "transparent" quality in which the overlain edge portions of any visual portion of an audio/visual program can still be seen by the user "looking through" the racetrack menu 150. As will be familiar to those skilled in the art, this "transparent" quality may be achieved through any of a number of possible approaches to combining the pixels of the image of the racetrack menu 150 with pixels of the overlain portion of any visual portion of an audio/visual program (e.g., by averaging pixel color values, alternately interspersing pixels, or bitwise binary combining of pixels with a pixel mask).

Along with combining the visual display of the display area 950 and the racetrack menu 150, the controller 500 may also combine audio associated with operation of the user interface 1000 with an audio portion (if present) of an audio/visual program being played. More specifically, "click" sounds associated with the user pressing the racetrack surface 250 defined on a surface of the touch sensor 220 with greater pressure and/or with the "snapping" of the marker 160 between adjacent ones of the menu items 155 may be combined with whatever audio portion is acoustically output as part of the playing of an audio/visual program.

In some embodiments, at a time when the racetrack menu 150 is not displayed (e.g., at a time when only the display area 950 is displayed), the controller 500 may do more than simply cause the racetrack menu 150 to be displayed in response to a user touching a portion of the racetrack sensor 250. More specifically, in addition to causing the racetrack menu 150 to be displayed, the controller 500 may take particular actions in response to particular ones of the sides 250a-d of the racetrack surface 250 being touched by a user at a time when the racetrack menu 150 is not being displayed. By way of example, at a time when the racetrack menu 150 is not being displayed, the detection of a touch to the side 250d may cause a command to be sent to one of the sources 901-904 to provide an on-screen guide concerning audio/visual programs able to be provided by that source, where such a guide would be displayed in the display area 950, with edges of the display area 950 being either surrounded or overlain by the racetrack menu 150 as has been previously described.

In a variation of such embodiments, it may be that causing the racetrack menu 150 to be displayed requires both a touch and some minimum degree of movement of the tip of a user's digit on the racetrack surface 250 (i.e., a kind of "touch-and-drag" or "wiping" motion across a portion of the racetrack surface 250), while other particular actions are taken in response to where there is only a touch of a tip of a user's digit on particular ones of the sides 250a-d of the racetrack sensor 250. By way of example, while the racetrack menu 150 is not displayed, touching the side 250a may cause a command to be sent to a source to turn that source on or off, and touching the side 250b may cause an audio portion of an audio/visual program to be muted, while both touching and moving a digit across a portion of the racetrack surface 250 in a "wiping" motion is required to enable the display and use of the racetrack menu 150.

Figure 7A:
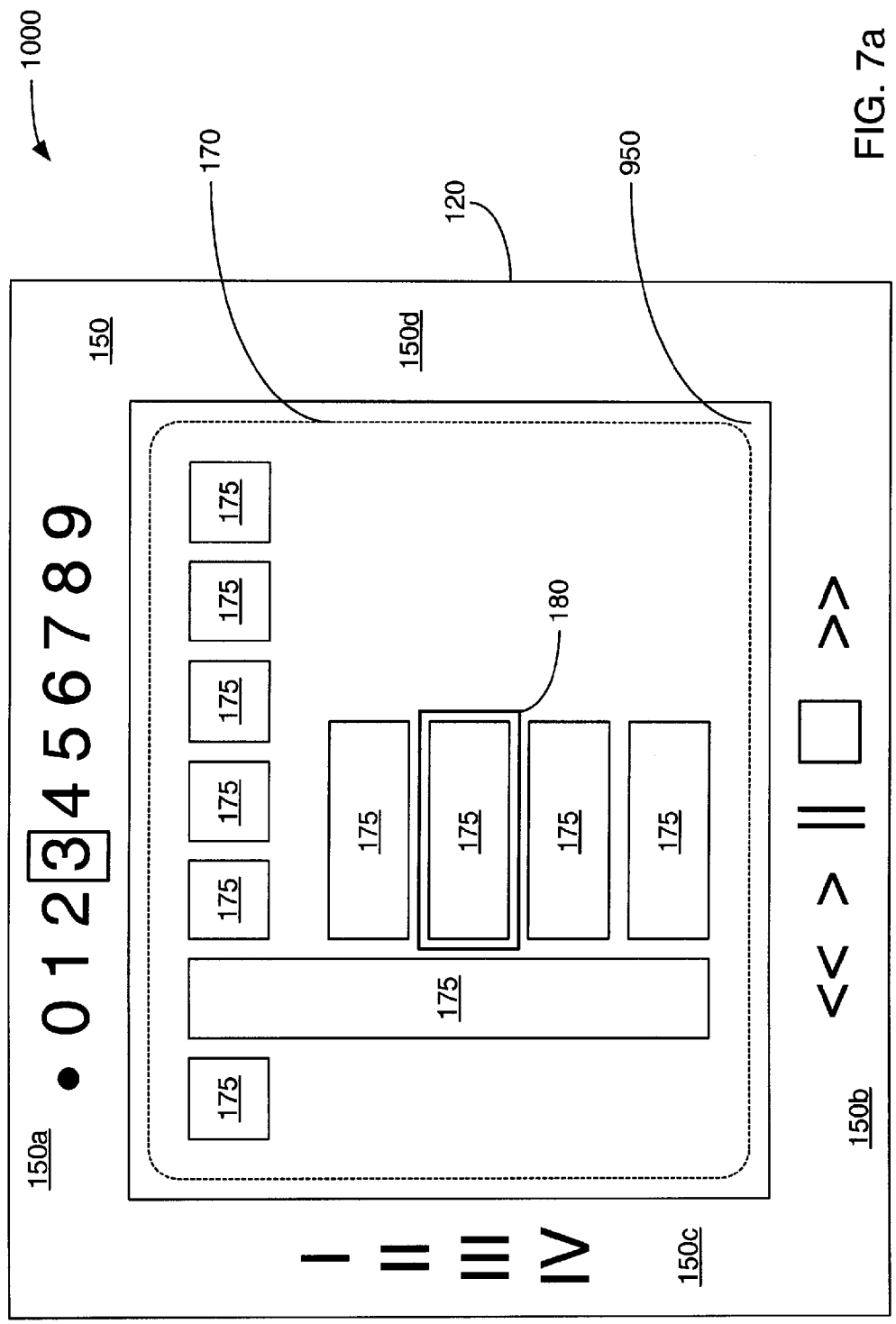
FIGS. 7a and 7b, together, depict additional possible details of the user interface of FIG. 1.
Figure 7B:
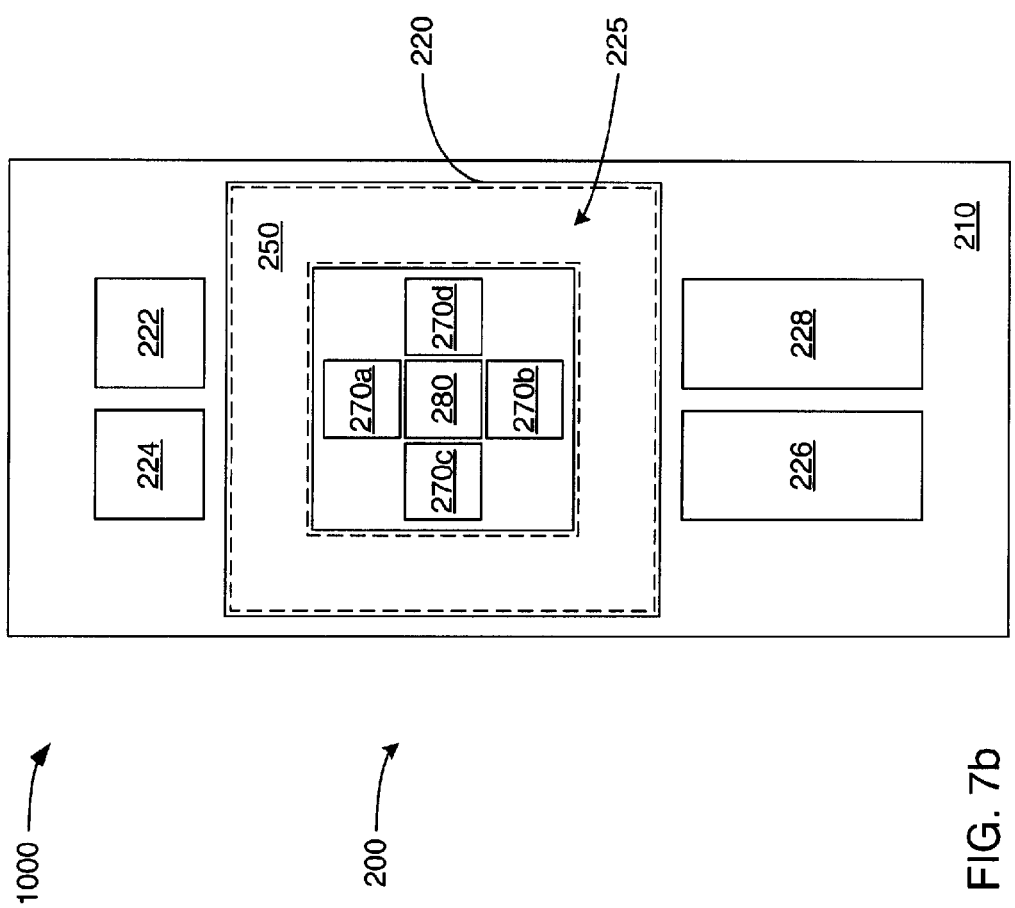

FIGS. 7a and 7b, taken together, depict additional features that may be incorporated into the user interface 1000. Where a selected one of the sources 901-904 displays its own on-screen menu 170 (e.g., a guide concerning audio/visual programs available from that source), either in place of a visual portion of an audio/visual program or overlying a visual portion of an audio/visual program, some embodiments of the user interface 1000 may be augmented to support at least partly integrating the manner in which a user would navigate such an on-screen menu 170 into the user interface 1000. In such embodiments, the touch sensor 220, with its ring shape (whether that ring shape is a rectangular ring shape, or a ring shape of a different geometry), may be configured to surround a set of controls for use in navigating the on-screen menu 170 just as the racetrack menu 150 surrounds the on-screen menu 170, itself.

In particular, FIG. 7b depicts the manner in which the touch sensor 220 disposed on the casing 210 of the remote control 200 of FIG. 1 may surround navigation buttons 270a, 270b, 270c and 270d, as well as a selection button 280, that are also disposed on the casing 210. In alternate variants, other forms of one or more manually-operable controls may be surrounded by the touch sensor 220, in addition to or in place of the navigation buttons 270a-d and the selection button 280, including and not limited to, a joystick, or a four-way rocker switch that may either surround a selection button (such as the selection button 280) or be useable as a selection button by being pressed in the middle. As a result of the ring shape of the touch sensor 220 being employed to surround the navigation buttons 270a-d and the selection buttons 280, a nested arrangement of concentrically located manually operable controls is created. FIG. 7a depicts a form of possible on-screen menu that will be familiar to those skilled in the art, including various menu items 175 that may be selected via the selection button 280, and a marker 180 that may be moved by a user among the menu items 175 via the navigation buttons 270a-d. The concentrically nested arrangement of manually-operable controls surrounded by the racetrack surface 250 defined on the touch-sensitive surface 225 of the touch sensor 220 that is disposed on the casing 210 of the remote control 200 corresponds to the similarly nested arrangement of the on-screen menu 170 surrounded by the racetrack menu 150 that is displayed on the display element 120.

Figure 8:
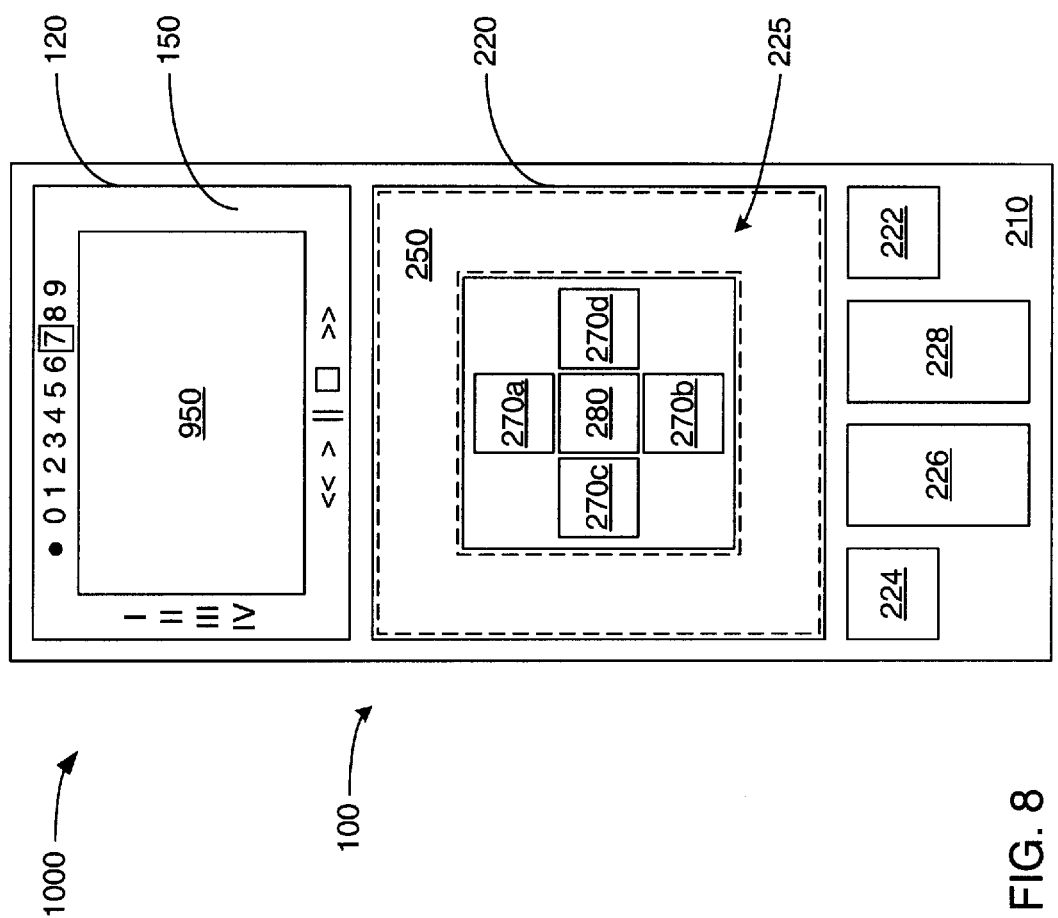
FIG. 8 is a perspective view of the embodiment of the user interface of FIG. 5, additionally incorporating the possible details of FIGS. 7a and 7b.

FIG. 7b also depicts additional controls 222, 224, 226 and 228 that may be employed to perform particular functions where it may be deemed desirable to provide at least some degree of functionality in a manner that does not require the selection of menu items to operate. In one possible variant, the controls 222, 224, 226 and 228 are operable as a power button, a mute button, volume rocker switch and a channel increment/decrement rocker switch, respectively. FIG. 8 depicts a variant of the handheld form of the audio/visual device 100 depicted in FIG. 5 in which the touch sensor 220 is positioned so as to surround the navigation buttons 270a-d and the selection button 280, and in which this variant of the handheld form of the audio/visual device 100 may further incorporate the controls 222, 224, 226 and 228.

Figure 9:
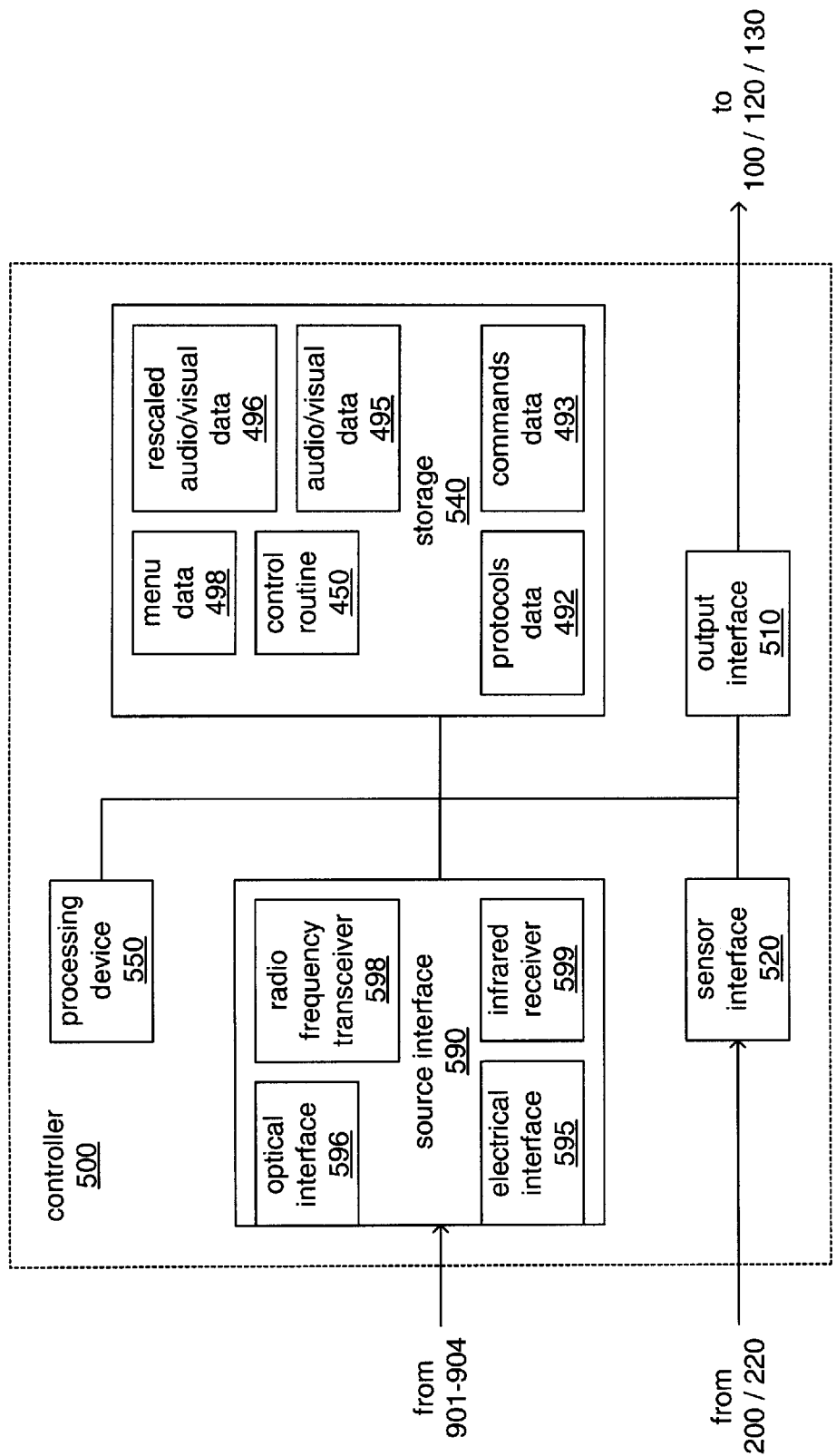
FIG. 9 is a block diagram of the controller of the architecture of FIG. 4.

FIG. 9 is a block diagram of a possible architecture of the controller 500 in which the controller 500 incorporates an output interface 510, a sensor interface 520, a storage 540, a processing device 550 and a source interface 590. The processing device 550 is coupled to each of the output interface 510, the sensor interface 520, the storage 540 and the source interface 590 to at least coordinate the operation of each to perform at least the above-described functions of the controller 500.

The processing device 550 may be any of a variety of types of processing device based on any of a variety of technologies, including and not limited to, a general purpose central processing unit (CPU), a digital signal processor (DSP), a microcontroller, or a sequencer. The storage 540 may be based on any of a variety of data storage technologies, including and not limited to, any of a wide variety of types of volatile and nonvolatile solid-state memory, magnetic media storage, and/or optical media storage. It should be noted that although the storage 540 is depicted in a manner that is suggestive of it being a single storage device, the storage 540 may be made up of multiple storage devices, each of which may be based on different technologies.

Each of the output interface 510, the sensor interface 520 and the source interface 590 may employ any of a variety of technologies to enable the controller 500 to communicate with other devices and/or other components of whatever audio/visual device into which the controller 500 is incorporated. More specifically, where the controller 500 is incorporated into an audio/visual device that also incorporates one or both of a display element (such as the display element 120) and at least one acoustic driver (such as the acoustic drivers 130), the output interface 510 may be of a type able to directly drive a display element with signals causing the display of the racetrack menu 150 and the display area 950 to display visual portions of audio/visual programs, and/or able to directly drive one or more acoustic drivers to acoustically output audio portions of audio/visual programs. Alternatively, where one or both of a display element and acoustic drivers are not incorporated into the same audio/visual device into which the controller 500 is incorporated, the output interface 510 may be of a type employing cabling-based and/or a wireless signaling (perhaps signaling conforming to one of the previously listed industry standards) to transmit a signal to another audio/visual device into which a display element and/or acoustic drivers are incorporated (e.g., the audio/visual device 100).

Similarly, where the controller 500 is incorporated into an audio/visual device into which the touch sensor 220 is also incorporated, the sensor interface 520 may be of a type able to directly receive electrical signals emanating from the touch sensor 220. With such a more direct coupling, the sensor interface 520 may directly monitor a two-dimensional array of touch-sensitive points of the touch-sensitive surface 225 of the touch sensor 220 for indications of which touch-sensitive points are being touched by a tip of a user's digit, and thereby enable the processing device 550 to employ those indications to directly determine where the touch-sensitive surface 225 is being touched. Thus, a determination of whether or not the tip of the digit is touching a portion of the racetrack surface 250 and/or the position 260 by the processing device 550 may be enabled. However, where the controller 500 is incorporated into a device into which the touch sensor 220 is not also incorporated (e.g., the controller 500 is incorporated into the audio/visual device 100 and the touch sensor is incorporated into the remote control 200), the sensor interface 520 may be of a type able to receive cabling-based and/or wireless signaling transmitted by that other device (e.g., infrared signals emitted by the remote control 200). With such a more remote coupling, circuitry (not shown) that is co-located with the touch sensor 220 may perform the task of directly monitoring a two-dimensional array of touch-sensitive points of the touch-sensitive surface 225, and then transmit indications of which touch-sensitive points are being touched by the tip of a user's digit to the sensor interface 520.

Although it is possible that the audio/visual device into which the controller 500 is incorporated may not incorporate any sources (such as the sources 901-904) from which the controller 500 receives audio/visual programs, it is deemed more likely that the audio/visual device into which the controller 500 is incorporated will incorporate one or more of such sources in addition to being capable of receiving audio/visual programs from sources not incorporated into the same audio/visual device. By way of example, it is envisioned that the controller 500 may be incorporated into an audio/visual device into which a radio frequency tuner and/or an Internet access device is also incorporated to enable access to audio/visual programs for selection and playing without the attachment of another audio/visual device, while also having the capability of being coupled to another audio/visual device to receive still other audio/visual programs. In other words, it is envisioned that the controller 500 may well be incorporated into an audio/visual device that is at least akin to a television, whether portable (e.g., as depicted in FIG. 5) or stationary (e.g., as depicted in FIG. 1). Therefore, although the source interface 590 may have any of a number of configurations to couple the controller 500 to any of a number of possible sources, it is envisioned that the source interface 590 will be configured to enable the controller 500 to be coupled to at least one source that is also incorporated into the same audio/visual device into which the controller 500 is incorporated, and to also enable the controller 500 to be coupled to at least one source that is not incorporated into the same audio/visual device.

Thus, the source interface 590 incorporates one or more of an electrical interface 595, an optical interface 596, a radio frequency transceiver 598 and/or an infrared receiver 599. The electrical interface 595 (if present) enables the source interface 590 to couple the controller 500 to at least one source, whether incorporated into the same audio/visual device as the controller 500, or not, to receive electrical signals (e.g., Ethernet, S-Video, USB, HDMI, etc.) conveying an audio/visual program to the controller 500. The optical interface 596 (if present) enables the source interface 590 to couple the controller 500 to at least one source to receive optical signals (e.g., Toslink) conveying an audio/visual program to the controller 500. The radio frequency transceiver 598 (if present) enables the source interface 590 to wirelessly couple the controller 500 to at least one other audio/visual device functioning as a source to receive radio frequency signals (e.g., Bluetooth, a variant of IEEE 802.11, ZigBee, etc.) conveying an audio/visual program to the controller 500 from that other audio/visual device. The infrared receiver 599 (if present) enables the source interface 590 to wirelessly couple the controller 500 to at least one other audio/visual device functioning as a source to receive infrared signals conveying an audio/visual program to the controller 500 from that other source. It should be noted that although the output interface 510 and the sensor interface 520 are depicted as separate from the source interface 590, it may be deemed advantageous, depending on the nature of the signaling supported, to combine one or both of the output interface 510 and the sensor interface 520 with the source interface 590.

Stored within the storage 540 are one or more of a control routine 450, a protocols data 492, a commands data 493, an audio/visual data 495, a rescaled audio/visual data 496, and menu data 498. Upon being executed by the processing device 550, a sequence of instructions of the control routine 450 causes the processing device 550 to coordinate the monitoring of the touch sensor 220 for user input, the output of the racetrack menu 150 to a display element (e.g., the display element 120), the selection of a source of an audio/visual program to be played, and one or both of the display of a visual portion of an audio/visual program on a display element on which the racetrack menu 150 is also displayed and the acoustic output of an audio portion of the audio/visual program via one or more acoustic drivers (e.g., the acoustic drivers 130).

Upon execution, the control routine 450 causes the processing device 550 to operate the sensor interface 520 to await indications of a user placing a tip of a digit in contact with a portion of the racetrack surface 250 defined on a surface of the touch sensor 220, moving that digit about the racetrack surface 250 and/or applying greater pressure at the position 260 on the racetrack surface 250 to make a selection. Upon receiving an indication of activity by the user involving the racetrack surface 250, the processing device 550 may be caused to operate the output interface 510 to display the racetrack menu 150 with one or more of the menu items 155 positioned thereon and surrounding the display area 950 via a display element, if the racetrack menu 150 is not already being displayed. The processing device 550 is further caused to display and position at least the marker 160 on the racetrack menu 150 in a manner that corresponds to the position 260 of the user's digit on the racetrack surface 250. Further, in response to the passage of a predetermined period of time without receiving indications of activity by the user involving the racetrack surface 250, the processing device 550 may be caused to operate the output interface 510 to cease displaying the racetrack menu 150, and to display substantially little else on a display element than the display area 950.

Upon execution, the control routine 450 causes the processing device 550 to operate the sensor interface 520 to await an indication of a selection of a menu item 155 that corresponds to selecting a source from which the user may wish an audio/visual program to be provided for playing, and may operate the source interface 590 to at least enable receipt of an audio/visual program from that selected source. Where an audio/visual program is received, the processing device 550 may be further caused to buffer audio and/or visual portions of the audio/visual program in the storage 540 as the audio/visual data 495. In embodiments in which a visual portion of an audio/visual program is rescaled to be displayed in the display area 950 at a time when the display area 950 is surrounded by the racetrack menu 150, the processing device 550 may be further caused to buffer the rescaled form of the visual portion in the storage 540 as the rescaled audio/visual program data 496.

Upon execution, the control routine 450 causes the processing device 550 to operate the sensor interface 520 to await an indication of a selection of a menu item 155 corresponding to the selection of a command (e.g., "play" or "record" commands, numerals or other symbols specifying a radio frequency channel to tune, etc.) to be transmitted to an audio/visual device serving as a source, and may operate the source interface 590 to transmit a command to that audio/visual device (e.g., one of sources 901-904) that corresponds to a menu item 155 that has been selected. In transmitting that command, the processing device 550 may be further caused to refer to the protocols data 492 for data concerning sequences of signals that must be transmitted by the source interface 590 as part of a communications protocol in preparation for transmitting the command, and/or the processing device 550 may be further caused to refer to the commands data 493 for data concerning the sequence of signals that must be transmitted by the source interface 590 as part of transmitting the command. As will be familiar to those skilled in the art, some of the earlier listed forms of coupling make use of various protocols to organize various aspects of commands and/or data that are conveyed, including and not limited to, Ethernet, Bluetooth, IEEE-1394, USB, etc. In support of the processing device 550 responding to the selection of various ones of the menu items 155, the processing device 550 is further caused to store data correlating at least some of the various menu items with actions to be taken by the processing device 550 in response to their selection by the user in the storage 540 as the menu data 498.

Amidst operating the source interface 590 to enable receipt of an audio/visual program from a source selected by the user, the processing device 550 may be caused to operate the output interface 510 to alter the quantity and/or type of menu items 155 that are displayed at various positions on the racetrack menu 150. In so doing, the processing device 550 may be further caused to store information concerning the size, shape, color and other characteristics of the racetrack menu 150, at least some of the graphical representations of the menu items 155, and/or at least one graphical representation of the marker 160 in the storage 540 as part of the menu data 498.

Figure 10A:
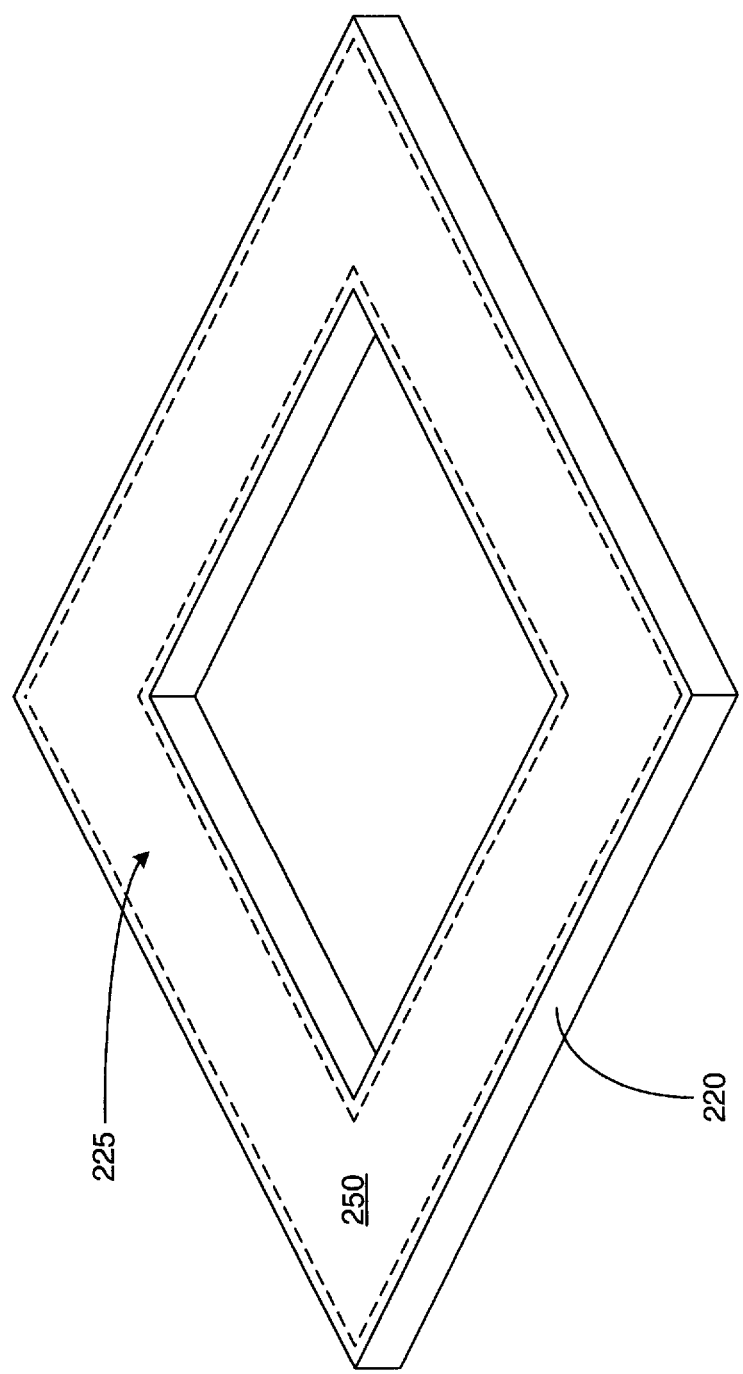
FIGS. 10a and 10b, together, depict possible variants of the touch sensor employed in the user interface of FIG. 1.
Figure 10B:
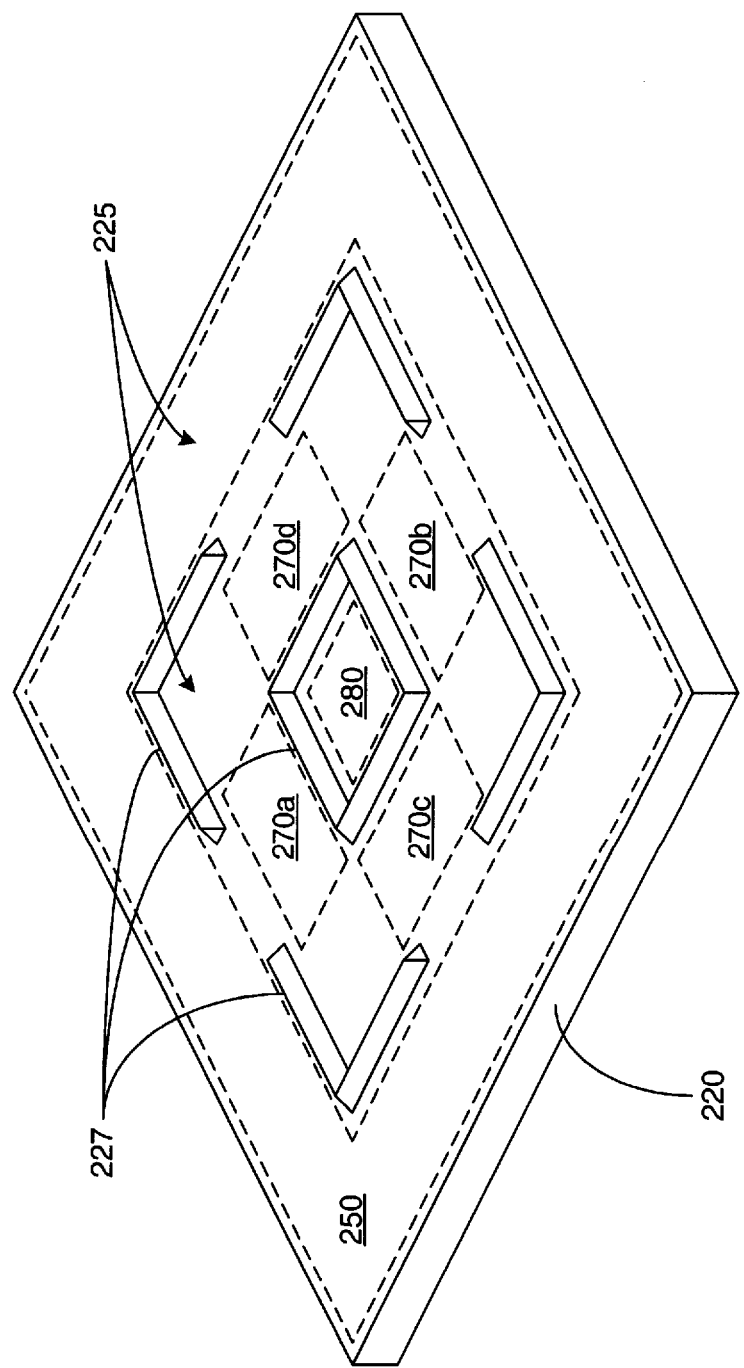

FIGS. 10*a* and 10*b*, taken together, depict and contrast two variants of the touch sensor 220. Both variants are depicted in perspective as distinct touch-sensitive devices that are typically mounted within a recess of a casing of a device, including either the casing 110 of any variant of the audio/visual device 100 or the casing 210 of any variant of the remote control 200. However, as those skilled in the art will readily recognize, other touch-sensitive device technologies may yield variants of the touch-sensitive device 220 that are film-like overlays that may be positioned to overlie a portion of a casing or of a circuitboard of a device. The discussion that follows is centered more on the shape and utilization of the touch-sensitive surface 225 of the touch sensor 220, and not on the touch-sensitive technology employed.

FIG. 10*a* depicts the variant of the touch sensor 220 having the ring shape that has been discussed above at length that permits other manually-operable controls (e.g., the navigation buttons 270*a-d* and the selection button 280) to be positioned in a manner in which they are surrounded by the ring shape of the touch sensor 220. As has already been discussed, the ring shape of this variant of the touch sensor 220 provides a form of the touch-sensitive surface 225 that is bounded by the ring shape of the touch sensor 220, and this in turn defines the ring shape of the racetrack surface 250 (where the racetrack surface 250 is defined on the touch-sensitive surface 225 to encompass substantially all of the touch-sensitive surface 225). Once again, although this variant of the touch sensor 220 is depicted as having a rectangular ring shape having four sides, other embodiments are possible in which the touch sensor 220 has a ring shape of a different geometry, such as a circular ring shape, an oval ring shape, a hexagonal ring shape, etc.

FIG. 10b depicts an alternate variant of the touch sensor 220 having a rectangular shape that provides a continuous form of the touch-sensitive surface 225 that is bounded by this rectangular shape (i.e., there is no "hole" formed through the touch-sensitive surface 225). This rectangular shape more easily enables more than the ring shape of the racetrack surface 250 to be defined on the touch-sensitive surface 225 in a manner in which the racetrack surface 250 encompasses only a portion of the touch-sensitive surface 225 and leaves open the possibility of one or more other surfaces that serve other functions also being defined on thereon. In this alternate variant, the ring shape of the racetrack surface 250 may be defined by a processing device executing a sequence of instructions of a routine, such as the processing device 550 executing the control routine 450 in FIG. 9. In other words, the location of the racetrack surface 250 may be defined by a processing device first being provided with indications of which touch-sensitive points of an array of touch-sensitive points making up the touch-sensitive surface 225 are being touched by a tip of a user's digit, and second treating some of those touch-sensitive points as belonging to the racetrack surface 250 and others of those touch-sensitive points as belonging to other surfaces that are defined on the touch-sensitive surface 225 (and which serve other functions).

Alternatively and/or additionally, one or more ridges 227 and/or grooves (not shown) may be formed in the touch-sensitive surface 225 to at least provide a tactile guide as to where the racetrack surface 250 is defined on the touch-sensitive surface 225. Such ridges 227 may be formed integrally with the touch-sensitive surface 225, may be formed as part of a casing on which the touch sensor 220 is disposed, or may be adhered to the touch-sensitive surface 225. Further, such ridges 227 and/or grooves (not shown) may coincide with locations on the touch-sensitive surface 225 at which the touch sensor 220 is incapable of detecting the touch of a tip of a digit (i.e., the touch-sensitive surface 225 may be made up of multiple separate touch-sensitive portions, of which one is a portion having a ring shape where the racetrack surface 250 is defined).

More specifically, and as depicted in dotted lines in FIG. 10b, the racetrack surface 250 is defined on the touch-sensitive surface 225 so as to be positioned about the periphery of the touch-sensitive surface 225 such that the ring shape of the racetrack surface 250 surrounds the remainder of the touch-sensitive surface 225. As also depicted, at least a portion of the touch-sensitive surface 225 that is surrounded by the racetrack surface 250 may be employed to provide the equivalent function of other manually-operable controls, such as the navigation buttons 270a-d and the selection button 280. In other words, the navigation buttons 270a-d and the selection button 280 may be implemented as navigation surfaces and a selection surface, respectively, defined on the touch-sensitive surface 225 of the touch sensor 220 (perhaps by a processing device executing a sequence of instructions), along with the racetrack surface 250.

It should be noted that although both of the variants of the touch sensor 220 have been depicted in FIGS. 10a and 10b as having rectangular shapes with right angle corners, either variant may alternatively have rounded corners. Indeed, where such a variant of the touch sensor 220 has one or more of the ridges 227 and/or grooves (not shown), such ones of the ridges 227 and/or grooves may also have rounded corners, despite being depicted as having right angle corners in FIGS. 10a and 10b.

Figure 11A:
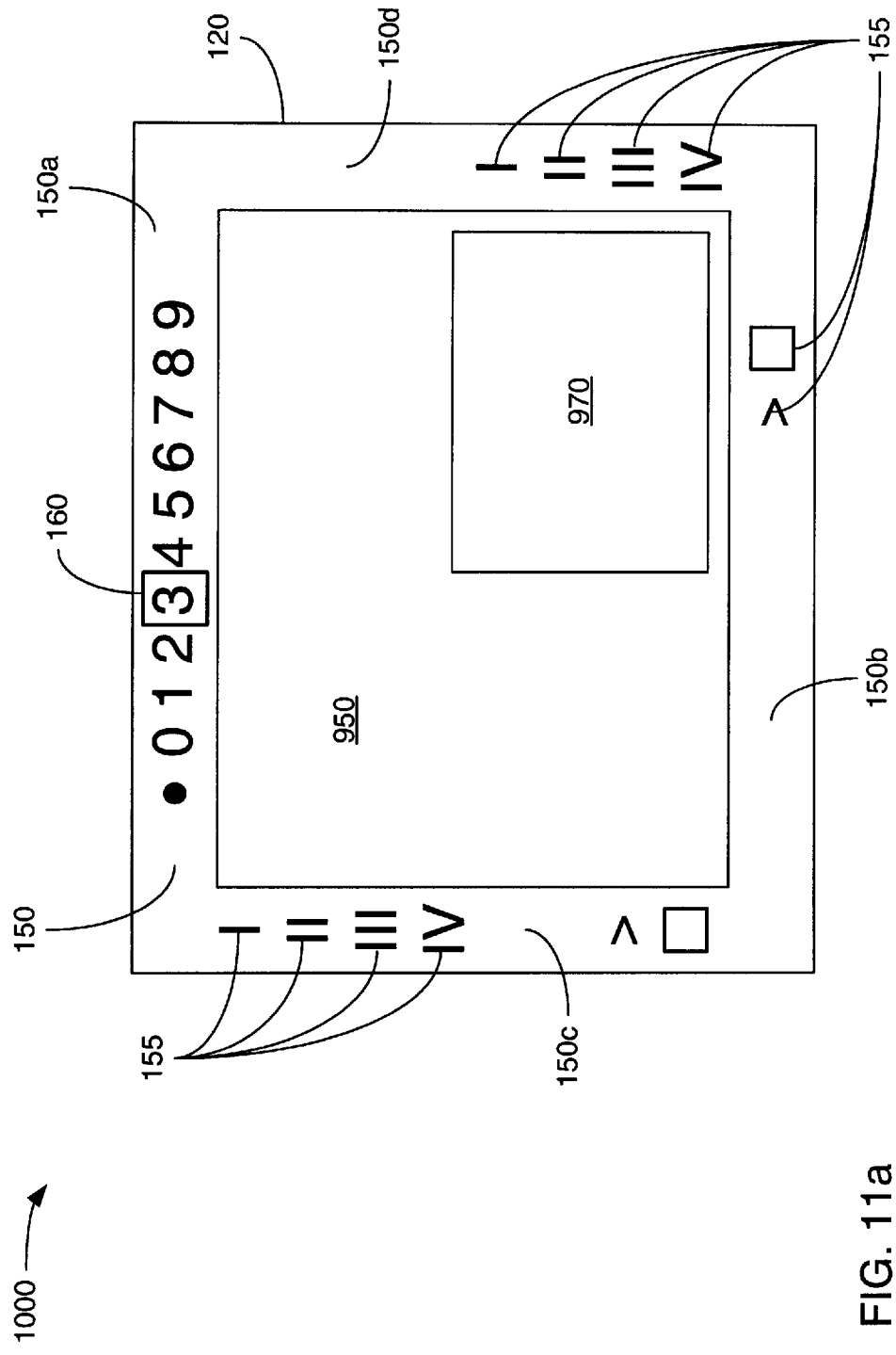
FIGS. 11a and 11b, together, depict possible variants of the user interface of FIG. 1 incorporating more than one display area.
Figure 11B:
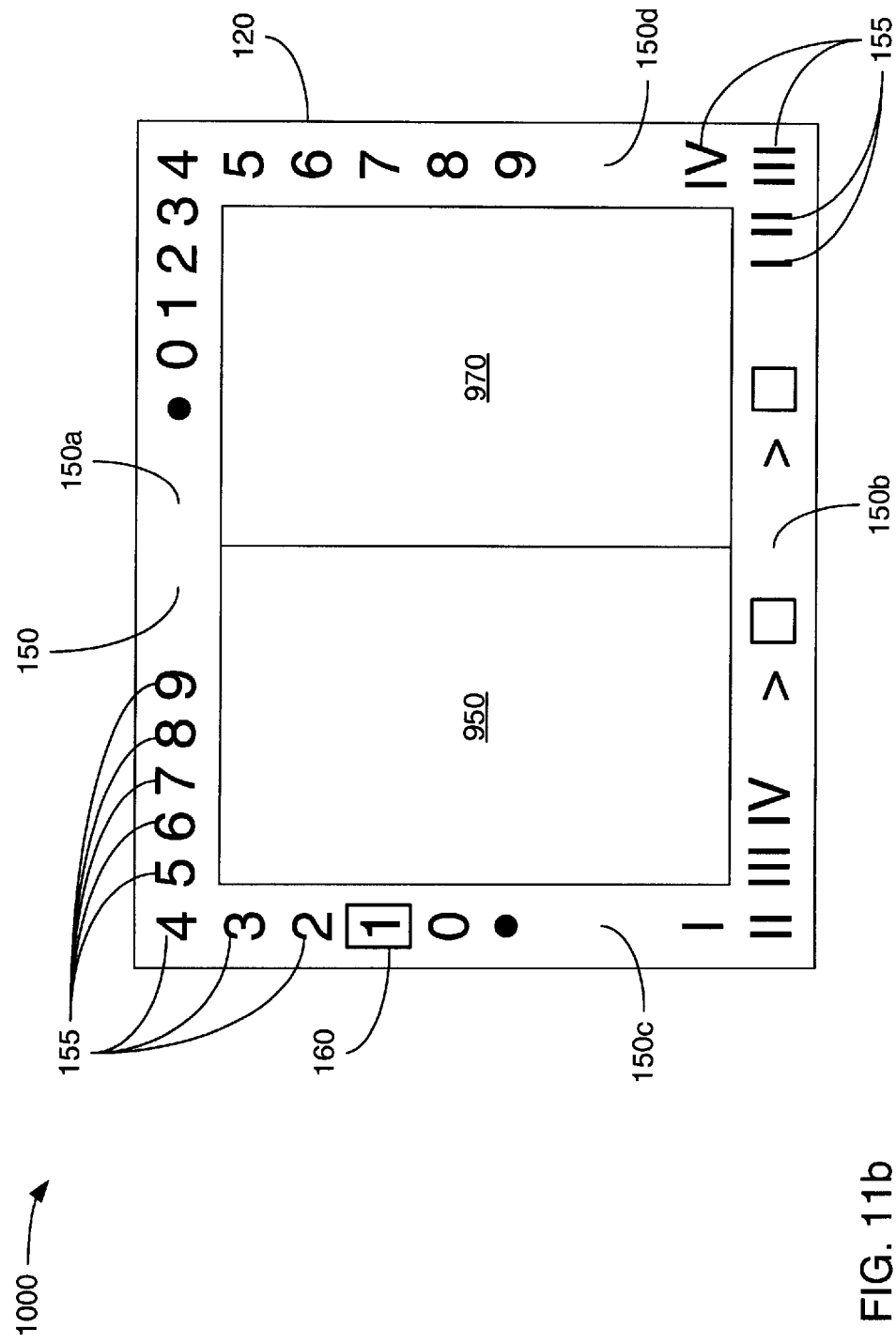

FIGS. 11a and 11b, taken together, depict two variants of the user interface 1000 in which more than one display area is defined within the portion of the display element 120 that is surrounded by the racetrack menu 150. These variants enable more than one visual portion of one or more selected audio/visual programs to be played on the display element 120 in a manner that enables a user to view them simultaneously. Also depicted is the manner in which various ones of the menu items 155 associated within only one of the display areas may be positioned along the racetrack menu 150 to provide a visual indication of their association with that one of the display areas.

More specifically, FIG. 11a depicts a configuration that is commonly referred to as "picture-in-picture" in which a display area 970 having smaller dimensions than the display area 950 is positioned within and overlies a portion of the display area 950. As also depicted, ones of the menu items 155 that are associated with the visual portion displayed in the display area 970 are positioned along portions of the racetrack menu 150 that are located closer to the display area 970 (specifically, portions of the sides 150b and 150d) to provide a visual indication to the user of that one association. Further, ones of the menu items 155 that are associated with the visual portion displayed in the display area 950 are positioned along portions of the racetrack menu 150 that are further from the display area 970 (specifically, the sides 150a and 150c) to provide a visual indication to the user of that other association. As suggested in the depiction of FIG. 11a, the ones of the menu items 155 that are associated with the display area 950 correspond to commands to play or to stop playing an audio/visual program, selection of an input, and radio frequency channel tuning. The ones of the menu items 155 that are associated with the display area 970 correspond to commands to play or to stop playing an audio/visual program, and selection of an input.

Also more specifically, FIG. 11b depicts a configuration that is commonly referred to as "picture-by-picture" in which the display areas 950 and 970 are positioned adjacent each other (as opposed to one overlapping the other) within the portion of the display element surrounded by the racetrack menu 150. Again as depicted, ones of the menu items 155 that are associated with the visual portion displayed in the display area 950 are positioned along portions of the racetrack menu 150 that are located closer to the display area 950 (specifically, the side 150c and portions of the sides 150a and 150b) to provide a visual indication to the user of that one association. Further, ones of the menu items 155 that are associated with the visual portion displayed in the display area 970 are positioned along portions of the racetrack menu 150 that are located closer to the display area 970 (specifically, the side 150d and portions of the sides 150a and 150b) to provide a visual indication to the user of that other association. As suggested in the depiction of FIG. 11b, each of the display areas 950 and 970 are associated with separate ones of the menu items 155 that correspond to commands to play or to stop playing an audio/visual program, selection of an input, and radio frequency channel tuning.

Although FIGS. 11a and 11b depict embodiments having only two display areas (i.e., the display areas 950 and 970) within the portion of the display element 120 surrounded by the racetrack menu 150, those skilled in the art will readily recognize that other embodiments incorporating more than two such display areas are possible, and that in such embodiments, each of the menu items 155 may be positioned along the racetrack menu 150 in a manner providing a visual indication of its association with one of those display areas. Indeed, it is envisioned that variants of the user interface 1000 are possible having 2-by-2 or larger arrays of display areas to accommodate the simultaneous display of multiple visual portions, possibly in security applications.

Although FIGS. 11a and 11b depict separate sets of the menu items 155 corresponding to commands to play and to stop playing an audio/visual program that are separately associated with each of the display areas 950 and 970, and although this suggests that the visual portions played in each of the display areas 950 and 970 must be from different audio/visual programs, it should be noted that the simultaneously displayed visual portions in the display areas 950 and 970 may be of the same audio/visual program. As those skilled in the art will readily recognize, an audio/visual program may have more than one visual portion. An example of this may be an audio/visual program including video of an event taken from more than one angle, such as an audio/visual program of a sports event where an athlete is shown in action from more than one camera angle. In such instances, there may be only one set of the menu items 155 corresponding to commands to play, fast-forward, rewind, pause and/or to stop playing the single audio/visual program, instead of the separate sets of menu items depicted FIGS. 11a and 11b.

With the simultaneous display of multiple visual portions, there may be multiple audio portions that each correspond to a different one of the visual portions. While viewing multiple visual portions simultaneously may be relatively easy for a user insofar as the user is able to choose any visual program to watch with their eyes, listening to multiple audio portions simultaneously may easily become overwhelming. To address this, some embodiments may select one of the audio portions to be acoustically output to the user based on the position 260 of a tip of a digit along the racetrack surface 250 (referring back to FIG. 2). Where the position 260 at which the user places a tip of a digit on the racetrack surface 250 corresponds to a portion of the racetrack menu 150 that is closer to the display area 950, then an audio portion of the audio/visual program of the visual portion being displayed in the display area 950 is acoustically output to the user. If the user then moves that tip of a digit along the racetrack surface 250 such that the position 260 is moved to a portion of the racetrack surface 250 that corresponds to a portion of the racetrack menu 150 that is closer to the display area 970, then an audio portion of the audio/visual program of the visual portion being displayed in the display area 970 is acoustically output to the user. As the selection of audio portion that is acoustically output to the user changes as the user moves the tip of a digit about the racetrack surface 250, the corresponding position of the marker 160 along the racetrack menu 150 may serve as a visual indication to the user of which visual portion the current selection of audio portion corresponds to.

Figure 12:
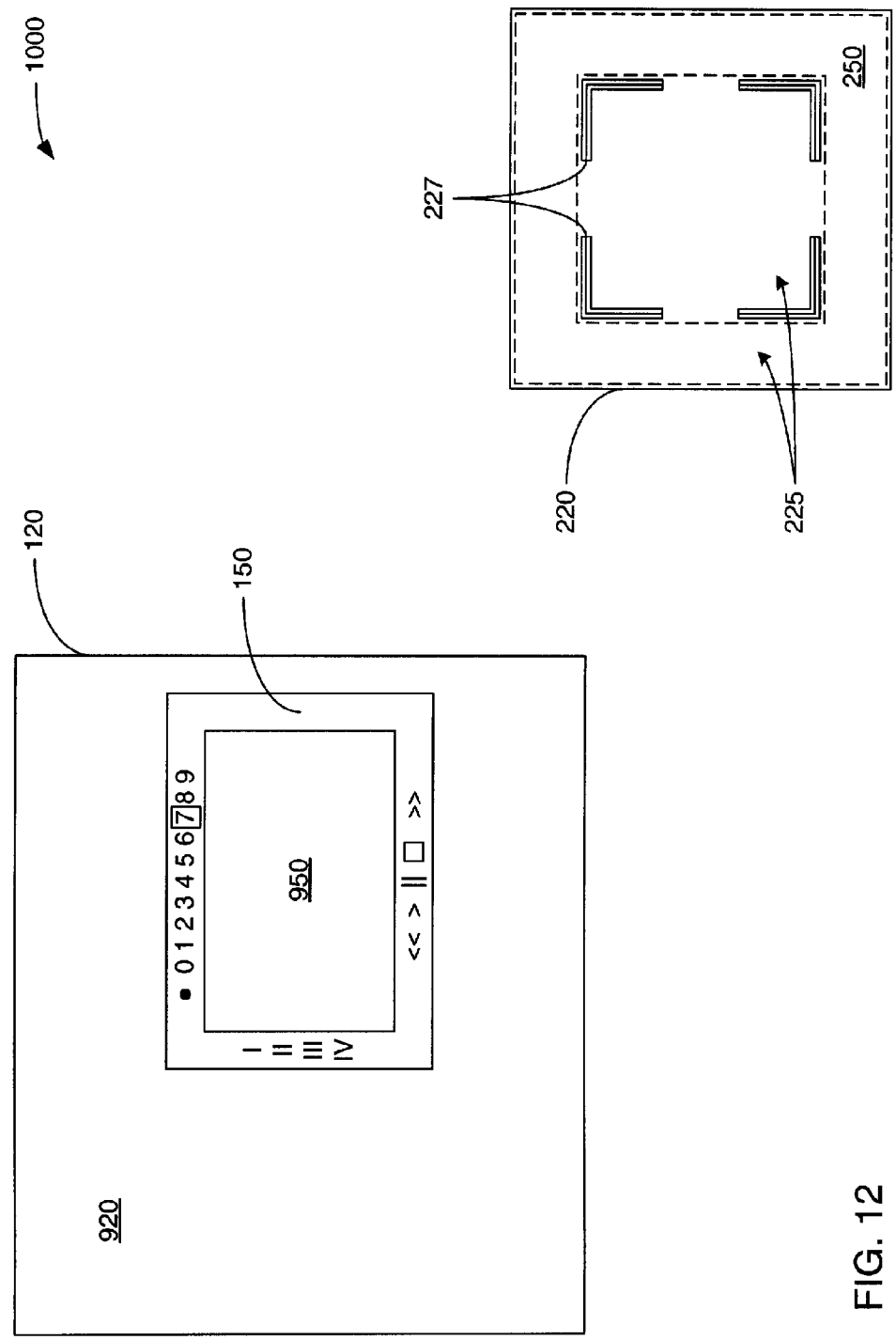
FIG. 12 depicts another embodiment of the user interface of FIG. 1 in which the racetrack menu and the display area surrounded by the racetrack menu do not occupy substantially all of a display element.

FIG. 12 depicts an alternate variant of the user interface 1000 in which the combined display of the racetrack menu 150 and the display area 950 surrounded by the racetrack menu 150 does not fill substantially all of the display element 120. Such an embodiment may be implemented on a more complex variant of the audio/visual device 100 capable of simultaneously performing numerous functions, some of which are entirely unrelated to selection and playing of an audio/visual program. As depicted, this leaves a display area 920 that is outside the racetrack menu 150 and that is overlain by the combination of the racetrack menu 150 and the display area 950 available for such unrelated functions. Such a more complex variant of the audio/visual device 100 may be a general purpose computer system, perhaps one employed as a "media center system" or "whole house entertainment system." In such an embodiment, the combination of the racetrack menu 150 and the display area 950 may be displayed in a window defined by an operating system having a windowing graphical user interface where the window occupies substantially less than all of the display element 120.

As also depicted in FIG. 12, in such an embodiment, the user may select and control the playing of an audio/visual program through the use of a variant of the touch sensor 220 having a touch-sensitive surface 225 that has a continuous rectangular shape (such as the variant of the touch sensor 220 of FIG. 10b), as opposed to having a ring shape (such as the variant of the touch sensor 220 of FIG. 10a). The racetrack surface 250 is defined on the touch-sensitive surface 225 in a manner that occupies the periphery of the touch-sensitive surface 225 and that surrounds a remaining portion of the touch-sensitive surface 225 that enables conventional operation of other functions of the audio/visual device 100 that may be unrelated to the selection and playing of an audio/visual program. In essence, this remaining portion of the touch-sensitive surface 225 may be employed in a conventional manner that will be familiar to those skilled in the art of graphical user interfaces in which a user moves about a graphical cursor using a tip of a digit placed on this remaining portion. Thus, the user may choose to engage in selecting audio/visual programs and controlling the playing of those audio/visual programs through the racetrack surface 250, and may choose to engage in performing other tasks unrelated to the selection and playing of audio/visual programs through the remaining portion of the touch-sensitive surface 225.

To provide tactile guidance to the user as to the location of the racetrack surface 250, one or more ridges 227 and/or grooves (not shown) may be formed in the touch-sensitive surface 225. In this way, the user may be aided in unerringly placing a tip of a digit on whichever one of the racetrack surface 250 or the remaining portion of the touch-sensitive surface 225 that they wish to place that tip upon, without errantly placing that tip on both, and without having to glance at the touch-sensitive surface 225 of the touch sensor 220.

It should be noted with regard to the depiction of a possible architecture of the controller 500 in FIG. 9 that although the source interface 590 is depicted as possibly employing only infrared wireless communications with one or more of the sources 901-904 in the manner only of receiving an audio/visual program therefrom via the infrared receiver 599, other variants of architecture are possible in which the source interface 590 (or some other component of the controller 500) employs an infrared transmitter (not shown) that is incorporated into the source interface 590 (perhaps via replacing the infrared receiver 599 with an infrared transceiver) to provide commands to one or more of the sources 901-904. Further, still other variants of architecture are possible in which one or the other of the optical interface 596 or the electrical interface 595 are employed to couple the controller 500 to an infrared emitter (not shown) that is external to the casing of whatever audio/visual device into which the controller 500 is incorporated, and is physically configured to be placed in relatively close proximity to an infrared receiver of one of the sources 901-904.

As has been discussed at length, operation of the user interface 1000 entails a user placing the tip of a digit on the touch-sensitive surface 225 at a position 260 along the racetrack surface 250 defined thereon, moving the position 260 of that tip along the racetrack surface 250 to cause movement of the corresponding position of the marker 160 along the racetrack menu 150 to the position of a particular one of the menu items 155, and pressing that tip against the racetrack surface 250 with increased pressure at the position 260 that corresponds to the position of the particular one of the menu items 155 to select that particular one of the menu items 155. Thus, the user interface 1000 must provide a mechanism to detect both the current position 260 of that tip and the increased pressure applied by the user through that tip to select one of the menu items 155.

Also, as previously discussed, the touch sensor 220 may be based on any of a variety of technologies to at least sense the position 260 of a tip of a digit of a user's hand along the racetrack surface 250 that is defined on the touch-sensitive surface 225. More specifically, the touch sensor 220 may be based, for example, on one or more variants of resistive, optical, inductive or capacitive sensing technology. At least some variants of resistive and inductive sensing technologies are capable of sensing the amount of pressure applied by a user through a tip of a digit, while at least some variants of capacitive and optical sensing technologies are not. Thus, in some embodiments, the touch sensor 220 is able to directly sense the increased pressure applied by a user through a tip of a digit to select a particular one of the menu items 155. And thus, in other embodiments, the touch sensor 220 is made depressible into the casing of whatever device on which the touch sensor 220 is disposed to enable a mechanical switch (e.g., perhaps a spring-biased button switch or other type of switch) to detect such depression of the touch sensor 220 as the mechanism by which this increased pressure is detected (as has been previously discussed).

Figure 13A:
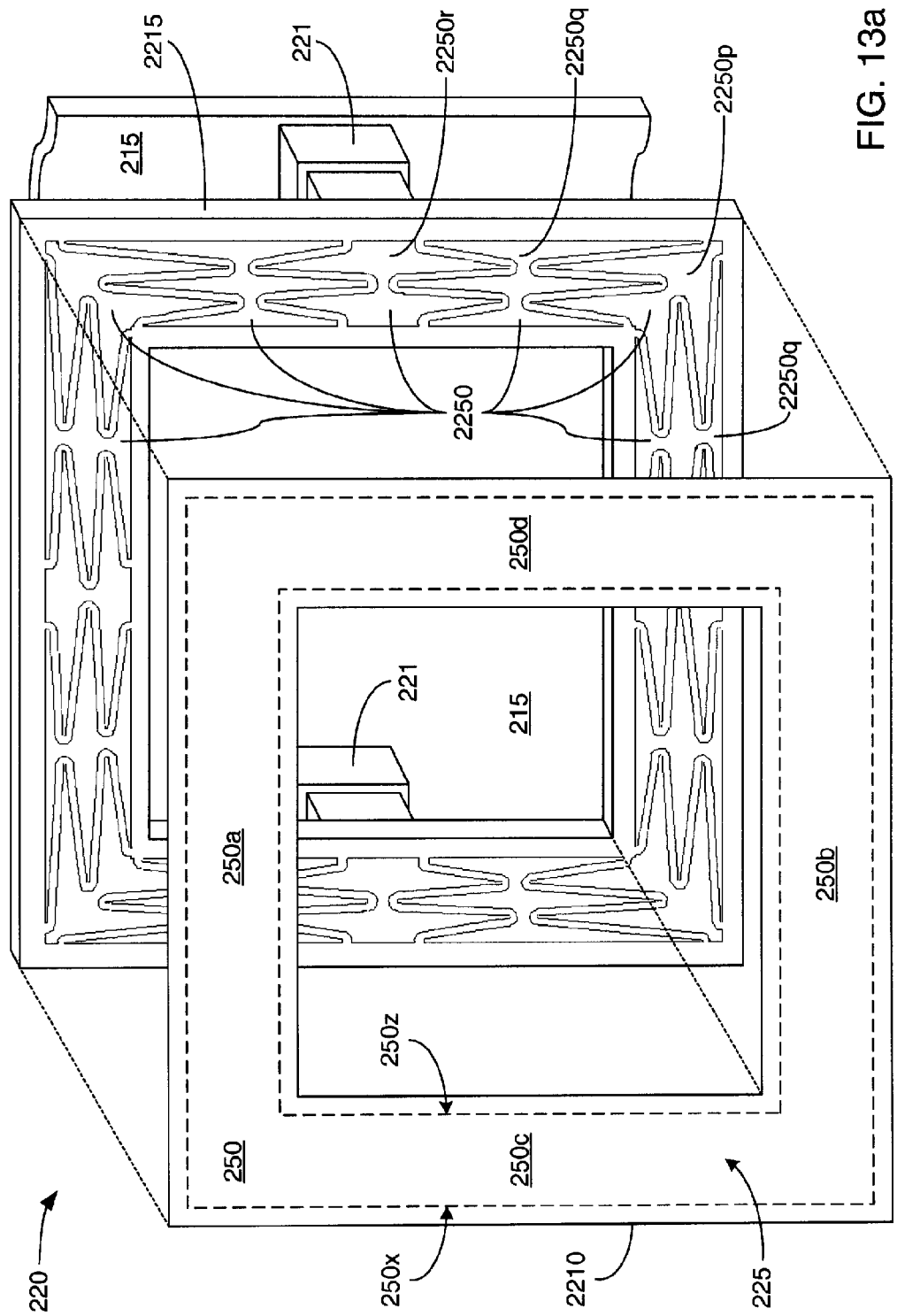
FIGS. 13a, 13b and 13c, together, depict aspects of a capacitive sensing variant of the touch sensor employed in the user interface of FIG. 1.
Figure 13B:
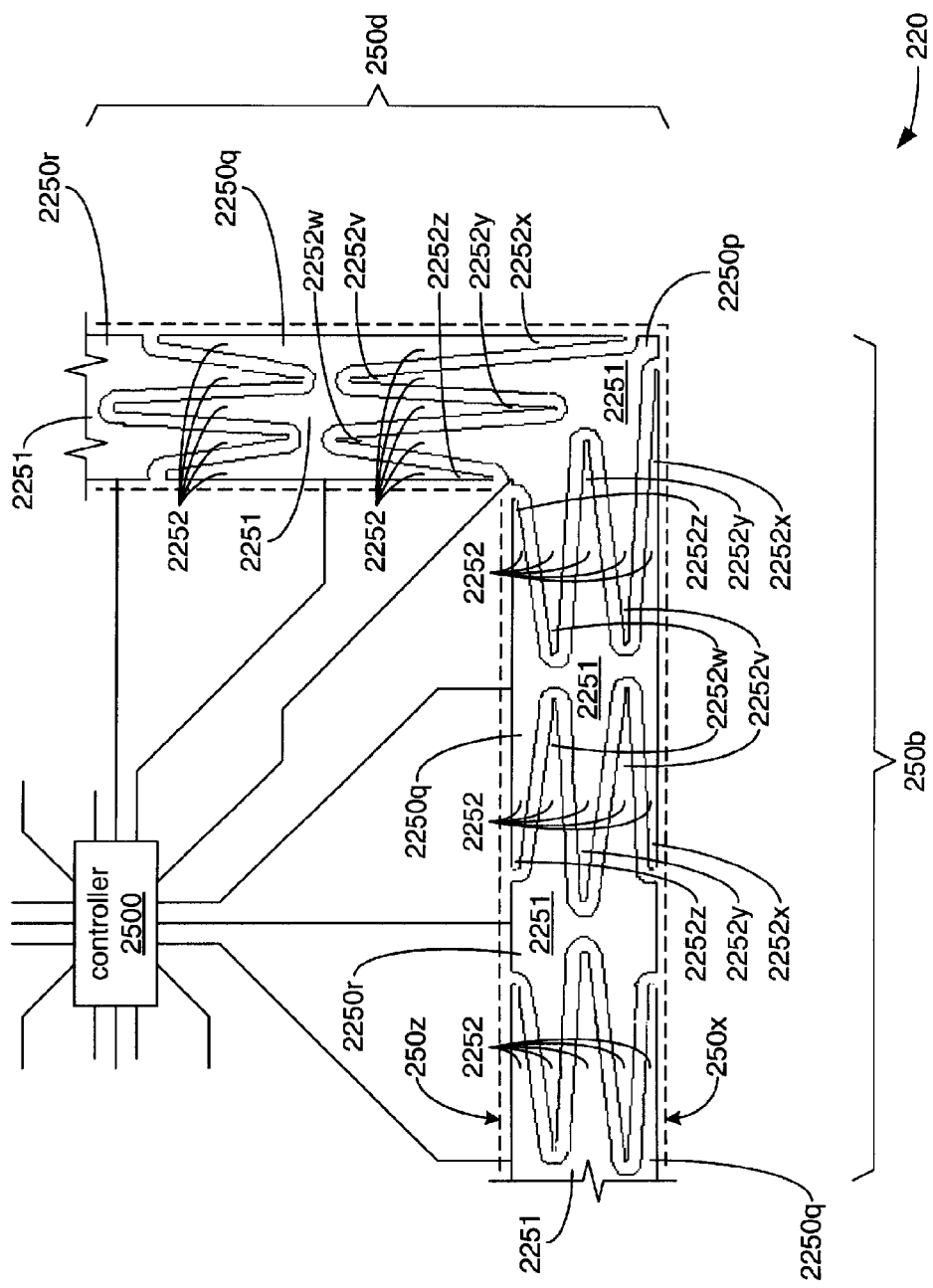
Figure 13C:
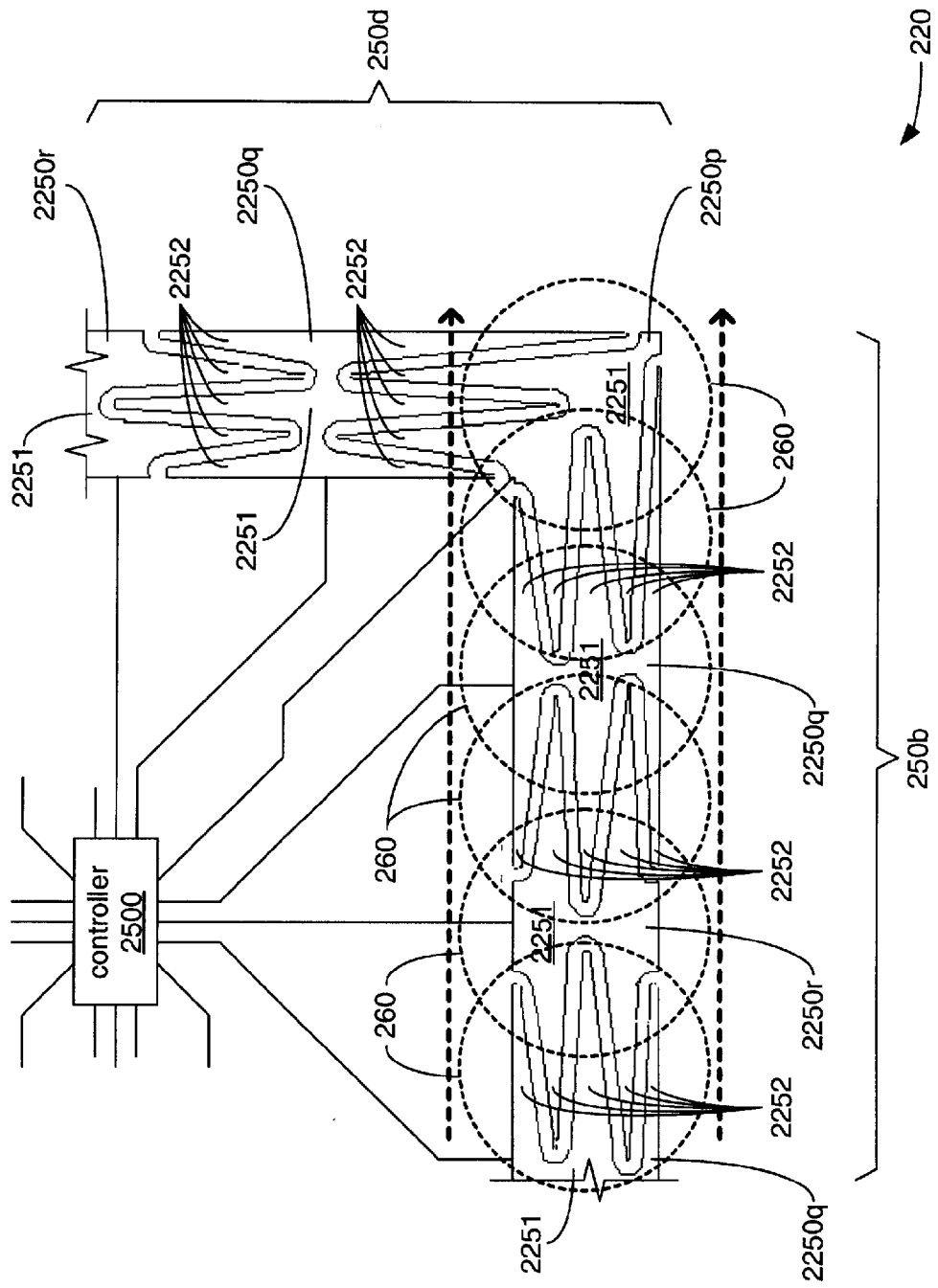

FIGS. 13a, 13b and 13c, taken together, depict details of a variant of the touch sensor 220 based on a form of capacitive sensing technology that senses the proximity of a tip of a digit of a user's hand. FIG. 13a is an exploded perspective view depicting the relative positions of various components of this variant of the touch sensor 220. FIGS. 13b and 13c provide enlarged views of different aspects of a subset of various components of this variant of the touch sensor 220. This variant of the touch sensor 220 incorporates a substrate 2215, multiple conductive pads 2250 disposed on a surface of the substrate 2215 in a manner forming a rectangular loop or ring shape, a cover 2210 positioned so as to overlie at least the conductive pads 2250, and a controller 2500 electrically coupled to each of the conductive pads 2250 (it should be noted that FIGS. 13b-c depict only a subset of these couplings). This variant of the touch sensor 220 may further incorporate one or more selection switches 221 interposed between the substrate 2215 and either a printed circuit board 215 or a portion of the casing of whatever device into which this variant of the touch sensor 220 is incorporated (e.g., the casing 210 of the handheld remote control 200). As will be explained in greater detail, actions taken by a user in operating this variant of the touch sensor 220 are detected by monitoring the levels of capacitance added to one or more of the conductive pads 2250 by a tip of a digit of one of their hands being in relatively close proximity to one or more of the conductive pads 2250.

The substrate 2215 may be formed from any of a variety of non-conductive materials to provide a non-conductive physical support surface for the conductive pads 2250, which may be formed from any of a variety of conductive materials. For example, the substrate 2215 may be a printed circuit board (PCB) formed from glass-reinforced epoxy resin or other suitable material with the conductive pads 2250 being formed thereon as part of a copper conductor layer in a manner widely familiar to those skilled in the art of PCB fabrication. Alternatively, for example, the substrate 2215 may be a sheet of polycarbonate or other plastic onto which the conductive pads 2250 are printed using conductive ink. Although the substrate 2215 may be formed from a relatively flexible material, it is preferred that a relatively stiff material be used to maintain the conductive pads 2250 at stationary positions relative to each other. Since the relatively close proximity of a tip of a digit to any one of the conductive pads 2250 is detected as an increase in capacitance of one or more of the conductive pads 2250, and since the amount of capacitance that the close proximity of a tip of a digit is able to add to any one of the conductive pads 2250 is of a relatively small magnitude, it is preferred that the materials and dimensions of the substrate and the conductive pads 2250 be selected to minimize the inherent capacitance of each of the conductive pads 2250. Doing so is likely to make the relatively small increase in capacitance added by the relatively close proximity of a tip of a digit easier to distinguish over the inherent capacitance of each of the conductive pads 2250 that is always present, whether a tip of a digit is in close proximity, or not.

The cover 2210 is layered over the substrate 2215 and the conductive pads 2250. The cover 2210 is meant to provide the touch-sensitive surface 225 on which the racetrack surface 250 is to be defined, and is therefore, meant to be the portion of the touch sensor 220 with which a user is meant to have physical contact with a tip of a digit of one of their hands. As will be made more clear, the cover 2210 is not actually necessary for the operation of the touch sensor 220, and so, the cover 2210 could be omitted, possibly leaving the conductive pads visible 2250. However, inclusion of the cover 2210 is preferred for aesthetic reasons and to provide some degree of protection of the conductive pads 2250 from becoming physically worn and/or being subjected to corrosion (or other destructive chemical process), such that there sensitivity to the proximity of a tip of a digit is degraded over time. The inclusion of the cover 2210 is also preferred to provide a sufficiently electrically resistant barrier between a tip of a digit and the conductive pads 2250 as to at least reduce the likelihood or magnitude of instances of electrostatic discharge into one or more of the conductive pads that may damage the controller 2500, which is coupled to the conductive pads 2250. Further, the cover may be formed from a material chosen to provide a surface over which a tip of a finger may be moved with minimal physical resistance despite the natural texturing of the tips of typical human digits and despite instances where high humidity and/or the presence of perspiration may otherwise act to cause a tip of a digit to "stutter" in a repetitively jerking-like motion as a person moves a tip of a digit across the touch-sensitive surface 225.

In some variations, the conductive pads 2250 are "sandwiched" between the cover 2210 and the substrate 2215 in a manner in which the conductive pads 2250 are in direct contact with both such that there are no gaps of air therebetween. Layering the cover 2210 over the substrate 2215 and the conductive pads 2250 in a manner that does not leave air gaps therebetween serves to enhance accuracy in the detection of the close proximity of a tip of a digit by removing the possibility of relatively large alterations in the inherent capacitance of one or more of the conductive pads 2250 through direct exposure to moisture (e.g., relatively high humidity in the surrounding air or water droplets put in direct contact with one or more of the conductive pads 2250 from either condensation or a user's perspiration). In other variations, another covering material (not shown) is formed over the conductive pads 2250 at the time that substrate 2215 is formed with the conductive pads 2250 thereon, the cover 2210 is positioned over this covering material, and this covering material provides much of the protection against wearing of the pads and exposure to moisture or other damaging substances. By way of example, where the substrate 2215 is a PCB and the conductive pads 2250 are formed as part of a copper layer of that PCB, it is common practice to coat portions of a surface of a PCB with a partially transparent layer of material meant to protect outermost copper layers (e.g., a remaining portion of a solder mask layer). Since the proximity of a tip of a digit is sensed by each of the conductive pads 2250 as an increase in capacitance formed through the cover 2210 (and perhaps through another covering material, if present), it is preferred that the cover 2210 be a relatively thin sheet of material and it is preferred that the cover 2210 (and whatever other covering material may be present) have a relatively high dielectric constant (at least in comparison to air) to enable better capacitive coupling between a tip of a digit and each of the conductive pads 2250.

In this capacitive sensing variant of the touch sensor 220, the shape and location of the racetrack surface 250 on the touch-sensitive surface 225 provided by the cover 2210 is at least partly defined by the rectangular loop (ring shape) formed by the locations of the conductive pads 2250 (the touch-sensitive surface 225 being defined on the side of the cover 2210 facing away from the side of the cover 2210 that faces towards the conductive pads 2250). In other words, the shape and location of the racetrack surface 250 follows the rectangular ring shape formed by how the conductive pads 2250 are positioned on the substrate 2215. This rectangular ring shape provides the racetrack surface 250 with an outer boundary 250x that defines the periphery of the racetrack surface 250, and an inner boundary 250z that defines the periphery of the area surrounded by the racetrack surface 250. As will be discussed in greater detail, it is intended that a user engage the racetrack surface 250 by moving the position 260 at which a tip of a digit overlies a portion of the racetrack surface 250 along the racetrack surface 250, and substantially between the outer boundary 250x and the inner boundary 250z. As will also be discussed in greater detail, one or more mechanisms may be employed to distinguish such engagement of the racetrack surface 250 at locations substantially between these boundaries by the user from other actions by the user that may otherwise be mistaken for such engagement of the racetrack surface 250.

The controller 2500 monitors the level of capacitance of each of the conductive pads 2250 on a recurring basis (e.g., at an interval of typically less than a second in length) to determine the relative proximities of a tip of a digit to each of the conductive pads 2250. As those skilled in the art of capacitive sensing technology will readily recognize, a closer proximity of a portion of a person's body (such as a tip of one of their digits) to a conductive pad of a capacitive sensor generally corresponds to a higher capacitance being added to whatever inherent capacitance that conductive pad already has without that portion of that person's body in that close proximity. The controller 2500 compares (also on a recurring basis) those detected relative proximities of each of the conductive pads 2250 to that tip of that digit (as indicated by the relative levels of additional capacitance imparted to each of those conductive pads 2250 by their relative proximities to that tip) to determine the current position 260 of that tip along the racetrack surface 250. As that tip of that digit is moved about this rectangular ring shape configuration of the racetrack surface 250, whichever ones of the conductive pads 2250 in this rectangular ring shape that are overlain by the position 260 of that tip along the racetrack surface 250 are provided with a greater capacitance by their relatively close proximity to that tip as compared to others of the conductive pads 2250.

As is more clearly depicted in FIG. 13b, each of the conductive pads 2250 is made up of a central region 2251 and multiple pointed teeth 2252 that extend outwardly from the central region 2251 towards adjacent ones of the conductive pads 2250. The teeth 2252 of adjacent pairs of the conductive pads 2250 mesh in a manner somewhat akin to gear teeth of engaged gears. As is depicted, each of the conductive pads 2250 has one of three possible shapes, depending on its location. More specifically, there are four corner-type conductive pads 2250p, four midpoint-type conductive pads 2250r, and eight interposer-type conductive pads 2250q. As can be seen more clearly in FIG. 13a, it is preferred that each of these three types of conductive pads 2250p, 2250q and 2250r are shaped and positioned to create four symmetrical sides in the overall layout of the conductive pads 2250 (each side corresponding to one of the four sides 250a-d of the racetrack surface 250), such that there is symmetry between the conductive pads 2250 defining the sides 250a and 250b of the racetrack surface 250, and between the conductive pads 2250 defining the sides 250c and 250d.

As those familiar with so-called "slider" controls based on capacitive sensing technology will readily recognize, the enmeshed teeth 2252 of adjacent pairs of the conductive pads 2250 enable each adjacent pair of the conductive pads 2250 to be operable as a "slider" control. More specifically, as a tip of a user's digit is slid across an adjacent pair of the conductive pads 2250 from being positioned to overlie the central region 2251 of one of the conductive pads 2250 towards being positioned to overlie the central region 2251 of the other, that tip moves over the enmeshed teeth 2252 between the pair of the conductive pads 2250. As that tip of that digit moves over those enmeshed teeth 2252, the surface area of the teeth 2252 of one of the pair of the conductive pads 2250 underlying that tip progressively decreases while the surface area of the teeth 2252 of the other of the pair of the conductive pads 2250 underlying that tip progressively increases. This has the effect of causing the capacitance added by the proximity of that tip to the one of the pair of conductive pads 2250 to progressively decrease as the capacitance added by the proximity of that tip to the other of the pair of conductive pads 2250 progressively increases. In monitoring the capacitance of each of the conductive pads 2250 in this pair of the conductive pads 2250, the controller 2500 is able to use this relatively gradual and smoothly changing proportion of additional capacitances added to each one of this pair of the conductive pads 2250 to determine the location 260 of that tip of that digit between the central regions 2251 of each one of this pair of the conductive pads 2250 with an appreciable degree of accuracy.

With the conductive pads 2250 arranged in the generally rectangular configuration of the racetrack surface 250 (as depicted in FIG. 13a), a single continuous, rectangular, ring shaped loop of "slider" controls is, in effect, created. It should, therefore, be noted that although a tip of a digit of a user's hand may be positioned so as to be substantially centered over only one, two or three of the conductive pads 2250, portions of that tip may also slightly overlie portions of one or two further ones of the conductive pads 2250 that are adjacent to the one, two or three of the conductive pads 2250 over which that tip is substantially centered. Although this usually depends on the relative sizes of the surface areas of each of the conductive pads 2250 and the surface area able to be covered by that tip of a digit, situations can also arise where a user positions more than just that tip of a digit over the touch sensor 220 such that a substantial length of that digit overlies multiple ones of the conductive pads 2250. To accommodate either situation, the controller 2500 may be configured (perhaps through a sequence of instructions stored within a storage of the controller 2500 and executed by a processing device within the controller 2500) to employ the changing proportions of additional capacitance imparted by the close proximity of a tip of a digit to more than just one, two or three adjacent ones of the conductive pads 2250 (e.g., perhaps four or five adjacent ones of the conductive pads) to determine the location 260 of that tip relative to the central regions 2251 of multiple adjacent ones of the conductive pads 2250. Further, as those skilled in the art of capacitive sensing of the proximity of a portion of a person's body will readily recognize, the controller 2500 may be configured to impose a minimum capacitance threshold on each of the conductive pads 2250 (either a single threshold common to all of the conductive pads 2250, or perhaps different thresholds for each of the conductive pads 2250) that must be exceeded for the controller 2500 to be caused to recognize the additional capacitance imparted to any one of conductive pads 2250 as an indication of the proximity of a tip of a digit.

FIG. 13c depicts an example of operation of this variant of the touch sensor 220 by a user in which the position 260 of a tip of a digit of that user's hand initially overlies the enmeshed teeth 2252 of a first one of the interposer-type conductive pads 2250q and the midpoint-type conductive pad 2250r that correspond to the side 250b of the racetrack surface 250. Then, as depicted, the user moves that tip along the side 250b in the direction indicated by the darkened arrows such that the position 260 of that tip of that digit overlies the central region 2251 of that midpoint-type conductive pad 2250r; then further to overlie the enmeshed teeth 2252 of that midpoint-type conductive pad 2250r and the second one of the interposer-type conductive pads 2250q of the side 250b; then further to overlie the central region 2251 of that second interposer-type conductive pad 2250q; then further to overlie the enmeshed teeth 2252 of that second interposer-type conductive pad 2250q and the corner-type conductive pad 2250p corresponding to the corner where the sides 250b and 250d meet; and then further to overlie the central region 2251 of that corner-type conductive pad 2250p.

With that tip of that digit initially overlying the enmeshed teeth 2252 of the first interposer-type conductive pad 2250q and the midpoint-type conductive pad 2250r corresponding to the side 250b, the controller 2500 detects a relatively high additional capacitance imparted to both of these two conductive pads by the close proximity of that tip (i.e., as a result of the capacitive coupling of that tip to those enmeshed teeth 2252 of those two conductive pads at the initial location of the position 260 overlying those enmeshed teeth 2252). It should be noted that it is possible, even likely, that measurable amounts of additional capacitance will be imparted by the close proximity of that tip of that digit (and perhaps by other portions of that digit and/or the hand to which that digit belongs) to others of the conductive pads 2250, perhaps even most or all of the other conductive pads. However, since that tip of that digit overlies these enmeshed teeth 2252 of these two particular conductive pads, the additional capacitance imparted to these two particular conductive pads is relatively high in comparison to the relatively low additional capacitance imparted to any of the others of the conductive pads 2250. The controller 2500 identifies which one or ones of the conductive pads 2250 are overlain by the position 260 of that tip of that digit by identifying which one or ones of the conductive pads 2250 have the highest additional capacitance, and perhaps also through the use of a minimum capacitance threshold, as discussed earlier. Greater precision in determining the current location of the position 260 of that tip of that digit is achieved by the controller 2500 comparing the levels of additional capacitance imparted to the one or more of the conductive pads 2250 that are identified as having the highest additional capacitance. For example, as depicted in FIG. 13c, the position 260 of that tip is initially substantially centered over these enmeshed teeth 2252, and the controller 2500 is able to determine that the position 260 of that tip along the side 250b is substantially centered over these enmeshed teeth 2252 by detecting that the relative high additional capacitances imparted to these two conductive pads are relatively equal.

As the user moves the position 260 of that tip (in the manner described at length, above) from overlying those enmeshed teeth 2252 and towards overlying the central region 2251 of the midpoint-type conductive pad 2250r corresponding to the side 250b, the controller 2500 detects both a progressive lowering of the relatively high additional capacitance imparted by that tip to the first interposer-type conductive pad 2250q and a progressive rising of the relatively high additional capacitance imparted by that tip to that midpoint-type conductive pad 2250r. As this corresponding lowering and rising of relatively high additional capacitances of these two conductive pads occurs, the controller 2500 is able to determine the position 260 of that tip along the side 250b between the central regions 2251 of these two conductive pads by an analysis of the changing proportion of relatively high additional capacitances imparted to each these two conductive pads by the close proximity of that tip.

As that tip comes to substantially overlie the central region 2251 of that midpoint-type conductive pad 2250r, a relatively high additional capacitance begins to be imparted to the second interposer-type conductive pad 2250q of the side 250b as a result of the manner in which its teeth 2252 reach towards the central region 2251 of that midpoint-type conductive pad 2250r. The controller 2500 is able to determine that the position 260 of that tip along the side 250b is substantially centered over the central region 2251 by detecting the relatively high additional capacitances imparted to that midpoint-type conductive pad 2250r and both of the interposer-type conductive pads 2250p, in which the relatively high additional capacitance imparted to the midpoint-type conductive pad 2250r is the highest of these three relatively high additional capacitances, and in which the relatively high additional capacitances imparted to each of the interposer-type conductive pads 2250p are relatively equal. In other words, the controller 2500 identifies that midpoint-type conductive pad 2250r and these two adjacent interposer-type conductive pads 2250p as having relatively high additional capacitances while others of the conductive pads 2250 have relatively low additional capacitances, and the controller 2500 compares these relatively high additional capacitances to more precisely determine the current position 260 of that digit relative to these three conductive pads.

As the user moves the position 260 of that tip away from being substantially centered over the central region 2251 of that midpoint-type conductive pad 2250r (again, in the direction indicated by the darkened arrows) and over the enmeshed teeth 2252 of that midpoint-type conductive pad 2250r and the second interposer-type conductive pad 2250q of the side 250b, the controller 2250 detects a reduction in the relatively high capacitance imparted to that midpoint-type conductive pad 2250r, detects a further reduction in the relatively high additional capacitance imparted to the first interposer-type conductive pad 2250q, and detects a further increase in the relatively high additional capacitance imparted to the second interposer-type conductive pad 2250q. This progressive shifting of which ones of these conductive pads along the side 250b are provided with the highest of the relatively high additional capacitances being imparted due to the position 260 of that tip of a digit continues as the position 260 of that tip continues to be moved along the side 250*b* towards the corner where the sides 250*b* and 250*d* meet.

As that tip comes to substantially overlie the central region 2251 of that corner-type conductive pad 2250*p*, a relatively high additional capacitance is imparted to the central region 2251 of that corner-type conductive pad 2250*p*, and to each of the two interposer-type conductive pads 2250*q* adjacent that corner-type conductive pad 2250*p* as a result of the manner in which their teeth 2252 reach towards the central region 2251 of that corner-type conductive pad 2250*p*. Again, the controller 2500 is able to determine that the position 260 of that tip in that corner where the sides 250*b* and 250*d* meet is substantially centered over the central region 2251 of that corner-type conductive pad 2250*p* by detecting that the relatively high additional capacitance imparted to that corner-type conductive pad 2250*p* is the highest of these three relatively high additional capacitances, and that the relatively high additional capacitances imparted to each of the two adjacent interposer-type conductive pads 2250*p* are relatively equal.

It is preferred that the surface areas of all of the conductive pads 2250 of this capacitive sensing variant of the touch sensor 220 be relatively equal, despite their differing shapes. Having relatively equal surface areas enables all of the conductive pads 2250 to have relatively similar inherent capacitances such that the use of offset or weighting values to prepare the controller 2500 to compensate for differences in inherent capacitances among the conductive pads 2250 may be rendered unnecessary, thereby simplifying any calculations employed by the controller 2500 in comparing capacitances between conductive pads 2250 to determine the current position 260 of a tip of a user's digit. Having relatively equal surface areas also aids in ensuring that a tip of a particular digit of a user's hand will impart a relatively high additional capacitance that is relatively equal to each of the conductive pads 2250 when its position 260 is substantially centered over each of their central regions 2251, despite their differing shapes. As in the case of the inherent capacitances, having such additional capacitances being relatively equal serves to further simplify calculations by enabling comparisons of additional capacitances among the conductive pads 2250 without the use of offset or weighting values.

Avoiding the use of offset or weighting values in calculations to subtract inherent capacitances from total capacitances for each of the conductive pads 2250 to determine the amount of additional capacitances imparted by a tip of a digit, in calculations to compare additional capacitances imparted to each of the conductive pads 2250 by a tip of a digit, and/or in calculations to compare total capacitances of each of the conductive pads 2250 to reduce their complexity may be deemed desirable, especially where the touch sensor 220 is provided with electric power from a power source of limited capacity (e.g., a battery). As those skilled in the art of computations implemented in digital logic will readily recognize, being able to reduce the complexity of a calculation may allow that calculation to be carried out by a given piece of digital logic at a slower clock speed (i.e., with that given piece of digital logic being driven through each calculation step at a reduced frequency) and/or may allow that calculation to be carried out by an alternate piece of digital logic of lesser complexity, either of which is likely to result in a lesser rate of consumption of electric power. Thus, where the touch sensor 220 is incorporated into a portable device (e.g., the handheld remote control 200 of FIG. 1, or one of the more portable variants of the audio/visual device 100 of FIG. 5 or FIG. 8), the calculations performed by the controller 2500 to detect the additional capacitance associated with the close proximity of a tip of a digit and to determine the current position 260 of that tip of a digit will consume the limited available electric power at a lower rate.

Additionally and/or alternatively, having relatively equal surface areas across all of the conductive pads 2250 may provide an opportunity to simplify circuitry employed in monitoring the capacitance levels of the conductive pads 2250. As will be familiar to those skilled in the art of capacitive sensing technologies, a common approach to making recurring measurements of the capacitance of a conductive pad of a capacitive sensor is to employ the conductive pad as the capacitive element in a RC network of an oscillator. Such an oscillator is then allowed to run freely to provide clock pulses to a counter, where the value of the count is checked and the counter is reset at regular intervals. The count reached by the counter during an interval corresponds to the capacitance of the conductive pad during that interval. Employing this approach to monitoring all of the conductive pads 2250 of this capacitive sensing variant of the touch sensor 220 requires making each of the conductive pads 2250 a capacitive element of a separate RC network of a separate oscillator accompanied by a separate counter. Some degree of simplification of the implementation of so many RC networks, so many oscillators and so many counters may be enabled (e.g., a resistor network of multiple resistors of identical levels of resistance may be employed) by having all of the conductive pads 2250 of the same surface area such that their inherent capacitances are all relatively similar and such that each of the counts reached by each of their oscillators in response to their inherent capacitances are the same (or at least substantially similar).

It is also preferred that each tooth 2252 of each of the conductive pads 2250 be similar enough in its length (as measured from its base where it joins with and protrudes from a central region to where it tapers to a point-like end) and in its tapered shape that the rate at which levels of additional capacitance decrease and increase is the same between different adjacent pairs of the conductive pads 2250 as a tip of a digit is moved across different adjacent pairs. Returning to the example of operation of the touch sensor 220 depicted in FIG. 3*c*, as the position 260 of the tip of a digit moves in the direction indicated by the darkened arrows in a first transition from the midpoint-type conductive pad 2250*r* to the second interposer-type conductive pad 2250*q*, and then in a second transition from that second interposer-type conductive pad 2250*q* to the corner-type conductive pad 2250*p*, the rates of change in the additional capacitances imparted to adjacent pairs of these conductive pads are the same and remain relatively constant, presuming that the user moves that tip in the direction of the darkened arrows at a constant speed. In other words, the rates at which additional capacitance imparted to the midpoint-type conductive pad 2250*r* decreases and the additional capacitance imparted to that second interposer-type conductive pad 2250*q* increases in that first transition from the midpoint-type conductive pad 2250*r* to that second interposer-type conductive pad 2250*q* are relatively constant and are the same as the rates at which additional capacitance imparted to that second interposer-type conductive pad 2250*q* decreases and the additional capacitance imparted to the corner-type conductive pad 2250*p* increases in that second transition from that second interposer-type conductive pad 2250*q* to the corner-type conductive pad 2250*p*.

Having rates of decrease and increase in additional capacitance that are the same between any two adjacent ones of the conductive pads 2250 aids in the reduction of complexity in the calculations employed in determining the current position 260 of a tip of a digit. The use of offset or weighting values to compensate for different rates of change in additional capacitance for differing pairs of the conductive pads 2250 (i.e., for differing ones of the "slider" controls formed by differing pairs of the conductive pads 2250) is made unnecessary.

As depicted in FIG. 13b, the corner-type conductive pad 2250p at the corner at which the sides 250b and 250d meet incorporates two sets of two teeth, namely an outer tooth 2252v and an inner tooth 2252w. Each of these two sets of two teeth 2252v and 2252w is enmeshed with a corresponding set of three teeth of an adjacent one of the interposer-type conductive pads 2250q, namely an outer tooth 2252x, a tooth 2252y and an inner tooth 2252z. The outer teeth 2252x and the inner teeth 2252z of each of the adjacent ones of the interposer-type conductive pads 2250q are positioned along the outer boundary 250x and the inner boundary 250z, respectively, of the rectangular ring shape formed by the conductive pads 2250 that at least partly define the rectangular ring shape of the racetrack surface 250 (i.e., the outer teeth 2252x are positioned along the perimeter of that rectangular ring shape, and the inner teeth 2252z are positioned along the perimeter of the area enclosed by the loop of that rectangular ring shape). The outer teeth 2252v and the inner teeth 2252w of this corner-type conductive pad 2250p are inset from the outer boundary 250x and the inner boundary 250z, respectively, by being positioned adjacent sides of the outer teeth 2252x and inner teeth 2252z that are opposite the sides of the outer teeth 2252x and the inner teeth 2252z that are along the outer boundary 250x and the inner boundary 250z, respectively. Each one of the teeth 2252x-z that extend from adjacent ones of the interposer-type conductive pads 2250q protrude into the central region 2251 of this corner-type conductive pad 2250p to a differing extent. In so doing, matching ones of the teeth 2252x-z of each of the adjacent ones of the interposer-type conductive pads 2250q protrude almost far enough into the central region 2251 as needed to intersect each other, such that the two outer teeth 2252x almost intersect each other along the outer boundary 250x, the two teeth 2252y almost intersect each other at about the center of the central region 2251 of this corner-type conductive pad 2250p, and the two inner teeth 2252z almost intersect each other along the inner boundary 250z.

This enmeshing of multiple teeth extending from each one of the conductive pads 2250 towards each adjacent one of the conductive pads 2250 provides at least separate enmeshed pairs teeth (i.e., an enmeshed pairing of one tooth from each of a pair of adjacent ones of the conductive pads 2250) along each of the outer boundary 250z and the inner boundary 250x. This creates "slider" controls that are able to function regardless of whether a user tends to move a tip of a digit along about the rectangular ring shape of the racetrack surface 250 in a manner in which the position 260 of that tip tends to overlie only one or the other of the outer boundary 250x or the inner boundary 250z, or tends to move that tip in a manner that tends to be more centered between the outer and inner boundaries 250x and 250z. In other words, for example, it has been observed that some people tend to move a tip of a digit about the racetrack surface 250 in a manner in which they tend to "ride" the periphery of the touch sensor 220, resulting in that tip frequently overlying portions of the outer boundary 250x. The extension of the outer teeth 2252x by each of the adjacent ones of the interposer-type conductive pads 2250q along the outer boundary 250x, and the extension of the outer teeth 2252v by each of the corner-type conductive pads 2250p alongside corresponding ones of these outer teeth 2252x provides an enmeshed pair of teeth 2252 alongside the outer boundary 250x between these two such conductive pads. Thus, there is still a progressive decrease in additional capacitance imparted to one of two such adjacent conductive pads and corresponding progressive increase in additional capacitance imparted to the other of two such adjacent conductive pads despite a user tending to move the position 260 of a tip of a digit in a manner that frequently overlies the outer boundary 250x. The corresponding extension and enmeshing of inner teeth 2252z and inner teeth 2252w provides a separate enmeshed pair of teeth 2252 alongside the inner boundary 250z between these same two such conductive pads, thereby ensuring that there still is such a progressive decrease and corresponding progressive increase in additional capacitance between two adjacent conductive pads despite a user tending to move the position 260 of a tip of a digit in a manner that frequently overlies the inner boundary 250z. For users who tend to move the position 260 of a tip of a digit about the racetrack surface 250 in a manner that is more centered between the outer and inner boundaries 250x and 250z, the extension and enmeshing of corresponding ones of the teeth 2252y with each of the outer teeth 2252v and inner teeth 2252w makes possible such a progressive decrease and corresponding progressive increase in additional capacitance between two adjacent conductive pads.

The deep protrusions to differing extents into the central region 2251 of each of the corner-type conductive pads 2250p by multiple teeth of adjacent ones of the interposer-type conductive pads 2250q ensure that a progressive decrease and corresponding progressive increase in additional capacitance occurs as a tip of a digit is moved between one of the corner-type conductive pads 2250p and an adjacent one of the interposer-type conductive pads 2250q, regardless of whether a particular user tends to "ride" the outer boundary 250x, "ride" the inner boundary 250z, or tends to center the position 260 of that tip between the outer and inner boundaries 250x and 250z. Most especially, the deepest protrusions into the central region 2251 of each of the corner-type conductive pads 2250p that are made by the outer teeth 2252x of adjacent ones of the interposer-type conductive pads ensures that there is no "dead zone" in the central region 2251 of the corner-type conductive pads 2250p towards the outer corner formed in the outer boundary 250x such that the position 260 of a tip of a digit could be moved about in that outer corner by a user without there being sufficient sensitivity to detect that movement.

The fact that each one of the corner-type conductive pads 2250p extend the same quantity of teeth towards each of its adjacent ones of the interposer-type conductive pads 2250q, and the fact that the teeth extending towards one of those adjacent interposer-type conductive pads 2250q have shapes and dimensions that mirror the teeth extending towards the other of those adjacent interposer-type conductive pads 2250q provides a symmetry of shape and surface area. This physical symmetry of these particular teeth provides a symmetry in the manner in which movement between each one of the corner-type conductive pads 2250p and each of its adjacent interposer-type conductive pads 2250q is sensed, and thereby, responded to. In other words, this symmetry allows the sensitivity of the touch sensor 220 in detecting movement between a corner-type conductive pad 2250p and one of its adjacent interposer-type conductive pads 2250q to be identical to the sensitivity of the touch sensor 220 in detecting movement between the same corner-type conductive pad 2250p and the other one of its adjacent interposer-type conductive pads 2250q. More precisely, the characteristics of the resulting progressive decrease and corresponding increase in additional capacitance arising from movement between that corner-type conductive pad 2250p and either of the adjacent interposer-type conductive pads 2250q are the same.

As also depicted in FIG. 13b, the midpoint-type conductive pad 2250r of the side 250b incorporates its own variants of two sets of both an outer tooth 2252v and an inner tooth 2252w. Also, each of these two sets of two teeth 2252v and 2252w is enmeshed with a corresponding variant of a set of three teeth 2252x, 2252y and 2252z of an adjacent one of the interposer type conductive pads 2250q. In this variant of these three teeth, the outer teeth 2252x and the inner teeth 2252z are also positioned along the outer boundary 250x and the inner boundary 250z, respectively. And, in this variant of these two teeth, the outer teeth 2252v and the inner teeth 2252w of this midpoint-type conductive pad are inset from the outer boundary 250x and the inner boundary 250z, respectively. The teeth 2252y that extend from adjacent ones of the interposer-type conductive pads 2250q protrude almost far enough into the central region 2251 of this midpoint-type conductive pad 2250r as needed to meet and cut that central region 2251 in two. In contrast, the outer teeth 2252x and the outer teeth 2252z that extend from adjacent ones of the interposer-type conductive pads 2250q both protrude into this central region 2251 to a lesser extent.

This difference between the extent to which the teeth 2252y protrude into the central region 2251 of this midpoint-type conductive pad 2250r and the extent to which both the outer teeth 2252x and the inner teeth 2252y protrude into that central region reflects an effort to achieve a desired balance of multiple characteristics in the behavior of this capacitive sensing variant of the touch sensor 220. As previously described, it may be deemed desirable to have all of the conductive pads 2250 sized to have the same surface area to reduce the complexity of calculations in making comparisons of levels of capacitance in determining the current location of the position 260 of a tip of a digit along the racetrack surface 250. Thus, regardless of whatever shape is given the midpoint-type conductive pad 2250r, it is desired that it's surface area be the same as for the other two types. As has also been described, it is desired to avoid creating a "dead zone" in which it would be possible for the position 260 of a tip of a digit to be moved about a portion of one of the conductive pads 2250 without there being sufficient sensitivity to sense that movement. And it has been explained as being desirable to avoid having such a "dead zone" arise regardless of whether a user tends to move a tip of a digit in a manner that "rides" the outer boundary 250x, "rides" the inner boundary 250z or stays relatively centered between these two boundaries. However, while the corner position of the corner-type conductive pads 2250p easily lends itself to the formation of such a "dead zone" towards their outer corners formed in the outer boundary 250x, the risk of creating such a "dead zone" amidst a portion of the midpoint-type conductive pads 2250r is not as great. Therefore, the teeth 2252y protrude more deeply into the central region 2251 of this midpoint-type conductive pad 2250r to preclude the formation of such a "dead zone" within this central region 2251, while the outer teeth 2252x and the inner teeth 2252y protrude less deeply into this central region 2251 to allow this central region 2251 enough room between the outer boundary 250x and the inner boundary 250z to enable the overall surface area of this midpoint-type conductive pad 2250r to be relatively equal to the surface areas of the others of the conductive pads 2250.

As is clear from viewing FIGS. 13a-c, along each of the four sides 250a, 250b, 250c and 250d of the racetrack surface 250, the lengths of each of the four segments making up the outer boundary 250x of each of these four sides are greater than the lengths of each of the four segments of the inner boundary of each of these four sides. This follows naturally where the racetrack surface 250 is generally rectangular in shape and from the inner boundary 250z being concentrically positioned within the outer boundary 250x. Thus, for example, the length of the outer boundary 250x of the side 250b is greater than the length of the inner boundary 250z of the side 250b. As is also clear from viewing FIG. 13-c, within the side 250b, there is also generally a corresponding difference in the lengths of the teeth 2252 positioned closer to the outer boundary 250x versus those positioned closer to the inner boundary 250z. More precisely, the outer teeth 2252x are each longer than the inner teeth 2252z that belong to the same conductive pad 2250, and the outer teeth 2252v are each longer than the inner teeth 2252w that belong to the same conductive pad 2250. In fact, the teeth 2252 that are closer to the outer boundary 250x are longer than the teeth 2252 that are closer to the inner boundary 250z in a manner that is generally proportional to the difference in the lengths of the outer boundary 250x in comparison to the inner boundary 250z along the side 250b.

This proportionality in tooth lengths enables the preferred constancy of the rates at which additional capacitances progressively decrease and correspondingly progressively increase between differing adjacent pairs of the conductive pads 2250, regardless of whether a tip of a digit is moved about the racetrack surface 250 in a manner that tends to overlie the outer boundary 250x, tends to overlie the inner boundary 250z, or tends to remain more centered between the outer and inner boundaries 250x and 250z, respectively. In other words, where a user tends to move a tip of a digit about the racetrack surface 250 in a manner that "rides" the outer boundary 250x, the proportionately longer teeth positioned closer to the outer boundary 250x ensure that the rates of decrease and increase of additional capacitance between each adjacent pair of the conductive pads 2250 remains constant during that movement. The longer length of travel that will be followed by that user's digit as its tip tends to overlie the outer boundary 250x necessarily means that the rates of decrease and increase in additional capacitance will be more gradual than if the user's tip were tending to overlie the inner boundary 250z, but these rates of decrease and increase along the outer boundary 250x will be the same between any two adjacent ones of the conductive pads 2250.

Unfortunately, such efforts as have been described to avoid the use of offset or weighting values in measuring capacitances and/or performing capacitance calculations by providing all of the conductive pads 2250 with shapes that result in relatively equal surface areas can be undone by other factors having little to do with the design of any of the conductive pads 2250. By way of example, where the substrate 2215 is generally ring shaped to enable other manually-operable controls (e.g., the navigation buttons 270a-d and the selection button 280 depicted in FIGS. 7b and 8) to be located so as to be surrounded by the racetrack surface 250 (as has been discussed in regard to FIG. 10a), it may not be possible to position the controller 2500 relative to the conductive pads 2250 such that conductive traces by which the controller 2500 is coupled to each of the conductive pads 2250 are able to all be of the same length. As those skilled in the art of shaping and routing conductors in a manner meant to control capacitances, longer runs of conductors tend to have different capacitances in comparison to shorter runs of conductors, unless there is an opportunity to in some way configure the longer and shorter runs, differently to balance their relative capacitances. Thus, it may be that differing lengths of conductors between the controller 2500 and each of the conductive pads 2250 ultimately necessitates the use of offset or weight values despite whatever care may be taken in the design of the conductive pads 2250, themselves.

In some implementations of this capacitive sensing variant of the touch sensor 220, weighting values for at least some of the conductive pads 2250 may be employed in calculations to compare levels of total or additional capacitance of adjacent ones of the conductive pads 2250 to determine the current position 260 of a tip of a finger between their central regions 2251 (i.e., over enmeshed ones of their teeth 2252) with greater precision. Such weighting values may be derived through a calibration of the controller 2500 in which the one conductive pad 2250 with the highest inherent capacitance is identified, and then comparisons are made between the inherent capacitance of that one conductive pads 2250 and all of the other conductive pads 2250.

It should be noted that although FIG. 13a depicts there being five of the conductive pads 2250 along each of the sides 250a-d (including the corner-type conductive pads 2250p that are shared between adjacent ones of the sides 250a-d where they meet at the corners of the racetrack surface 250), alternate implementations of this capacitive sensing variant of the touch sensor 220 are possible in which other quantities of the conductive pads 2250 are employed. Indeed, other implementations are possible in which the sides 250a and 250b may be of different lengths from the sides 250c and 250d, and accordingly, a different quantity of the conductive pads 2250 are incorporated into the sides 250a and 250b from the quantity of the conductive pads 2250 that are incorporated into the sides 250c and 250d. As will be understood by those familiar with capacitive sensing technologies, although each of the sides 250a-d could have been implemented with a lesser quantity of the conductive pads 2250 than is depicted in FIGS. 13a-c, thus enabling a considerable simplification in the controller 2500 (and/or other components), such simplification would come at the cost of reduced accuracy in determining the current position 260 of the tip of a digit. Depending on the quantity of menu items 155 displayed along each of the sides 150a-d of the racetrack menu 150, such a reduction in accuracy may make operation of the user interface 1000 to select a particular one of the menu items 155 undesirably difficult for a user.

In considering the comparing of levels of additional capacitance imparted by a the proximity of a tip of a digit, it should be noted that the touch sensor 220 is a touch-sensitive sensor in spite of the cover 2210 preventing any tip of any digit from actually making contact with any of the conductive pads 2250, and in spite of this variant of capacitive sensing technology applied to this variant of the touch sensor 220 being unable to actually sense a physical contact with the cover 2210. As those skilled in the art will readily recognize, the variant of capacitive sensing technology being employed in this variant of the touch sensor 220 is actually a sensing of the proximity of a tip of a digit of a user's hand, and not a sensing of contact with that tip or of pressure applied by that tip. What makes the touch sensor 220 validly classifiable as "touch-sensitive" (i.e., what makes the touch-sensitive surface 225 provided by the cover 2210 sensitive to touch) is that the dielectric characteristics of a tip of a digit of a person's hand are such that the amount of additional capacitance that a tip of a digit of a person's hand is ever capable of imparting to any of the conductive pads 2250 is relatively small, and perhaps the imposition of a minimum capacitance threshold that renders the touch sensor 220 substantially unresponsive to a tip of a digit that is not close enough to be in contact with the cover 2210. Thus, a tip of a digit must be brought into contact with the cover 2210 (i.e., must actually touch the touch-sensitive surface 225) to be close enough to one or more of the conductive pads 2250 to impart a large enough capacitance to be reliably detectable, at all, and to perhaps meet a minimum capacitance threshold employed to distinguish such contact from other influences (e.g., electrostatic discharges, components of the device into which the touch sensor 220 is installed that have particular dielectric characteristics, etc.) that are also capable of imparting some measurable degree of capacitance. Thus, it is the imposed necessity of a tip of a digit touching the touch sensor 220 to operate it that makes the touch sensor 220 "touch sensitive" such that the cover 2210 can be said to provide the touch-sensitive surface 225.

With the identifying of which one or ones of the conductive pads 2250 have the highest additional capacitances and the more precise determining of the current position 260 of a tip of a digit having been done by the controller 2500, the controller 2500 either directly acts in response to the current position 260 of that tip or relays the current position 260 of that tip to another component or device. Where the touch sensor 220 is incorporated directly into an audio/visual device that also incorporates the controller 500, the controller 2500 and the controller 500 may be one and the same controller such that a single controller both directly determines the current position 260 of that tip and performs the various other functions previously described as being performed by the controller 500 in response to that current position 260 (as was earlier discussed with regard to FIG. 9). This may be the case in such audio/visual devices as the variants of the audio/visual device 100 of FIG. 1, 5 or 8, where both audio/visual presentation functions and touch sensing functions are performed within the same casing. Alternatively, where the touch sensor 220 is incorporated into a device that is physically separate from an audio/visual device that performs audio/visual presentation functions and/or functions that entail the receipt of audio/visual programs, the controller 2500 may be separate and distinct from such a controller as the controller 500 of FIGS. 4 and 9 such that the controller 2500 relays an indication of the current position 260 to that other controller. This may be the case where the touch sensor 220 is incorporated into such a device as one of the variants of the handheld remote control 200 of FIG. 1 or 7b. As an alternative to the controller 2500 relaying the current position 260 to another controller (e.g., the controller 500) where the two controllers are not one and the same, the controller 2500 may directly relay current capacitance levels of each of the conductive pads 2250 on a recurring basis to the other controller, thereby allowing the other controller to perform the function of determining the current position 260.

Figure 14:
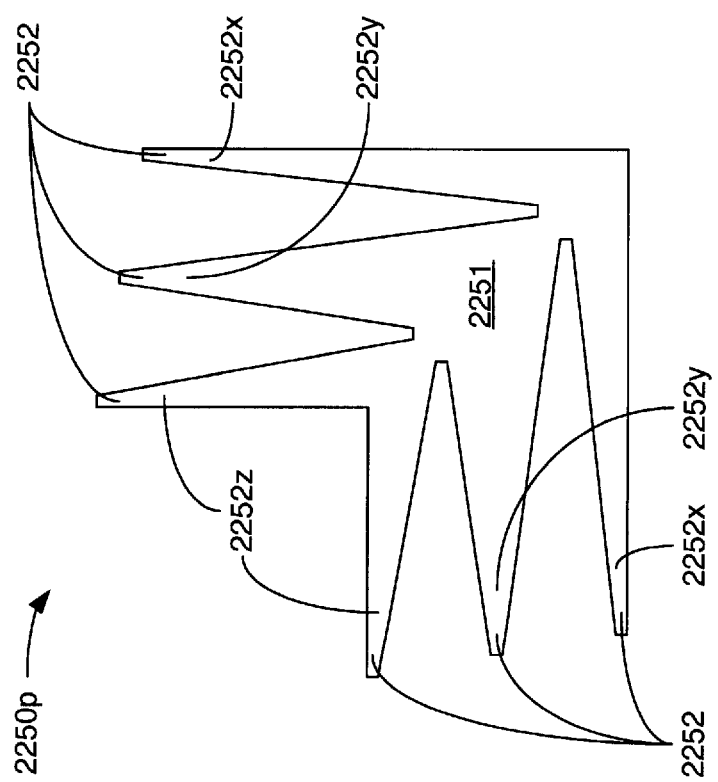
FIG. 14 depicts an alternate form of a corner-type conductive pad of the capacitive sensing variant of the touch sensor of FIGS. 13a-c.

FIG. 14 depicts an alternate form of the corner-type conductive pad 2250p of FIGS. 13a-c. In this alternate form, it is the corner-type conductive pad 2250p that extends a variant of the set of three teeth (namely an outer tooth 2252x, a tooth 2252y and an inner tooth 2252z) towards each conductive pad adjacent to it, whether that be the midpoint-type conductive pad 2250r, a variant of the interposer-type conductive pad 2250q, or still some other form of conductive pad (not shown). Whatever the type of the other conductive pads adjacent to this alternate form of the corner-type conductive pad 2250p, the three teeth 2252x-z of this alternate form and the central region 2251 of this alternate form are shaped to enable enmeshing with two teeth from each of the other conductive pads. Further, as was the case with the corner-type conductive pad 2252p of FIGS. 13a-c, this alternate form is shaped to enable matching ones of each of the two teeth from each of the adjacent other conductive pads to protrude into the central region 2251 of this alternate almost far enough to intersect. And still further, as was the case with the corner-type conductive pad 2252p of FIGS. 13a-c, this alternate form is shaped to enable one of the two teeth from each of the adjacent other conductive pads to protrude into the central region 2251 far enough towards the outer corner of this alternate form of the corner-type conductive pad to prevent the formation of a "dead zone" in the outer corner in which movement of the position 260 of a tip of a digit would be possible in the outer corner without being detected due to a lack of sufficient sensitivity.

Figure 15C:
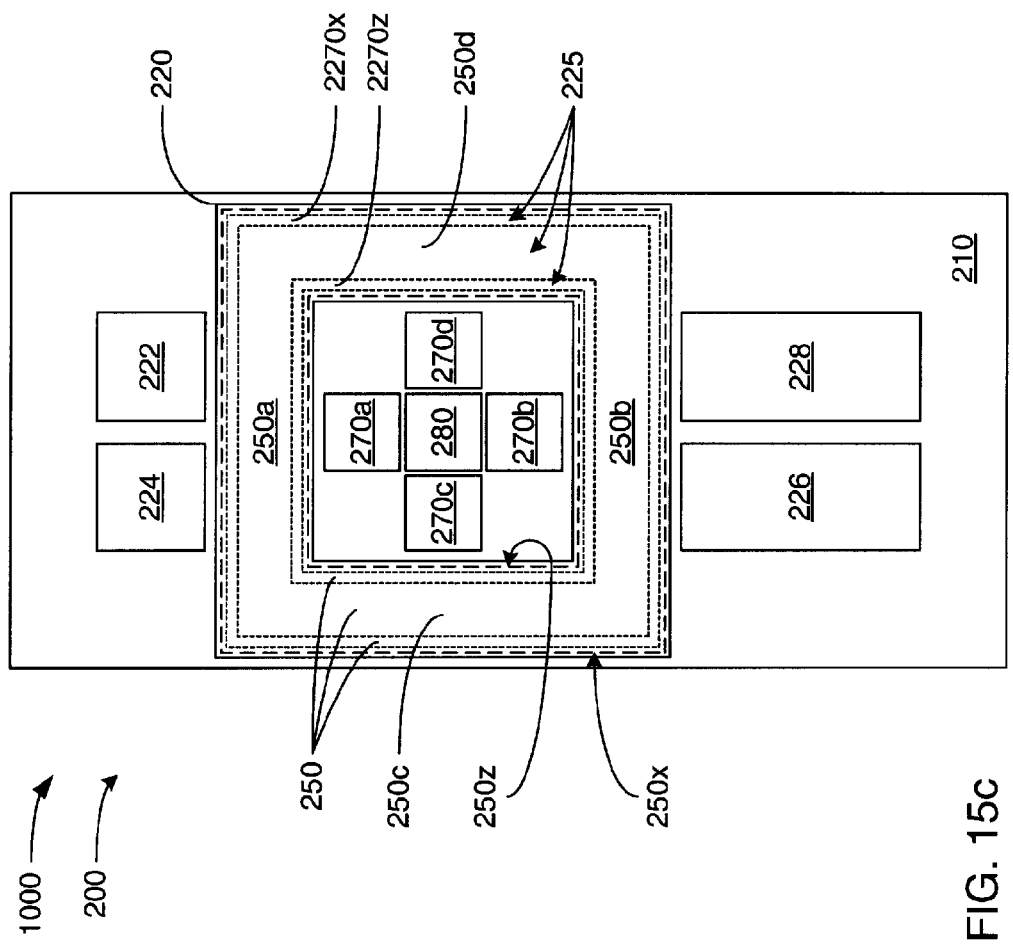

FIGS. 15a, 15b and 15c, taken together, depict additional details of an alternate form of the capacitive sensing variant of the touch sensor 220 of FIGS. 13a-c having a mechanism to aid in distinguishing operation of the racetrack surface 250 by a user from operation of other adjacent manually-operable controls (e.g., the additional manually-operable controls 222, 224, 226 and 228 depicted in FIGS. 7b and 8) by the user. FIG. 15a depicts the relative positions of various additional components of this alternate form of capacitive sensing variant of the touch sensor 220. FIG. 15b provides an enlarged view of a subset of various components of this alternate form. FIG. 15c depicts various aspects of the use of this alternate form in a variant of the handheld remote control 200. In addition to incorporating the various components described in reference to FIGS. 13a-c, this alternate form of the capacitive sensing variant of the touch sensor 220 of FIGS. 13a-c further incorporates a pair of conductive rings 2270.

Of the pair of conductive rings 2270, an outer ring 2270x follows and surrounds the rectangular ring shape formed by the conductive pads 2250 (i.e., follows and surrounds the perimeter of that rectangular loop), and an inner ring 2270z follows and is just inside that rectangular ring shape (i.e., follows and is just inside the perimeter of the area surrounded by the rectangular loop). Thus, the conductive rings 2270 cooperate with the conductive pads 2250 in defining the rectangular ring shape of the racetrack surface 250. As a result, the outer boundary 250x now follows the periphery of the outer ring 2270x, and the inner boundary 250z now follows and is just inside of the inner conductive ring 2270z. In other words, the distance between the outer boundary 250x and the inner boundary 250z is widened (in comparison to what it was in FIGS. 13a-c) to add the conductive rings 2270 therebetween.

As depicted, the conductive rings 2270 are disposed on the same surface of the substrate 2215 as the conductive pads 2250. The cover 2210 is layered over the conductive rings 2270, in very much the same way as it is layered over the conductive pads 2250, with the result that the conductive rings 2270 are "sandwiched" between at least the cover 2210 and the substrate 2215 in much the same way as the conductive pads 2250. The controller 2500 monitors the level of capacitance of each of the conductive rings 2270 on a recurring basis (just as the controller 2500 monitors the level of capacitance of each of the conductive pads 2250) to detect the proximities of each of the conductive rings 2270x and 2270z to a tip of a digit of a user's hand.

As has been previously discussed, one of the features of the user interface 1000 is that the racetrack menu 150 may be caused to be displayed in response to a user simply placing a tip of a digit on the racetrack surface 250 defined on the touch sensor 220. Where the racetrack surface 250 is provided by a capacitive-sensing variant of the touch sensor 220 in a manner and at a position on a casing of a device that does not result in other manually-operable controls being positioned adjacent to the racetrack surface 250, it is relatively unlikely that a user will bring a portion of a digit of one of their hands into contact with the racetrack surface 250 inadvertently while attempting to use that digit to operate some other manually-operable control. However, as has been previously depicted and discussed, the touch sensor 220 may be disposed on a casing of a device at a location that is in close proximity to other manually-operable controls in a manner such as is depicted in FIGS. 7b and 8, where other manually-operable controls may be positioned relatively close to the outer boundary 250x (e.g., the manually-operable controls 222, 224, 226 and 228) and/or within the area surrounded by the inner boundary 250z (e.g., the manually-operable controls 270a-d and 280). As has also been previously depicted and discussed, variants of the touch sensor 220 are possible that provide a form of the touch-sensitive surface 225 on which other control surfaces in addition to the racetrack surface 250 are defined as an alternate implementation of manually-operable controls (i.e., an alternative to manually-operable controls that are entirely separate from the touch sensor 220), such as the navigation surfaces 270a-d and the selection surface 280 specifically depicted in FIGS. 10b and 12.

Thus, it is possible that a user may extend a tip of a digit towards a manually-operable control (whether it is a separate manually-operable control or a control surface defined on the touch-sensitive surface 225) positioned adjacent to a portion of the racetrack surface 250 with the intention of operating only that manually-operable control, but the close proximity of that tip or another portion of that digit may come close enough to that portion of the racetrack surface 250 to impart sufficient additional capacitance to one or more of the conductive pads 2250 that the controller 2500 may be caused to misinterpret the user's actions as interaction by the user with the racetrack surface 250. This could occur despite the imposition of minimum capacitance threshold for the conductive pads 2250. Such a situation is likely to arise where a user holds a portable form of a device into which the touch sensor 220 is incorporated (e.g., one of the earlier-discussed portable variants of the audio/visual device 100 or one of the earlier-discussed variants of the handheld remote control 200) in one of their hands in a manner in which they tend to operate a manually-operable control that is in close proximity to the racetrack surface 250 by extending a portion of one of their digits over a portion of the racetrack surface 250 to bring the tip of that digit into contact with that manually-operable control such that a sufficient amount of additional capacitance is imparted as to cause such a misinterpretation by the controller 2500.

Such a situation may also arise where a user is simply a bit "sloppy" about how they position the tip of a digit that they use to operate a manually-operable control (whether it is entirely separate from the touch sensor 220 or is a control surface defined on the touch-sensitive surface 225 of the touch sensor 220) adjacent to the racetrack surface 250 to the extent that a portion of that tip overlies one or more of the conductive pads 2250, as well as the manually-operable control that the user intended to operate. FIG. 15b more clearly illustrates this situation in which the position 260 of a tip of a user's digit may or may not be neatly located over the midpoint-type conductive pad 2250r along the side 250b of the racetrack surface 250 such that the position 260 of that tip is centered between the outer boundary 250x and the inner boundary 250z. As can be seen, where the position 260 of that tip is not centered in that manner, the position 260 may overlie only one or the other of the conductive rings 2270, and therefore, the fact of that tip not being centered in that manner is detectable via the conductive rings 2270.

FIG. 15c illustrates the relative positions of the conductive rings 2270, along with the outer boundary 250x and the inner boundary 250z of the racetrack surface 250, relative to the manually-operable controls 222, 224, 226, 228, 270a-d and 280 of the handheld remote control 200 of FIG. 7b. As can be seen, the close proximity of the manually-operable controls 222, 224, 226 and 228 to various portions of the outer boundary 250x makes possible instances in which operation of these manually-operable controls may lead to a portion of a digit being brought into close enough proximity to one or more of the conductive pads 2250 for sufficient additional capacitance to be imparted to cause a misinterpretation by the controller 2500. However, as can also be seen, the location of the outer conductive ring 2270x along the outer boundary 250x enables the outer conductive ring 2270x to be employed (as will be explained) by the controller 2500 to aid in avoiding such misinterpretations. Similarly, it can be seen that the placement of the manually-operable controls 270a-d and 280 within the area surrounded by the racetrack surface 250, along with the close proximity of the manually-operable controls 270a-d to the inner boundary 250z, may also lead to the imparting of sufficient additional capacitance to cause a misinterpretation by the controller 2500 as a portion of a digit may overlie a portion of the racetrack surface 250 as a user attempts to operate one of the manually-operable controls 270a-d or 280 with the tip of that digit. However, as can also be seen, the location of the inner conductive ring 2270z along the inner boundary 250z enables the inner conductive ring 2270z to be employed (again, as will be explained) by the controller 2500 to aid in avoiding such misinterpretations.

The result of such misinterpretations of a user's actions by the controller 2500 will usually be nothing more than the displaying of the racetrack menu 150 at times when the user did not need or want the racetrack menu 150 to be displayed. Since relatively greater pressure must be applied to the racetrack surface 250 to actually select a menu item 155 of the racetrack menu 150, inadvertent selections are unlikely to occur unless the user is sufficiently sloppy in the manner in which they position the tip and/or another portion of a digit that they do apply sufficient pressure to the racetrack surface 250 while attempting to operate another manually-operable control. However, even just the occasional unwanted appearance of the racetrack menu 150 is not desirable, and so an ability to more precisely distinguish between a user attempting to interact with the racetrack surface 250 and a user attempting to operate a manually-operable control (whether an entirely separate manually-operable control or a control surface defined on the touch-sensitive surface 225) other than the racetrack surface 250 is desirable.

In one approach to using the conductive rings 2270 to distinguish user operation of the racetrack surface 250 from user operation of other manually-operable controls, the controller 2500 simply compares any additional capacitance imparted to the outer conductive ring 2270x to any additional capacitance imparted to the inner conductive ring 2270z at recurring intervals. During intervals in which the additional capacitance imparted to both of these conductive rings 2270 is relatively equal (i.e., during intervals where the additional capacitances imparted to these conductive rings 2270 are similar enough to meet a predetermined threshold of similarity), amounts of additional capacitance imparted to one or more of the conductive pads 2250 are assumed to be indications of a user's efforts to interact with the racetrack surface 250, and the controller 2500 responds to those additional capacitances in the manner that has been previously described, at length, including causing the racetrack menu 150 to be displayed, and moving the marker 160 about the racetrack menu 150 in a manner corresponding to the position 260 of the tip of a digit of a user's hand. The presumption is made that if a relatively equal amount of additional capacitance is imparted to each of the conductive rings 2270, it must be due to a tip of a user's digit being positioned between the conductive rings 2270, and therefore, is being positioned by the user to interact with the racetrack surface 250. Further, during intervals in which the additional capacitances imparted to these conductive rings 2270 is relatively unequal (i.e., during intervals where the additional capacitances imparted to these conductive rings 2270 is dissimilar enough to not meet the predetermined threshold of similarity), the controller 2500 ignores any additional capacitances imparted to the conductive pads 2250. Indeed, while the additional capacitances imparted to each of the conductive rings 2270 remain unequal to such an extent (i.e., not meeting the predetermined threshold of similarity), the controller 2500 may reduce power consumption by disabling and/or otherwise removing power from whatever oscillators, counters and/or other circuitry is employed in monitoring the capacitance levels of the conductive pads 2250.

In another approach, the controller 2500 simply determines whether or not separate minimum capacitance thresholds set for each of the conductive rings 2270 are met at recurring intervals to distinguish user operation of the racetrack surface 250 from user operation of other manually-operable controls. During intervals in which the additional capacitance imparted to both of these conductive rings 2270 is enough to meet the separate minimum capacitance thresholds for each, amounts of additional capacitance imparted to one or more of the conductive pads 2250 are assumed to be indications of a user's efforts to interact with the racetrack surface 250. The presumption is made that if such amounts of additional capacitance are imparted to each of the conductive rings 2270, it must be due to a tip of a user's digit being positioned between the conductive rings 2270, and therefore, is being positioned by the user to interact with the racetrack surface 250. Further, during intervals in which the additional capacitances imparted to either of these conductive rings 2270 does not meet the separate minimum capacitance threshold for that one of these conductive rings, the controller 2500 ignores any additional capacitances imparted to the conductive pads 2250, and the controller 2500 may reduce power consumption by disabling and/or otherwise removing power from whatever oscillators, counters and/or other circuitry is employed in monitoring the capacitance levels of the conductive pads 2250.

In yet another approach, the additional capacitances imparted to any of the conductive pads 2250 may be treated by the controller 2500 as valid indications of a user interacting with the racetrack surface 250 (and responded to by the controller 2500, accordingly) even though the additional capacitances imparted to each of the conductive rings 2270 may be highly unequal. In this approach, any additional capacitances imparted to each of the conductive rings 2270 are compared to any additional capacitances imparted to the conductive pads 2250 on a recurring basis. During intervals in which the additional capacitance imparted to at least one of the conductive rings 2270 is does not excessively exceed the highest additional capacitance imparted to any of the conductive pads 2250 (i.e., if the additional capacitance imparted to either of the conductive rings is not greater than the highest additional capacitance imparted to any of the conductive pads 2250 by an amount that exceeds a predetermined threshold of difference), amounts of additional capacitance imparted to one or more of the conductive pads 2250 are assumed to be indications of a user's efforts to interact with the racetrack surface 250. The presumption is made that such conditions will only be met if a user has positioned the tip of a digit such that it overlies portions of at least one of the conductive rings 2270 and at least one of the conductive pads 2250 to such an extent that more of that tip must overlie those portions of at least one of the conductive rings 2270 and at least one of the conductive pads 2250 than overlies any other manually-operable control that may be adjacent to the racetrack surface 250. Further, during intervals in which the additional capacitance imparted to one of the conductive rings 2270 sufficiently exceeds the highest additional capacitance imparted to any of the conductive pads 2250 (i.e., during intervals where the additional capacitance imparted to one of the conductive rings 2270 is greater than the highest additional capacitance imparted to any of the conductive pads by an amount that does exceed the threshold of difference), the controller 2500 ignores any additional capacitances imparted to the conductive pads 2250. The presumption is made that such conditions will only be met if a user has positioned a tip of a digit at a location adjacent to the racetrack surface 250 (presumably to operate another manually-operable control) that is close enough to the racetrack surface 250 to impart a relatively large additional capacitance to the closest one of the conductive rings, but not close enough to the racetrack surface 250 to impart a similarly large additional capacitance to any of the conductive pads 2250.

This other approach may be further refined by providing a different threshold of difference in additional capacitance for at least some of the conductive pads 2250 located relatively close to another manually-operable control from the threshold of difference in additional capacitance that is provided to at least some of the conductive pads 2250 that are not located relatively close to another manually-operable control. For example, and referring to both FIGS. 15*b* and 15*c*, a first threshold of difference in additional capacitance may be employed in a comparison of addition capacitances imparted to one of the conductive pads 2250 along the side 250*d* and to the outer conductive ring 2270*x*, while a second threshold of difference in additional capacitance may be employed in a comparison of additional capacitances imparted to one of the conductive pads 2250 along the side 250*b* and the outer conductive ring 2270*x*. With there being no other manually-operable controls adjacent to the outer boundary 250*x* along the side 250*d*, there is clearly little likelihood of a misinterpretation of an additional capacitance being imparted to a conductive pad 2250 along the side 250*d* as a result of a user tending to position the tip of a digit along the outer boundary 250*x* on the side 250*d* while trying to operate another manually-operable control. Thus the threshold of the difference in additional capacitance by which the amount of additional capacitance imparted to the outer ring 2270*x* may be greater than the amount of additional capacitance imparted to a conductive pad 2250 within the side 250*d* may be allowed to be relatively great. In contrast, with the manually-operable controls 226 and 228 being adjacent to the outer boundary 250*x* along the side 250*b*, there is far greater likelihood of a misinterpretation of an additional capacitance being imparted to a conductive pad 2250 along the side 250*b* as a result of a user tending to position the tip of a digit along the outer boundary 250*x* on the side 250*b* while trying to operate another manually-operable control. Thus the threshold of the difference in additional capacitance by which the amount of additional capacitance imparted to the outer ring 2270*x* may be greater than the amount of additional capacitance imparted to a conductive pad 2250 within the side 250*b* must be made narrower so that more of the tip of a digit must overlie at least one of the conductive pads 2250 of the side 250*b* to impart sufficient additional capacitance to it to more closely match the additional capacitance imparted to the outer ring 2270*x* to thereby meet the narrower threshold.

As can be appreciated from FIGS. 15*a-b*, the surface areas of the outer conductive ring 2270*x* and the inner conductive ring 2270*z* are likely to be very different from each other, and the surface areas of either of these two conductive rings 2270 are likely to be very different from the surface areas of any of the conductive pads 2250. Where each of the conductive pads 2250 and each of the conductive rings 2270 are employed as a capacitive element in a RC network coupled to an oscillator as part of measuring their capacitances on a recurring basis, it may be that offset and/or weighting values are employed to enable comparisons of additional capacitances between each of the conductive rings 2270 and each of the conductive pads 2250, or it may be that differing calibrations of each of the conductive rings 2270 in comparison to the conductive pads 2250 are employed. More precisely, the calculations employed by the controller 2500 to compare additional capacitances of either of the conductive rings 2270 to additional capacitances of any of the conductive pads 2250 may include one or more offset or weighting values to at least compensate for differing inherent capacitances arising from differing surface areas. Alternatively, the resistance values employed in one or more of the RC networks for at least the conductive rings 2270 may be made to differ from the resistance values employed in the RC networks for the conductive pads 2250, and/or capacitors may be added in parallel with each of the conductive pads 2250 to give each of the conductive pads 2250 an inherent capacitance similar to the inherent capacitance of at least one of the conductive rings 2270.

Figure 16A:
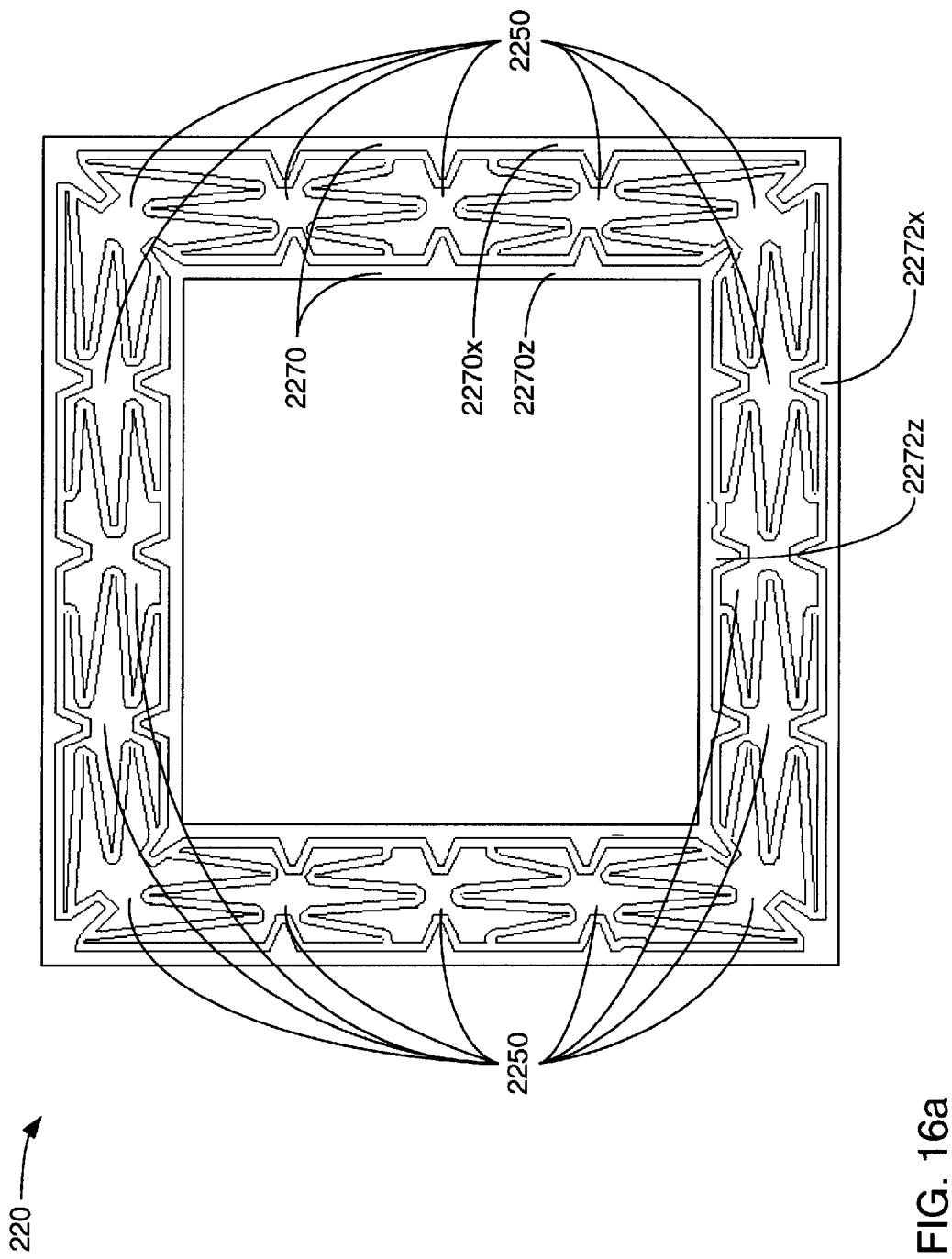
FIG. 16a depicts an alternate form of the conductive rings of the alternate form of the capacitive sensing variant of the touch sensor of FIGS. 15a-c.

FIGS. 16*a* and 16*b* depict alternate aspects of the conductive rings 2270. FIG. 16*a* depicts a further modified form of the capacitive sensing variant of the touch sensor 220 of FIGS. 13*a-c* in which some amount of surface area has been taken from each of the conductive pads 2250 to make room for increasing the surface areas of one or both of the conductive rings 2270 introduced in regard to FIGS. 15*a-c*. FIG. 16*b* depicts a resistance sensing variant of the touch sensor 220 in which the conductive rings 2270 are either employed in a resistance sensing mode or in a capacitive sensing mode.

As depicted in FIG. 16*a*, one or both of the conductive rings 2270*x* and 2270*z* may be formed to further incorporate teeth 2272*x* and 2272*z*, respectively. The 2272*x* and/or 2272*z* (whichever ones of these are present) protrude into the central regions 2251 of each of the conductive pads 2250 in a manner not unlike the teeth 2252 of adjacent ones of the conductive pads 2250. It may be that only the inner conductive ring 2270*z* is provided with such teeth, while the outer conductive ring 2270*x* is not in order to increase the surface area of the inner conductive ring 2270*z* to match the surface are of the outer conductive ring 2270*x* so that additional capacitances imparted to each may be directly compared without the use of offset values, weighting values, or other compensation approaches entailing adjusting resistive or capacitive values of a RC network. Alternatively, it may be that one or both of the conductive rings 2270 are provided with such teeth, and that the size and shape of different ones of these teeth are varied so as to protrude into the central regions 2251 of one or more of the conductive pads 2250 with differing depths as part of an approach to equalizing the surface areas of the conductive pads 2250.

In yet another alternative, both of the conductive rings 2270*x* and 2270*z* may be provided with the teeth 2272*x* and 2272*z*, respectively, to increase the surface areas of these conductive rings to increase their sensitivity to the proximity of a tip of a user's digit in comparison to the sensitivity of the conductive pads 2250 to the proximity of that tip. Such increased sensitivity of the conductive rings 2270 may improve the ability of the controller 2500 to distinguish between use of that tip by the user to interact with the racetrack surface 250 and use of that tip to operate a different manually-operable control at a location adjacent a portion of the racetrack surface 250. Further, such increased sensitivity may allow the controller 2500 to more quickly detect the approach of that tip towards the racetrack surface 250, thereby allowing speedier powering up of oscillators and/or other components employed by the controller 2500 to monitor the capacitances of each of the conductive pads 2250 on a recurring basis during periods of time where that tip is in close enough proximity to both of the conductive rings 2270 that it is presumed that the user intends to interact with the racetrack surface 250.

In FIG. 16*b*, a differing arrangement of conductive pads is employed in conjunction with a sheet of conductive foam 2212 sandwiched between the cover 2210 and both those pads and the conductive rings 2270*x* and 2270*z* to form this resistance sensing variant of the touch sensor 220. As those familiar with this form of resistance sensing technology applied to manually-operable controls will readily recognize, the conductive foam 2212 is typically a foam impregnated with particles of conductive material that allow a flow of current through the foam at a relatively high resistance when the conductive foam 2212 is not compressed. However, the relatively high resistance through a localized portion of the conductive foam 2212 is reduced roughly in proportion to the degree to which it is compressed (i.e., elastically deformed) at that locality, such that greater pressure applied to further compress that portion of the conductive foam 2212 results in a relatively lesser resistance to the flow of a current therethrough. To enable this, the cover 2210 must be made sufficiently flexible to allow compression of only a portion of the conductive foam 2212 via pressure applied to the conductive foam 2212 via a tip of a digit through the cover 2210. Amounts of resistance between adjacent conductive pads may be measured on a recurring basis to detect instances of portions of the conductive foam 2212 being compressed. Alternatively, the cover 2210 may incorporate flexible conductive materials to convey a current from the cover 2210 to conductive pads through the conductive foam 2212, and conductive pads may be monitored on a recurring basis to determine the resistance between the flexible conductive materials carried by the cover 210 and the conductive pads through the conductive foam.

Unlike the physical configuration of the capacitive sensing variant of the touch sensor 220 more completely depicted in perspective in FIG. 13*a* in which the touch-sensitive surface 225 and the rest of the touch sensor 220 was formed in a ring shape to allow other completely separate manually-operable controls to be positioned so as to project through the middle of the touch sensor 220 and be surrounded by the racetrack surface 250 (as was described in reference to FIG. 10*a*), FIG. 16*b* depicts this resistance sensing variant of the touch sensor 220 as having a physical configuration in which the touch-sensitive surface 225 is a continuous surface on which additional control surfaces providing the equivalent of manually-operable controls that are entirely separate from this variant of the touch sensor 220 are defined along with the racetrack surface 250 on the touch-sensitive surface 225 (akin to what was described in reference to FIG. 10*b*). Further, unlike the capacitive sensing variants of the touch sensor 220 of FIGS. 13*a*-*c*, 14, 15*a*-*c* and/or 16*a* where an inability of the capacitive sensing technology used to sense the additional pressure applied by a user to select a menu item 155 on the racetrack menu 150 might require the use of at least one of the selection switches 221 and the substrate 2215 that was separate from the PCB 215, the use of a resistance sensing technology (depending on the exact characteristics of the conductive materials used) may enable a combination of conductive pads and the conductive foam 2212 to be used to sense that additional pressure without incorporating a separate selector switch. Thus, the touch sensor 220 may be formed directly on the PCB 215, and not on a separate substrate (such as the substrate 2215).

The conductive rings 2270 in this resistance sensing variant of the touch sensor 220 may be employed in a resistance sensing mode in which they are monitored by the controller 2500 to measure resistance through portions of the conductive foam 2212. In this resistance sensing mode, the controller 2500 may compare the resistance by which current is conveyed to or from each of the conductive rings 2270 to determine whether those resistances are sufficiently similar (i.e., within a predetermined threshold of similarity) or sufficiently low (i.e., dropping below a predetermined threshold, or below separate predetermined thresholds, of resistance) that it may be assumed that a tip of a user's digit is applying pressure along the racetrack surface 250 at a location relatively centered between the conductive rings 2270, and therefore, is being employed to interact with the racetrack surface 250. Alternatively, the conductive rings 2270 may be employed in a capacitive sensing mode in which they are monitored by the controller for levels of additional capacitance in much the same way as has been discussed at length with regard to the capacitive sensing variants of the touch sensor 220 of FIGS. 13*a*-*c*, 14, 15*a*-*c* and/or 16. To better enable this capacitive sensing mode, it is preferred that insulators be placed between the conductive foam 2212 and the conductive rings 2270, or that the shape and size of the conductive foam 2212 be such that it does not overlie either of the conductive rings 2270 so as to not make electrical contact with either of the conductive rings 2270. In this capacitive sensing mode, the conductive rings 2270 could be monitored at recurring intervals to determine when a tip of a user's digit is in close enough proximity to the racetrack surface 250 that the controller 2500 is caused to power up whatever components are required to monitor levels of resistance for conductive pads associated with the racetrack surface 250 only during times when that tip is in such close proximity.

Still another variant (not shown) of the touch sensor 220 is possible that employs a different hybrid of capacitive sensing and resistance sensing technologies in which a resistance sensing element providing multiple resistance sensing points is layered atop an array of capacitive sensing conductive pads and/or the conductive rings 2270. It may be that the capacitive sensing technology is used in determining the position 260 of a tip of a digit along the racetrack surface 250, while the resistance sensing technology is used in distinguishing between instances in which relatively low pressure is being applied by a user through that tip such that it is determined that the user is not making a selection of a menu item and instances in which relatively greater pressure is being applied by a user through that tip such that it is determined that the user is making a selection of a menu item. It may be that the conductive rings 2270 are employed in sensing levels of capacitance to distinguish between user interaction with the racetrack surface 250 and user operation of a manually-operable control adjacent the racetrack surface 250 (whether a manually-operable control that is entirely separate from the touch sensor 220 or a manually-operable control implemented as a control surface defined on the touch-sensitive surface 225 of the touch sensor 220).

Figure 17:
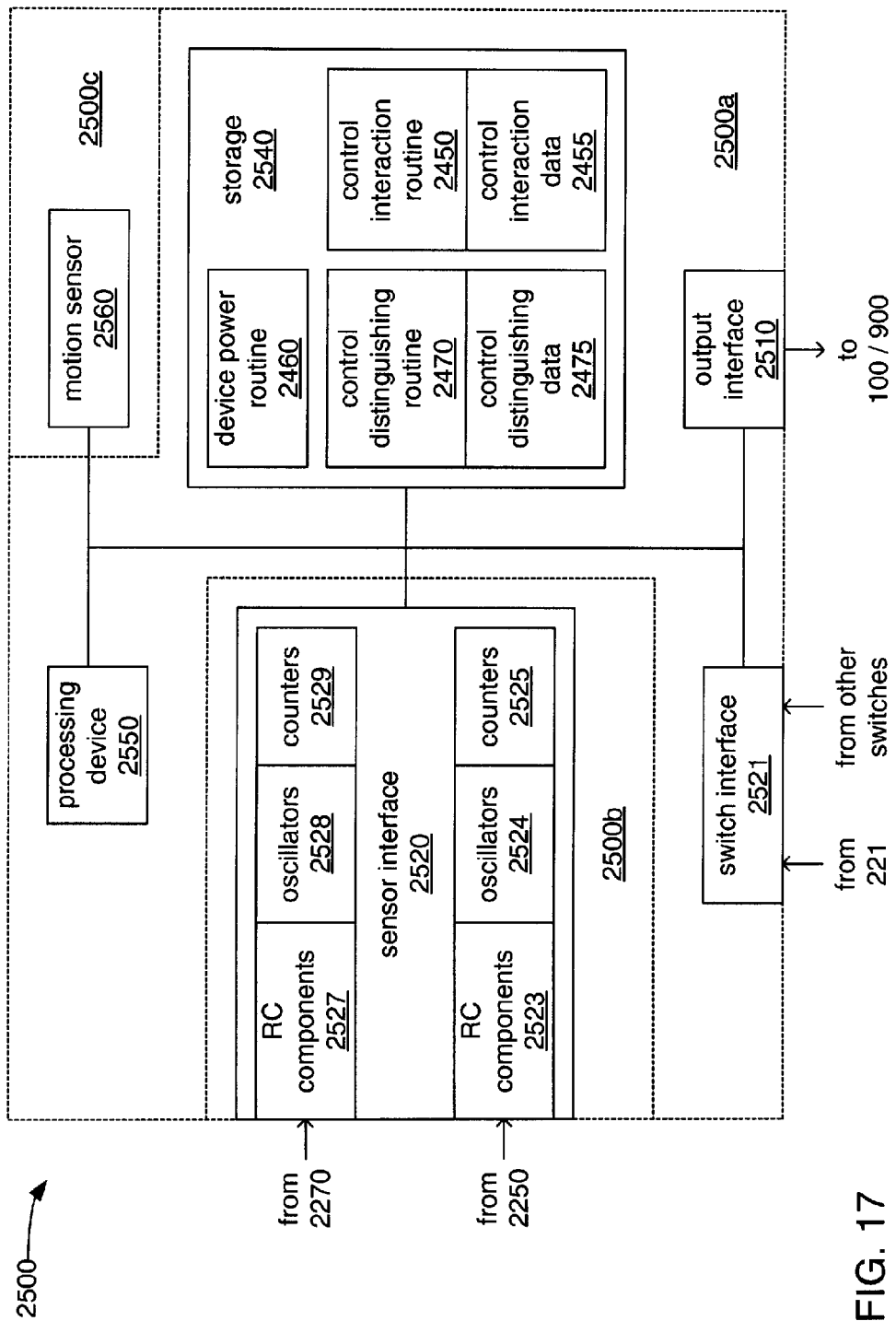
FIG. 17 is a block diagram of a controller of any of the various capacitive or resistance sensing variants of touch sensors of any of FIGS. 13a-c, FIGS. 15a-c or FIGS. 16a-b.

FIG. 17 is a block diagram of a possible architecture of the controller 2500 in which the controller 2500 incorporates at least a sensor interface 2520, a switch interface 2521, a storage 2540, a processing device 2550, an motion sensor 2560, and perhaps also an output interface 2510. The processing device 2550 is coupled to each of the sensor interface 2520, the switch interface 2521, the storage 2540, the motion sensor 2560 and perhaps also the output interface 2510 to at least coordinate the operation of each to perform at least the above-described functions of the controller 2500. As with the processing device 550 and the storage 540 of the possible architecture for the controller 500 depicted in FIG. 9, the processing device 2550 and the storage 2540 may be any of a variety of types of processing device and storage, respectively, based on any of a variety of technologies.

Each of the output interface 2510, the sensor interface 2520 and the switch interface 2521 may employ any of a variety of technologies to enable the controller 2500 to communicate with other devices and/or other components of whatever audio/visual device into which the controller 500 is incorporated. More specifically, where the controller 2500 is a separate and distinct controller from the controller 500 and where the controller 500 is incorporated into an audio/visual device that also incorporates one or both of a display element (such as the display element 120) and at least one acoustic driver (such as the acoustic drivers 130), the output interface 510 may be of a type to provide communications at least from the controller 2500 to the controller 500 to convey indications of the operation of various manually-operable controls to the controller 2500. An example of this would be where the controller 2500 is incorporated into the handheld remote control 200 of FIGS. 1, 7b and/or 15c, and the controller 500 is incorporated into one of the many possible variants of the audio/visual device 100 or 900. The output interface 2510 may be of a type employing cabling-based and/or a wireless signaling (perhaps signaling conforming to one of the previously listed industry standards) to transmit a signal to the controller 500 to convey such indications. Depending on the technology employed by whatever form of touch sensor 220 and/or depending on other factors, it may be deemed desirable to not only have separate ones of the controllers 500 and 2500, but it may also be deemed desirable to split apart the components of the controller 2500 into separate physical packages (perhaps separate integrated circuit packages) that are disposed in different locations within whatever device into which the touch sensor 220 is incorporated. This may be seen as desirable in variants of the touch sensor 220 that employ the combination of the substrate 2215 and the PCB 215. A main portion of the controller 2500 (designated 2500a in FIG. 17) may be disposed on the PCB 215 to enable more advantageous electrical couplings with manually-operable controls other than the touch sensor 220 (e.g., one or more of the selection switches 221), while a secondary portion of the controller 2500 (designated 2500b in FIG. 17) may be disposed on the substrate 2215 to enable more advantageous electrical couplings with portions of the touch sensor 220 (e.g., the conductive pads 2250 and/or the conductive rings 2270). Still further, where perhaps the motion sensor 2560 is based on sufficiently different electronic technology than other components of the controller 2500 (e.g., an accelerometer, gyroscope, tilt switch or other component based on micro-electromechanical systems technology), the motion sensor 2560 may constitute yet another portion of the controller 2500 (designated 2500c in FIG. 17) that is physically distinct from the main portion 2500a. In such an example configuration, this other portion 2500c (i.e., the motion sensor 2560) may also be disposed on the PCB 215 to enable a more advantageous electrical coupling with the main portion 2500a.

It is also possible that both of the controllers 500 and 2500 are co-located within the same audio/visual device having an overall architecture in which it is deemed desirable to split the controller functions for monitoring manually-operable controls from the controller functions involved in displaying the racetrack menu 150 and acting on indications of a user's selection of a audio/visual program. Alternatively, and as previously mentioned, where the touch sensor 200 (of whatever variant) is incorporated directly into the same audio/visual device in which one or both of the functions of displaying the racetrack menu 150 and selecting sources from which to obtain audio/visual programs are carried out, then it may be deemed desirable for the controllers 500 and 2500 to be one and the same controller (likely with the processing devices 550 and 2550 being one and the same, and likely with the storages 540 and 2540 being one and the same), in which case, incorporating the output interface 2510 would be unnecessary.

The sensor interface 2520 is coupled to the touch sensor 220 to monitor the touch sensor 220 for indications of a user operating it at least to interact with the racetrack surface 250. As depicted, the sensor interface 2520 is meant to monitor either the capacitive sensing variant of the touch sensor 220 of FIGS. 13a-c, 14, 15a-c and/or 16a, or the resistance sensing variant of the touch sensor 220 of FIG. 16b. The sensor interface 2520 incorporates RC components 2523, oscillators 2524 and counters 2525 to monitor conductive pads (e.g., the conductive pads 2550 of the capacitive sensing variant of the touch sensor 220), and incorporates RC components 2527, oscillators 2528 and counters 2529 to monitor the conductive rings 2570 of either variant of the touch sensor 220.

Stored within the storage 2540 are one or more of a control interaction routine 2450, a control interaction data 2455, a device power routine 2460, a control distinguishing routine 2470 and a control distinguishing data 2475. Upon being accessed in the storage 2540 and executed by the processing device 2550, a sequence of instructions of the device power routine 2460 causes the processing device 2550 to shift the manner in which manually-operable controls are monitored between different power modes; a sequence of instructions of the control distinguishing routine 2470 causes the processing device 2550 to employ indications of user activity from the touch sensor 220 distinguish user interaction with at least the racetrack surface 250 from user operation manually-operable controls adjacent to the racetrack surface 250 (whether separate from the touch sensor 220 or implemented as control surfaces defined on the touch-sensitive surface 225); and a sequence of instructions of the control interaction routine 2450 causes the processing device 2550 to employ indications of user activity from various manually-operable controls (including the touch sensor 220) to at least interpret user intentions (and perhaps also to convey indications of the user's operation of those various controls to the processing device 550).

Figure 18:
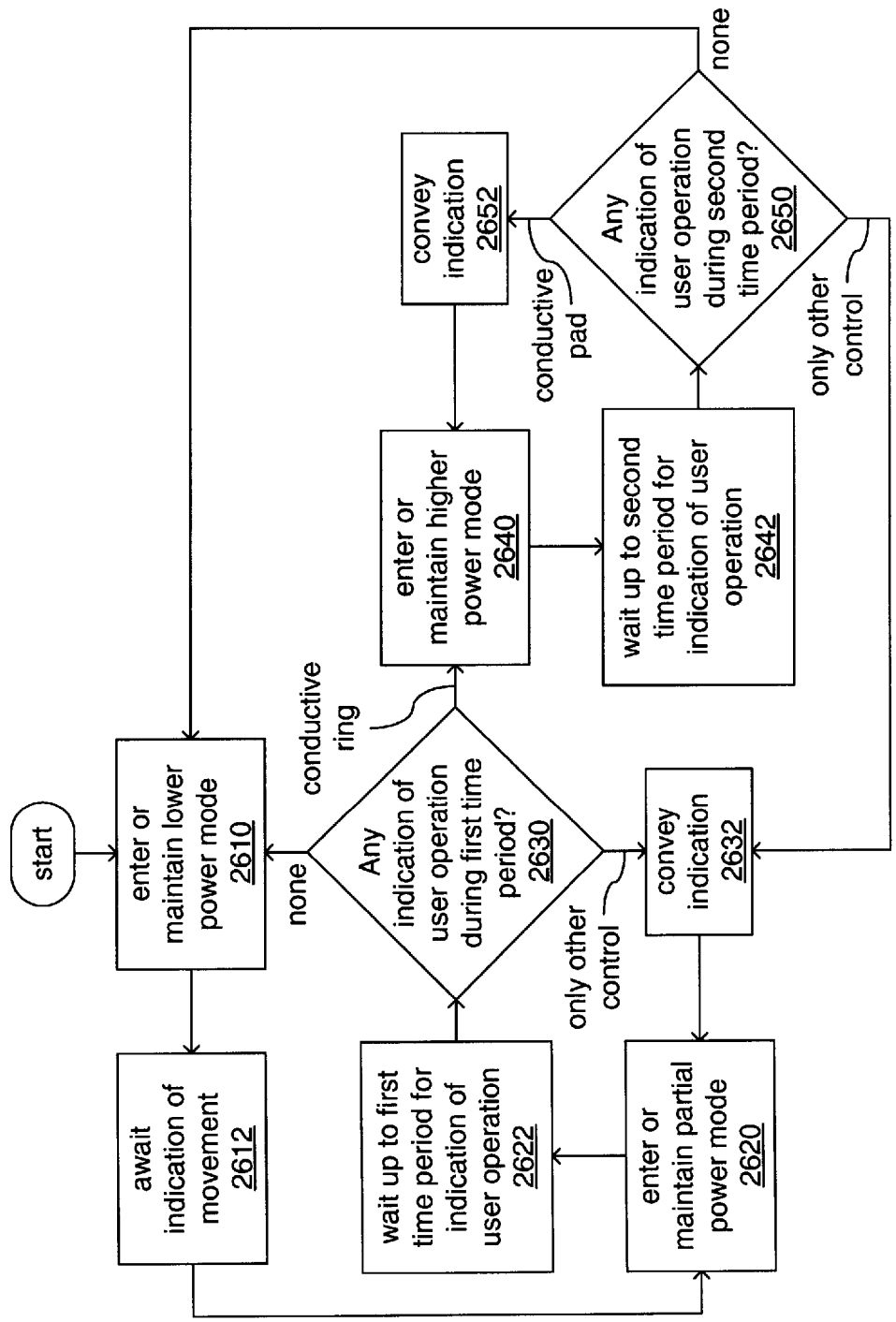
FIG. 18 is a flow chart of a manner in which the controller of FIG. 17 may balance power conservation and monitoring of the manually-operable of any of the various capacitive or resistance sensing variants of touch sensors of any of FIGS. 13a-c, FIGS. 15a-c or FIGS. 16a-b.

FIG. 18 is a flowchart depicting an implementation of a manner in which the sequences of instructions of the device power routine 2460, the control distinguishing routine 2470 and the control interaction routine 2450 may cooperate to cause the processing device 2550 to balance the monitoring of manually-operable controls and the conservation of electric power (and thereby, cause the controller 2500, overall, to balance the monitoring of manually-operable controls and the conservation of electric power). Generally, the sequence of instructions of the device power routine 2460 causes the processing device to place at least portions of the controller 2500 and at least some of the manually-operable controls to which the controller 2500 is coupled (including different portions of the touch sensor 220) in one of a lower power mode, a partial power mode and a higher power mode. Sequences of instructions of one or both of the control distinguishing routine 2470 and the control interaction routine 2450 are executed during the partial and higher power modes to monitor manually-operable controls for indications of their being operated by a user.

Beginning at 2610, generally, where there has been no indication of user interaction with either the touch sensor 220 or any other manually-operable control provided alongside the touch sensor 220 (e.g., one or more of the manually-operable controls 222, 224, 226, 228, 270*a-d* and 280) for more than a first predetermined time period, the power routine 2460 causes the processing device 2550 to place the controller 2500 and the touch sensor 220 in the lower power mode. In the lower power mode, the processing device 2550 is caused to disable and/or power off the sensor interface 2520 and the switch interface 2521 to conserve what may be a limited supply of electric power, such as may be the case where the touch sensor 220 and the controller 2500 are incorporated into one of the previously discussed variants of the handheld remote control 200, in which there is a limited available supply of electric power from a battery or other power source of limited capacity. During the lower power mode, and where the controller 2500 and the touch sensor 220 are incorporated into such a device as one of the variants of the handheld remote control 200, the processing device 2550 is caused by the device power routine 2460 to await an indication of movement at 2612 by monitoring the motion sensor 2560 for an indication of the device being moved, with the presumption being made that movement is likely an indication of a user picking up the device or otherwise preparing to operate one or more manually-operable controls of the device.

Upon the provision of an indication of movement by the motion sensor 2560, the processing device 2550 is caused by the device power routine 2460 to place the controller 2500 and the touch sensor 220 in the partial power mode at 2620. In the partial power mode, the processing device is caused to provide power to and/or enable only a portion of the sensor interface 2520, only a portion of the touch sensor 220, and at least a portion of the switch interface 2521. More precisely, some or all of the RC components 2527, the oscillators 2528 and the counters 2529 required to monitor at least the outer conductive ring 2270*x* (i.e., the inner conductive ring 2270*z* may also be monitored) are provided with power and enabled to monitor at least the outer conductive ring 2720*x* either for any additional capacitance imparted to it (indicative of a tip of a user's digit approaching the capacitive sensing variant or a hybrid variant of the touch sensor 220) or for a reduction in resistance between the conductive ring 2720*x* and another conductive surface (indicative of a tip of a user's digit beginning to press against the conductive foam 2212 to operate the earlier-discussed resistance sensing variant of the touch sensor 220). Also, more precisely, at least a portion of the switch interface 2521 is provided with power and enabled to monitor manually-operable controls other than the touch sensor 220, such as the controls 222, 224, 226 and 228 (if present); and possibly to also monitor the controls 270*a-d* and 280 (if the controls 270*a-d* and 280 are implemented as separate manually-operable controls and not implemented as control surfaces defined on the touch-sensitive surface 225 of the touch sensor 220). This monitoring occurs for up to a first predetermined time period at 2622, with the first predetermined time period starting from when movement was detected, and chosen to last long enough to provide a user with a reasonable opportunity to begin operating manually-operable controls after picking up or otherwise moving the device. If, at 2630, no indication of any operation of controls other than the touch sensor 220 is received and no indication of either additional capacitance or reduced resistance is detected through the outer conductive ring 2270*x* (or through the inner conductive ring 2270*z*, where it is also monitored during partial power mode) during the first predetermined time period, then the processing device is caused by the device power routine 2460 to place the controller 2500 and the manually-operable controls coupled to the controller 2500 back into lower power mode at 2610.

However, if, at 2630, during the first predetermined time period, an indication of user operation was received from one of the controls other than the touch sensor 220 (e.g., from one of the manually-operable controls 222, 224, 226 or 228 via the switch interface 2521 by which they are coupled to the controller 2500), then the processing device 2550 is caused to operate the output interface 2510 to cause an indication of that other manually-operable control being operated by a user to be conveyed to the controller 500 at 2632. Further, the partial power mode is maintained at 2620, and monitoring of both manually-operable controls other than the touch sensor 220 and of at least the outer conductive ring 2270*x* of the touch sensor 220 for another instance of the first predetermined time period occurs again at 2622.

Alternatively, if, at 2630, during the first predetermined time period, an indication of a tip of a user's digit at least approaching the proximity of the touch sensor 220 (if not actually beginning to operate the touch sensor 220) was received from the touch sensor 220 (e.g., from the outer conductive ring 2270*x* via the sensor interface 2520 by which the touch sensor 220 is coupled to the controller 2500), then the processing device 2550 is caused by the device power routine 2460 to place the controller 2500 and the touch sensor 220 in the higher power mode at 2640. In the higher power mode, the processing device is caused to provide power to and/or enable the entirety of the sensor interface 2520, the touch sensor 220, as well as the switch interface 2521. More precisely, all of the RC components 2527, the oscillators 2528 and the counters 2529 required to monitor both of the conductive rings 2270 are provided with power and enabled to monitor both the outer conductive ring 2270*x* and the inner conductive ring 2270*z*. Also, more precisely, all of the RC components 2523, the oscillators 2524 and the counters 2525 required to monitor conductive pads (e.g., the conductive pads 2250 in the capacitive sensing variant of the touch sensor 220) are provided with power and enabled. Further, the switch interface 2521 is fully provided (or continues to be provided) with power and enabled to monitor manually-operable controls other than the touch sensor 220, such as the controls 222, 224, 226 and 228 (if present); and possibly to also monitor the controls 270*a-d* and 280 (if the controls 270*a-d* and 280 are implemented as separate manually-operable controls and not implemented as control surfaces defined on the touch-sensitive surface 225 of the touch sensor 220). This monitoring occurs for up to a second predetermined time period at 2642, with the second predetermined time period being chosen to last long enough to provide a user with a reasonable opportunity to operate the touch sensor 220 (e.g., to interact with the racetrack surface 250). If, at 2650, no indication of any operation of controls, including the touch sensor 220, is received and no indication of either additional capacitance or reduced resistance is detected through either of the outer conductive ring 2270*x* or the inner conductive ring 2270*z* during the second predetermined time period, then the processing device is caused by the device power routine 2460 to place the controller 2500 and the manually-operable controls coupled to the controller 2500 back into lower power mode.

However, if, at 2650, during the second predetermined time period, an indication of user operation was received from one of the controls other than the touch sensor 220, then the processing device is caused to operate the output interface 2510 to cause an indication of that other control being operated by a user to be conveyed to the controller 500 at 2632. Further, the processing device 2550 is caused to place the controller and the touch sensor 220 back into partial power mode at 2620, and monitoring of both controls other than the touch sensor 220 and of at least the outer conductive ring 2270x for another instance of the first predetermined time period occurs again at 2622.

Alternatively, if, at 2650, during the second predetermined time period, an indication of a user operation was received from the touch sensor that is indicative of the user interacting with the racetrack surface 250 (or perhaps another control surface also defined on the touch-sensitive surface 225, such as control surfaces to implement the manually-operable controls 270a-d and 280), then the processing device 2550 is caused to operate the output interface 2510 to cause an indication of the touch sensor 220 being operated by a user to be conveyed to the controller 500 at 2652. Further, the processing device 2550 is caused by the device power routine 2460 to maintain the controller 2500 and the touch sensor 220 in the higher power mode at 2640, and to continue monitoring both controls other than the touch sensor 220 and the touch sensor 220 for another instance of the second predetermined time period at 2642.

During times when the device power routine 2460 causes the processing device 2550 to place the controller 2500 and the various controls coupled to it into the partial power mode, the device power routine 2460 enables the processing device 2550 to execute a sequence of instructions of the control interaction routine 2450 as part of causing the monitoring of controls other than the touch sensor 220 and the monitoring of at least the outer conductive ring 2270x. The control interaction routine 2450 causes the processing device 2550 to operate at least the counters 2529 to check for an additional capacitance or a reduced resistance at a recurring interval, causing the processing device 2550 to reset the counters 2529 each time.

During times when the device power routine 2460 causes the processing device 2550 to place the controller 2500 and the various controls coupled to it into the higher power mode, the device power routine 2460 enables the processing device 2550 to execute sequences of instructions of both the control interaction routine 2450 and the control distinguishing routine 2750 as part of causing the monitoring of manually-operable controls, including the entirety of the touch sensor 220 (including conductive pads of the touch sensor 220, such as the conductive pads 2250). The control interaction routine 2450 causes the processing device 2550 to operate the counters 2525 and 2529 to check for additional capacitance or reduced resistance at a recurring interval, causing the processing device 2550 to reset the counters 2525 and 2529 each time. The control interaction routine 2450 also causes the processing device 2550 to check the switch interface 2521 for indications of the selection switch(es) 22l and/or other switches (e.g., the manually-operable controls 222, 224, 226 and 228, where they are implemented as switches) being operated. In implementations of either a capacitive sensing or resistance sensing variant of the touch sensor 220 that requires the use of offset or weighting values in monitoring conductive pads (e.g., the conductive pads 2250 or other conductive pads that may be employed where the manually-operable controls 270a-d and 280 are implemented as control surfaces on the touch-sensitive surface 225) or in performing calculations to determine the current position 260 of a tip of a user's digit (as has previously been described at length), the control interaction data 2455 is made up of at least such offset or weighting values, and the control interaction routine 2450 causes the processing device 2550 to access the control interaction data 2455 to retrieve those offset or weighting values. The control distinguishing routine 2470 causes the processing device 2550 to perform the various possible comparisons and calculations previously discussed at length to employ the detected additional capacitances (in capacitive sensing variants of the touch sensor 220) or reduced resistances (in resistance sensing variants of the touch sensor 220) in distinguishing a user action intended to interact with the racetrack surface 250 from a user action to operate some other manually-operable control. Where the use of offset or weighting values in performing such calculations is required (such as in determining the current position 260 of a tip of a digit as that tip is moved by a user from overlying one of the conductive pads 2250 with one inherent capacitance to another of the conductive pads 2250 with a different inherent capacitance), the control distinguishing data 2475 is made up of at least such offset or weighting values, and the control distinguishing routine 2750 causes the processing device 2550 to access the control distinguishing data 2475 to retrieve those offset or weighting values.

In an alternate implementation of the manner in which the controller 2500 is caused to balance the monitoring of manually-operable controls and the conservation of electric power, the three earlier-described portions of the controller 2500 (namely, the portions 2500a, 2500b and 2500c) cooperate in various ways to toggle one another's separate power states to place the controller 2500, overall, and whatever manually-operable controls are coupled to the controller 2500 into one of the lower power, partial power and higher power mode. As discussed with regard to FIG. 18, where there is no indication of activity from any of the manually-operable controls (including the touch sensor) for a first predetermined period of time, the lower power mode is entered into and maintained until there is an indication from the motion sensor 2560 of movement. With the motion sensor 2560 (i.e., the portion 2500c) being coupled to the main portion 2500a of the controller, the processing device 2550 receives this indication of movement and is caused by the device power routine 2460 to transition to the partial power state, while also providing the indication of movement to the sensor interface 2520 (i.e., the portion 2500b) to cause the sensor interface 2520 to also enter the partial power state. With the main portion 2500a in the partial power state, the processing device 2550 is caused by the control interaction routine 2450 to monitor the switch interface for an indication of user operation of a manually-operable control implemented as a switch (e.g., possibly one of the manually-operable controls 222, 224, 226 or 228) for the first predetermined period of time, in addition to continuing to monitor the motion sensor 2560. Meanwhile, with the portion 2500b (i.e., the sensor interface 2520) also in the partial power state, an independent processing device (not shown) of the sensor interface 2520 provides power to and enables operation of the oscillators 2528 and the counters 2529 to the extent necessary to monitor at least the outer conductive ring 2270x for the first predetermined period of time.

If the processing device 2550 receives no indication of either further motion from the motion sensor 2560 or operation of a manually-operable control implemented as a switch from the switch interface 2521 during the first predetermined period of time, then the processing device is caused by the device power routine 2460 to signal the portion 2500b that the main portion 2500a has received no indication of user activity for at least the first predetermined period of time. If the independent processing device of the sensor interface 2520 receives no indication of increased capacitance on the outer conductive ring 2270x (or whatever other conductive ring may be monitored), then that independent processing signals the main portion 2500a that the portion 2500b has received no indication of user activity for at least the first predetermined period of time. If the first predetermined period of time passes without either the processing device 2550 of the main portion 2500a or the independent processing device of the sensor interface 2520 (i.e., the portion 2500b) receiving an indication of user activity, then these processing devices respond to both the passage of the first predetermined period of time and each other's signals indicating no user activity observed by the other during the first predetermined period of time by placing both the portions 2500a and 2500b, as well as the manually-operable controls coupled to each, into the lower power mode.

However, if the processing device 2550 does receive an indication of either further motion from the motion sensor 2560 or operation of a manually-operable control implemented as a switch from the switch interface 2521 during the first predetermined period of time, then the processing device is caused by the device power routine 2460 to signal the portion 2500b that the main portion 2500a has received that indication, and the processing device 2550 is caused by the control interaction routine to operate the output interface 2510 to output an indication of that user activity to the controller 500. The processing device 2550 continues monitoring the switch interface 2521 and operating the output interface 2510 to signal the controller 500 with indications of user activity until at some point where the first predetermined period of time has elapsed since the last time there was either such user activity or an indication of movement received from the motion sensor 2560 (i.e., the portion 2500c). At that point, the processing device 2550 signals the sensor interface 2520 (i.e., the portion 2500b) that the first predetermined period of time has elapsed since the last user activity was observed.

Each time the independent processing device of the sensor interface 2520 receives an indication of increased capacitance on the outer conductive ring 2270x (or whatever other conductive ring may be monitored), the independent processing device of the sensor interface 2520 places the sensor interface 2520 (i.e., the portion 2500b) into the high power mode for a second predetermined of time in which that independent processing device provides power to and enables the operation of the oscillators 2524 and the counters 2525 to monitor conductive pads (e.g., the conductive pads 2520) of the touch sensor 220 to monitor for user interaction with the racetrack 250 and/or any other control surfaces that may be defined on the touch-sensitive surface 225. The second predetermined period of time is considerably shorter than the first, and thus, the independent processing device is essentially toggling the sensor interface 2520 between the partial and higher power modes, switching to the higher power mode when a higher capacitance on the outer conductive ring 2270x indicates a user interaction with a control surface may be likely to occur, and switching back to the partial power mode when such higher capacitance disappears from the outer conductive ring 2270x. The independent processing device of the sensor interface 2520 signals the main portion 2500a with indications of any user interaction with any control surface defined on the touch-sensitive surface 225, causing the processing device 2550 to operate the output interface 2510 to signal the controller 500 with indications of these user interactions. This continues until at some point where the first predetermined period of time has elapsed since the last time there was such user interaction with any control surface and since the last time there was any such higher capacitance detected on the outer conductive ring 2270x. At that point, the independent processing device of the sensor interface 2520 signals the main portion 2500a that the first predetermined period of time has elapsed since the last user interaction was observed.

Again, if the first predetermined period of time passes without either the processing device 2550 of the main portion 2500a or the independent processing device of the sensor interface 2520 (i.e., the portion 2500b) receiving an indication of user activity, then these processing devices respond to both the passage of the first predetermined period of time and each other's signals indicating no user activity observed by the other during the first predetermined period of time by placing both the portions 2500a and 2500b, as well as the manually-operable controls coupled to each, into the lower power mode. Thus, in this alternate implementation, the portions 2500a and 2500b are each provided with the capacity to cause the other to immediately transition out of the lower power state, and each is provided with the capacity to signal the other of there being a sufficient lack of observed activity to allow the other to transition back into the lower power state.

Regardless of the exact implementation of order and timings by which transitions between power modes are caused to occur, it is deemed preferable that a conductive ring, such as the outer conductive ring 2270x, be employed to quickly toggle the monitoring of conductive pads (and/or other components of whatever power-consuming sensor technology is employed by the touch sensor 220) between a partial power mode in which a limited monitoring of the touch sensor 220 (e.g., a monitoring of only the conductive ring 2207x) occurs and a higher power mode in which a fuller monitoring of more of the touch sensor occurs. It is also preferred that a lower power mode be entered into where no part of the touch sensor 220 is monitored in response to a predetermined period of time having elapsed since any user interaction was observed, at least with the touch sensor 220, and that possibly, a motion sensor (e.g., the motion sensor 2560) be employed to cause a transition out of the lower power mode and into the partial power mode.

Regardless of the mechanism employed to distinguish between a user interacting with the racetrack surface 250 and a user operating a manually-operable control adjacent the racetrack surface 250 (whether a manually-operable control that is entirely separate from the touch sensor 220 or a manually-operable control implemented as a control surface defined on the touch-sensitive surface 225 of the touch sensor 220), it may be deemed desirable to provide a user with a visual indication of which of these has been determined by the controller 500 or the controller 2500 (keeping in mind the possibility in some embodiments of the controllers 500 and 2500 being one and the same) to be the case. More specifically, it may be deemed desirable to provide a visual indication of whether a user has been determined to be operating the touch sensor 220 as part of interacting with the racetrack surface 250, has been determined to be operating a manually-operable control (or another control surface defined on the touch-sensitive surface 225) that is surrounded by the racetrack surface 250, or has been determined to be operating a manually-operable control that is positioned outside the racetrack surface 250. Again, as depicted in FIGS. 10a-b, the touch sensor 220 either may have a generally ring shaped touch-sensitive surface 225 that corresponds to the ring shape of the racetrack surface 250 and a configuration that enables other manually-operable controls to be positioned within the opening defined by this ring-like configuration, or may have a continuous form of the touch-sensitive surface 225 on which manually-operable controls surrounded by the racetrack surface 250 may be implemented as control surfaces defined on the touch-sensitive surface 225.

The mechanism incorporating the conductive rings 2270 (and possibly the processing device 2550 executing the control distinguishing routine 2470) that has been described above, at length, enables at least user interaction with the racetrack surface 250 (which is bordered by the conductive rings 2270) to be reliably distinguished from user operation of other manually-operable controls that may be positioned within the area surrounded by the inner conductive ring 2270z or that may be positioned outside the area surrounded by the outer conductive ring 2270x. However, while the touch-sensitive surface 225 enables the mere placement of a tip of a user's digit at a position 260 that overlies a portion of the racetrack surface 250 and any other control surface defined thereon to be detected, other manually-operable controls that are separate from and positioned adjacent the touch sensor 220 may not be sensitive to the mere touch of a tip of a digit, and thus, may require that a user actually press or operate them in some other manner (e.g., move some portion of them in some manner) before some contact between the user and those other manually-operable controls is in any way detected. By way of example, and referring back to FIGS. 7b, 8 and 15c, it is envisioned as likely that the periphery of the touch sensor 220 (and thus, the periphery of the racetrack surface 250) will be bordered by adjacently positioned manually-operable controls 222, 224, 226 and 228, and it is further envisioned that those manually-operable controls will be relatively simple button-like controls (or other form of switch) that will provide an indication of their being operated only when pressed (or otherwise moved) by a user, and not merely touched. Thus, while the touch-sensitive properties of the touch sensor 220 enables the mere touching of a portion of the racetrack surface 250 to be used as a trigger to cause the display of the racetrack menu 150 (at times when it is not already being displayed) and enables the current position 260 of a tip of a digit along the racetrack surface 250 to be detected and shown via the marker 160, a mere touch of relatively simple button-like controls does not cause a signal to be provided that indicates that touch, and therefore, a mere touch of a relatively simple button-like control (or other type of switch) cannot be employed as a trigger.

Where a manually-operable control that is not touch sensitive is positioned adjacent the periphery of the touch sensor 220 such that it is positioned in close proximity to the outer conductive ring 2270x, and where the outer conductive ring 2270x is monitored by the controller 2500 for its level of capacitance, then an augmented form of the control distinguishing routine 2470 may cause the processing device 2550 to infer that an approach and mere touching of a tip of a digit to that manually-operable control is occurring as a result of detecting an increase in capacitance imparted to the outer conductive ring 2270x while not detecting a corresponding increases in capacitance of either one of the conductive pads 2250 or the inner conductive ring 2270z that is consistent with interaction with the racetrack surface 250. Only when the user actually presses (or otherwise operates) that adjacent manually-operable control will it be more firmly established that the user is interacting with that control. A similar technique may be employed to infer the approach and touching of a manually-operable control positioned within the area surrounded by the touch sensor 220 (and thus, surrounded by the racetrack surface 250) where the touch sensor 220 has a physical configuration akin to what is depicted in FIG. 10a, and an increase in the capacitance of the inner conductive ring 2270z is detected without a corresponding detection of increases in capacitance of the outer conductive ring 2270x or of any of the conductive pads 2250 that is consistent with interaction with the racetrack surface 250.

Therefore, where the touch sensor 220 has the ring shaped physical configuration depicted in FIG. 10a, and where other manually-operable controls lacking touch sensitivity are positioned adjacent the touch sensor 220, the manner in which the display of a visual indication of user interaction with the racetrack surface 250 is triggered is necessarily different from the manner in which the display of a visual indication of user operation of those other manually-operable controls is triggered. More specifically, a mere touch of a tip of a digit to a portion of the racetrack surface 250 triggers the display of a visual indication that the racetrack surface 250 is being interacted with, and the cessation of the displaying of that visual indication can be triggered the moment that tip of that digit cease to be detected to be in contact with the racetrack surface 250. In contrast, the display of a visual indication of any of those other manually-operable controls being interacted with may not be triggered until one of those other manually-operable controls is actually operated, and then may be caused to linger in being displayed for a predetermined period of time sufficient for the user to have seen that indication once they've ceased operating that one of those manually-operable controls. The control distinguishing routine 2470 may be augmented as described above to use one or both of the conductive rings 2270 to attempt to detect the approach (and maybe the touch, if close enough) of a tip of a digit to one or more of those other manually-operable controls, but doing so may bring about inconsistent or inaccurate displays of such visual indications depending on how close those other manually-operable controls are to one or the other of the conductive rings 2270.

Alternatively, where at least some of those other manually-operable controls are touch-sensitive, as in the case where the touch sensor 220 has the physical configuration depicted in FIG. 10b (in which the touch-sensitive surface 225 is a continuous surface, i.e., not ring shaped), and where at least some of those manually-operable controls are implemented as control surfaces defined on the touch-sensitive surface 225 along with the racetrack surface 250, the manner in which the display of the visual indications of interaction with either the racetrack surface 250 or those other manually-operable controls implemented as control surfaces are triggered may be the same. In other words, a visual indication of interaction with the racetrack surface 250 is displayed where a user touches the touch-sensitive surface 225 at a position that overlies the racetrack surface 250, and a visual indication of interaction with those other manually-operable controls implemented as control surfaces defined on the touch-sensitive surface 225 is displayed where a user touches the touch-sensitive surface 225 at a position that overlies one of those control surfaces. Further, cessation of the display of either of these visual indications may be triggered the moment that tip of that digit ceases to be in contact with the racetrack surface 250 or that one of those control surfaces.

Figure 19:
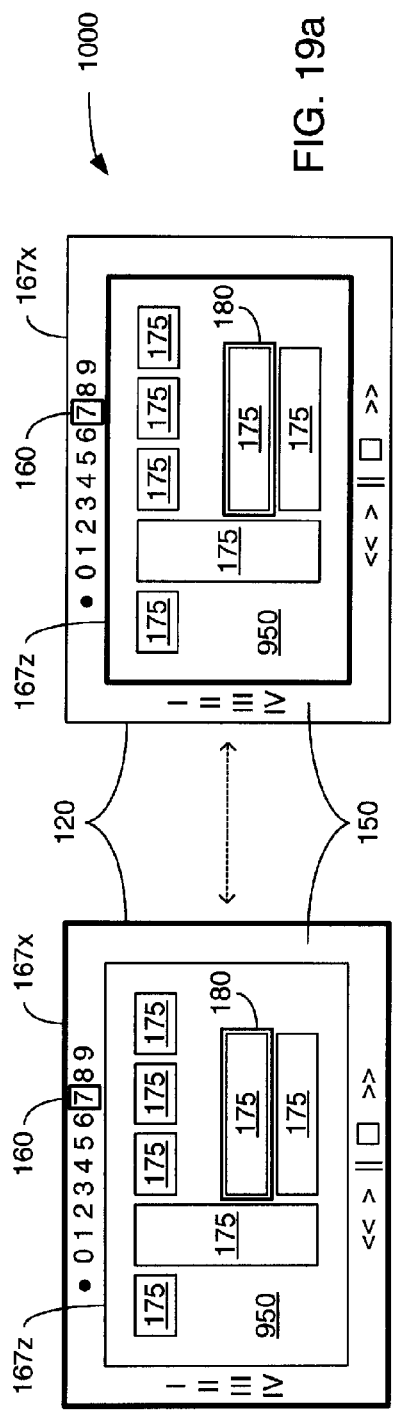
FIGS. 19a and 19b, together, depict possible variants of the user interface of FIG. 1 incorporating different forms and combinations of markers.

FIGS. 19a and 19b each depict examples of different forms of such visual indications. FIG. 19a depicts a toggling between one possible marker 167x that provides a visual indication of interaction with the racetrack surface 250, and another possible marker 167z that provides a visual indication of operation of a manually-operable control surrounded by a variant of the touch sensor 220 having the ring shape physical configuration depicted in FIG. 10a or of operation of a control surface positioned within the area surrounded by the racetrack surface 250 on the touch-sensitive surface 225 of a variant of the touch sensor 220 having the physical configuration depicted in FIG. 10b. The marker 267x follows the periphery of and surrounds the racetrack menu 150, while the marker 267*z* follows the periphery of and surrounds the display area 950 (which as depicted, and as previously described, fills at least the area surrounded by the racetrack menu 150, and may also underlie the racetrack menu 150). FIG. 19*b* depicts a toggling between one possible form of highlighting of the racetrack menu 150 that provides a visual indication of interaction with the racetrack surface 250, and another possible form of highlighting of the display area 950 that provides a visual indication of operation of a manually-operable control surrounded by a variant of the touch sensor 220 having the ring shape physical configuration depicted in FIG. 10*a* or of operation of a control surface positioned within the area surrounded by the racetrack surface 250 on the touch-sensitive surface 225 of a variant of the touch sensor 220 having the physical configuration depicted in FIG. 10*b*. The highlighting of either of the racetrack menu 150 or the display area 950 may be a change in the color, brightness and/or contrast of the background to cause one of the racetrack menu 150 and the display area 950 to "stand out" more than the other, possibly in a way in which one of these is caused to have a visually "pulsing" effect. At times when neither the racetrack surface 250 is being interacted with or a manually-operable control surrounded by the racetrack surface 250 (whether a manually-operable control separate from the touch sensor 220 or implemented with control surfaces defined on the touch-sensitive surface 225) is being operated, then neither of the makers 167*x* or 167*z* (FIG. 19*a*) is displayed or neither of the racetrack menu 150 and the display area 950 is highlighted (FIG. 19*b*). During such times, it may be that a user is not interacting with any manually-operable control associated with the user interface 1000, or it may be that a user is interacting with a manually-operable control positioned outside the periphery of the touch sensor 220.

It should be noted that, as explained earlier with regard to FIG. 6, any display of a visual portion of an audio/visual program may either be resized to fit within the area surrounded by the racetrack menu 150 when the racetrack menu 150 is displayed, or be overlain by the racetrack menu 150 when the racetrack menu 150 is displayed. As also previously discussed, where the racetrack menu 150 overlies such a visual portion of an audio/visual program, various techniques may be employed to provide the racetrack menu 150 with something of a see-through quality by which the underlying portions of the visual portion may be seen to some degree through the racetrack menu 150 (e.g., pixel averaging, bitwise operations with a pixel mask, alpha blending, etc.). Where the racetrack menu 150 is in some way highlighted, such as what is depicted and described with regard to FIG. 19*b*, such highlighting may change or entirely remove such a see-through characteristic of the racetrack menu 150 such that such a visual portion is no longer viewable until either the racetrack menu 150 ceases to be highlighted or ceases to be displayed.

Figure 20:
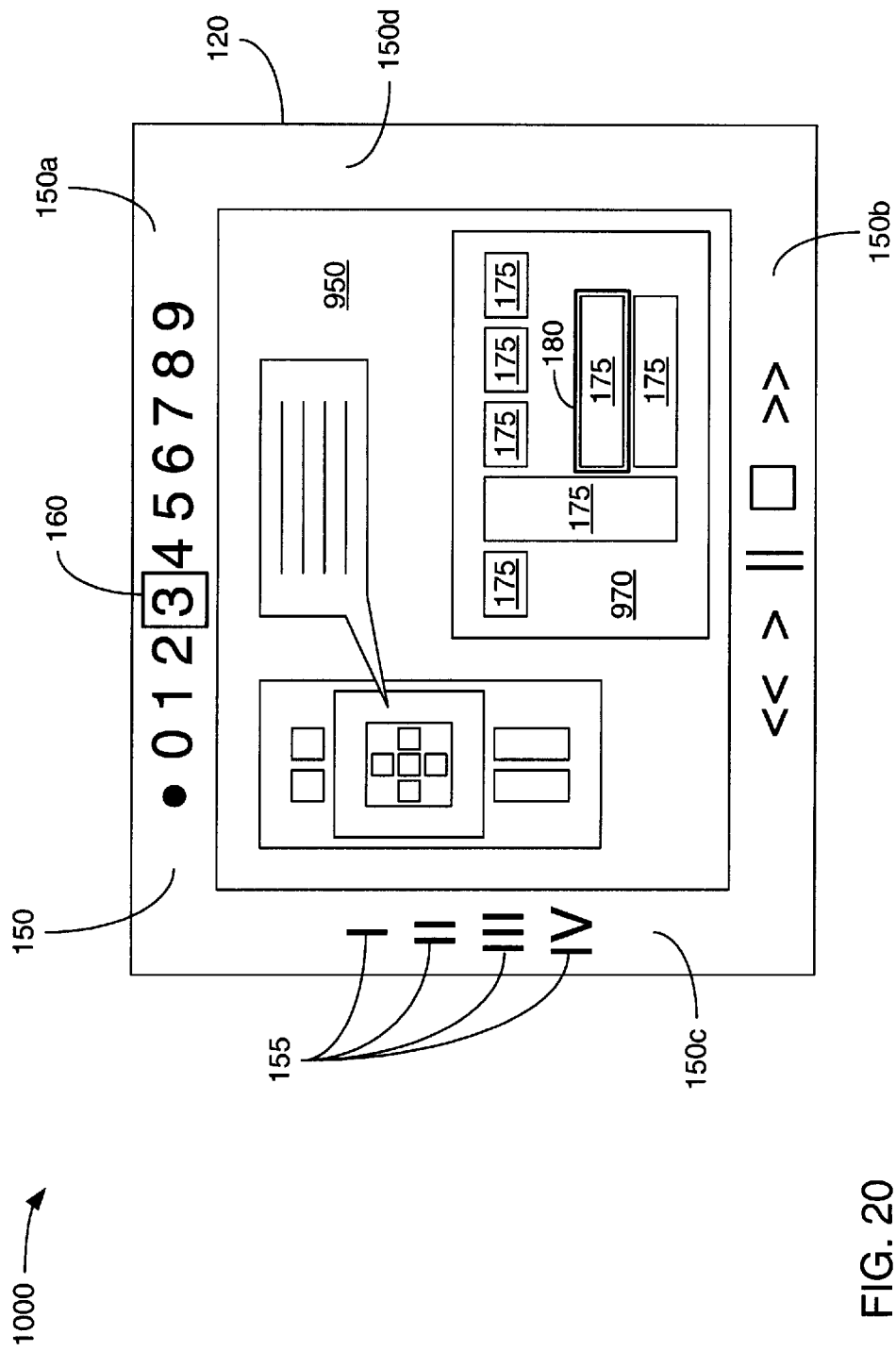
FIG. 20 depicts aspects of a possible visual indicator of user error in operating the user interface of FIG. 1.

FIG. 20 depicts the display of visual indication of a user at least appearing to have made an error in operating the user interface 1000. As previously described in reference to FIGS. 7*a-b*, in at least some variations of the user interface 1000, the racetrack surface 250 is positioned to surround a set of manually-operable controls 270*a-d* and 280 that serve as navigation buttons and a selection button, respectively, in order to correspond to instances in which there is a simultaneous display of an on-screen menu 170 of a source device and the racetrack menu 150. As has been previously described, the racetrack menu 150 surrounds the on-screen menu 170 in a manner that is meant to correspond to the racetrack surface 250 surrounding the set of manually-operable controls 270*a-d* and 280 as an aid to orienting a user to using the racetrack surface 250 to interact with the racetrack menu 150 and using the set of manually-operable controls 270*a-d* and 280 to interact with the on-screen menu 170.

However, despite this correspondence of this concentric arrangement of controls to what is displayed (again, as shown in FIGS. 7*a-b*) it is foreseen as possible that a user may become confused while being presented with the capability of being able to interact with either of racetrack menu 150 and the on-screen menu 170. More specifically, it is seen as possible that a user may employ the racetrack surface 250 to move the marker 160 about that racetrack menu 150 until the marker 160 overlies a desired one of the menu items 155, but then, instead of pressing harder against the racetrack surface 250 to select that one of the menu items 155, they instead errantly press the manually-operable control 280 to select that one of the menu items 155. It is seen as possible that the reverse may occur in which a user may employ one or more of the manually-operable controls 270*a-d* to move the marker 180 about the on-screen menu 170 until the marker 180 overlies a desired one of the menu items 175, but then, instead of pressing the manually-operable control 280 to select that one of the menu items 175 (presuming that the manually-operable control 280 serves as a form of "selection" control), they instead errantly press a portion of the racetrack surface 250 (perhaps a portion of whichever one of the sides 250*a-d* that is closest to whichever one of the manually-operable controls 270*a-d* that they last pressed) to select that one of the menu items 175.

In the user interface 1000, the control routine 450 (referring to FIG. 9) may incorporate a sequence of instructions, that when executed by the processing device 550, cause the processing device 550 to detect instances in which a user employs the racetrack surface 250 to move about the marker 150 followed by operating the manually-operable control 180 within a predetermined period of time, and/or to detect instances in which a user employs the manually-operable controls 270*a-d* to move about the marker 180 followed by pressing on a portion of the racetrack surface 250 with the greater amount of pressure normally associated with selecting one of the menu items 155 of the racetrack menu 150 within a predetermined period of time. In response to such instances, the control routine 450 may cause the processing device 550 to cause the display of an error screen generally of the type depicted in FIG. 20, in which the racetrack menu 150 is displayed in its normal position about the periphery of the display area 950, but in which the on-screen menu 170 (or whatever visual output may be received from the source device associated with the on-screen menu 170) is displayed in the smaller display area 970 positioned within and overlying a portion of the display area 950 in the "picture-in-picture" manner previously discussed with regard to FIG. 11*a*. Such a "picture-in-picture" arrangement makes available other space (at least within the portion of the display area 950 surrounded by the racetrack menu 150) in which an error message providing a visual indication that such a user error has been detected, possibly along with text and/or a graphical depiction of information concerning the correct operation of the user interface 1000. As a possible additional part of such a visual indication of user error, a portion of the display area 950 not overlain by the display area 970 may provide a visual depiction of whatever audio/visual device incorporates the touch sensor 220 and whatever other manually-operable controls may be positioned adjacent to it, including perhaps the manually-operable controls 270*a-d* and 280.

It may also be that display of such a visual indication is modal in nature, depending on whether the current selection of one of the sources 901-904 and/or the current state of the display of the racetrack menu 150 provides an indication of whether it is an appropriate time for a user to attempt to operate either the racetrack surface 250 or the manually-operable control 280 to select something. For example, it may be that a choice of user configuration and/or factor defaults provided for the user interface 1000 results in the operation of the racetrack surface 250 in a manner consistent with attempting to select something (i.e., in a manner in which a greater amount of pressure is applied as if a user is trying to select something) is deemed to have no meaning and is not meant to result in a function being performed at a time when the racetrack menu 150 is not being displayed, but the user has done so following having operated one or more of the manually-operable controls 270a-d within a predetermined period of time. Conversely, for example, it may be that the user has selected a one of the sources 901-904 for which the manually-operable control 280 is known to not serve a purpose, at least not at a given time, but the user has operated the manually-operable control 280, and has done so within a predetermined period of time after operating the racetrack surface 250 to move the marker 160 about the racetrack menu 150.

Despite the use of a configuration of multiple conductive pads 2250 with similar surface areas and a configuration of teeth 2252 intended to enhance accuracy in determining the current position 260 of a tip of a digit, despite the use of a pair of conductive rings 2270 to enhance accuracy in determining which manually-operable control is being operated, and despite the display of various markers to indicate the current position 260 and/or which manually-operable control and/or control surface is being operated (e.g., the marker 162, 167x and/or 167z), further inaccuracies in a user's operation of the user interface 1000 can arise at the moment the user presses with increased pressure on a portion of the racetrack surface 250 to select a menu item 155 on the racetrack menu 150.

Such inaccuracies arise partly from the manner in which the tips of digits of a human hand necessarily move as a result of the manner in which the human body is constructed. As those skilled in the study of human movement will readily recognize, a tip of a human digit is at the end of one segment of that digit, which is pivotally connected to another segment, of that digit, which is pivotally connected to still another segment, which is pivotally connected to the palm of a hand, which is pivotally connected at a wrist to a lower arm, which is pivotally connected at an elbow to an upper arm, which is pivotally connected at a shoulder to the rest of the body. In other words, with a tip of a digit being at the end of a lengthy series of pivotal connections, movements of a tip of a digit are usually arcuate in nature, with the tip following a path that is a composite of more than one pivoting movement about more than one of these pivotal connections. Thus, when a person uses a tip of a digit to press against something, there is a tendency to have "rolling" about the generally rounded shape of that tip such that where that person is pressing against something with that tip changes as they do so.

Such inaccuracies also arise partly from the soft, compressible nature of the tissues surrounding the bone at the tip of a typical human digit. Thus, when a person uses a tip of a digit to press against something, there is a tendency for the soft tissues in the vicinity of the portion of that tip employed in that act of pressing to flatten such that more of the external soft tissue surface of that tip is put into contact with something. This means that as a person presses against something with a tip of a digit, the size of the surface area of that tip that is in contact with something generally increases, and the shape of that surface area of that contact tends to change. Therefore, in the case of a person interacting with the racetrack surface 250, after they have moved the tip of a digit in contact with the racetrack surface 250 to move the marker 160 to a desired menu item 155 on the racetrack menu 150, the act of pressing with greater pressure against the racetrack surface 250 to select that menu item 155 can result in a combination of "rolling" of that tip against the racetrack surface 250, an increase in size of the surface area of that tip in contact with the racetrack surface 250 and a change in the shape of that surface area that can be mistakenly perceived by the controller 2500 as a movement of the position 260 of that tip that is meant to move the position of the marker 160 about the racetrack menu 150. Thus, as a user presses against the racetrack surface 250 with that tip of that digit, there can be an inadvertent movement of the marker 160 away from the desired one of the menu items 155 to another of the menu items 155 such that a wrong one of the menu items 155 is selected.

FIGS. 21a and 21b depict some of these aspects of such inaccuracies being introduced as a user presses harder against a portion of the touch sensor 220 to effect a selection of a menu item. FIG. 21a is a cross-sectional view of a portion of a capacitive sensing variant of the touch sensor 220, both before and during an instance of a user pressing against the cover 2210 with greater pressure to select a menu item. FIG. 21b is a cross-sectional view of a portion of a resistance sensing variant of the touch sensor 220, both before and during an instance of a user pressing against the cover 2210 with greater force to select a menu item.

Turning to FIG. 21a, a user has moved a tip of a digit along the touch-sensitive surface 225 partly provided by the cover 2210 to a position C (shown with an arrow "C") in preparation to select a desired menu item. Then, this user presses with greater force against the cover 2210 to select that desired menu item (not shown). Ideally, the user would press in a manner directing greater force perpendicularly (i.e., in the direction indicated by the arrow "P") into the face of the cover 2210 that provides the touch-sensitive surface 225. However, due to the softness of the tissues surrounding the end of the bone at that tip of that digit, the tissues readily compress. This compression results in a flattening out of the tissues against the touch-sensitive surface 225, thereby increasing the surface area of the soft tissues of that digit that are in contact with the touch-sensitive surface 225. Depending on the angle of the segment of that digit of which that tip is a part relative to the touch-sensitive surface 225, the compressing and increasing of surface area contact of those soft tissues with the touch-sensitive surface 225 may cause the center of that now-increasing surface area of contact to shift somewhat backwards of that tip of that digit (i.e., "up" that segment of that digit from that tip), as shown. Thus, even if the user presses perpendicularly into the touch-sensitive surface 225 (i.e., in the "P" direction), the flattening of the soft tissues can introduce inaccuracies.

Further, this compression of the soft tissues also permits a range of travel of the bone at the end of that tip of that digit towards the touch-sensitive surface 225, thereby enabling an arcuate motion of that end of that bone towards the touch-sensitive surface 225 which could result in a "rolling" motion of that tip relative to the touch-sensitive surface 225. For example, the user may be induced by the compressibility of those soft tissues to roll the tip forward (i.e., in the direction indicated by the curving arrow "RF"), which would tend to move the center of the surface area of contact forward of the end of that tip. Alternatively, the user may be induced by their desire to apply greater force by "flattening" the tip towards the touch-sensitive surface 225 in a manner that brings the length of the segment of that digit to which that tip belongs closer to being parallel to the touch-sensitive surface 225, thereby causing the tip to be rolled backward in the direction indicated by the curving arrow "RB," which would tend to move the center of the surface area of contact backward from that tip (i.e., "up" that segment to which that tip belongs).

Turning to FIG. 21b, while the cover 2210 is preferably rigid in capacitive sensing variants of the touch sensor 220, the cover 2210 is preferably more flexible in resistance sensing variants of the touch sensor 220, and this flexibility can add to the problems just discussed. Again, the user has moved a tip of a digit along the touch-sensitive surface 225 partly provided by the cover 2210 to select a desired menu item. Given the flexible nature of the cover 2210 and the underlying conductive foam 2212 as needed to enable the user to provide a relatively smaller amount of force against the touch-sensitive surface 225 to enable sufficient interaction to move the marker 160 about the racetrack menu 150, there is necessarily a greater surface area of contact between the cover 2210 and that tip during the application of that relatively smaller amount of force than in the case of the more rigid form of the cover 2210 of the capacitive sensing variant of the touch sensor 220 in FIG. 21a. As the user then applies a relatively greater amount of force in FIG. 21b to select a desired menu item, the flexibility of the cover 2210 cooperates with the compressibility of the soft tissues of that tip to provide an ever greater increase in the surface area of contact between the two, thereby increasing the likelihood of the center of that surface area of contact shifting as that relatively greater amount of force is applied. Further, the greater range of travel afforded by the compressibility of the conductive foam can exacerbate the amount of arcuate movement that the bone at that tip of that digit might make as the user applies that relatively greater amount of force.

Figure 22C:
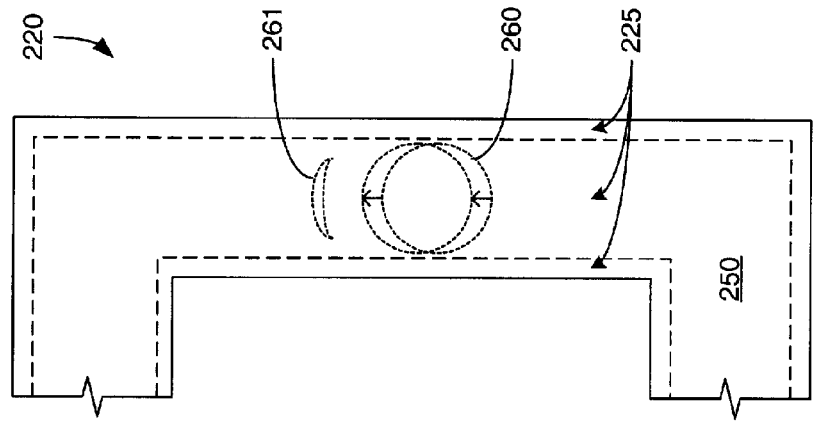
FIGS. 22a, 22b and 22c, together, depict further aspects of possible inaccuracies in user operation of the user interface of FIG. 1 to select a menu item depicted in FIGS. 21a and 21b.
Figure 22B:
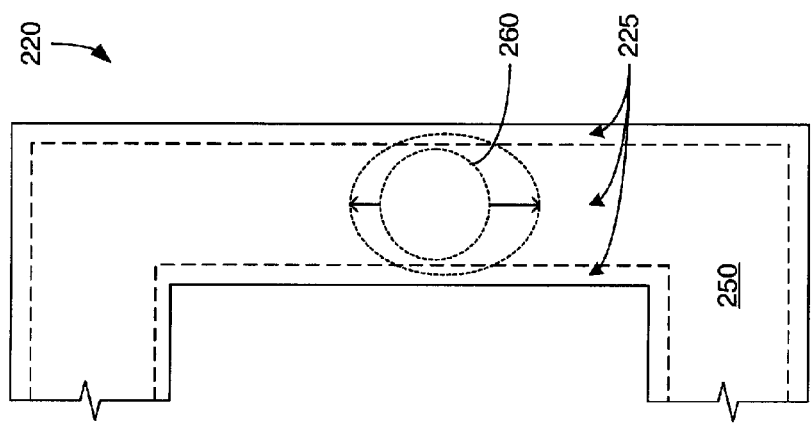
Figure 22A:
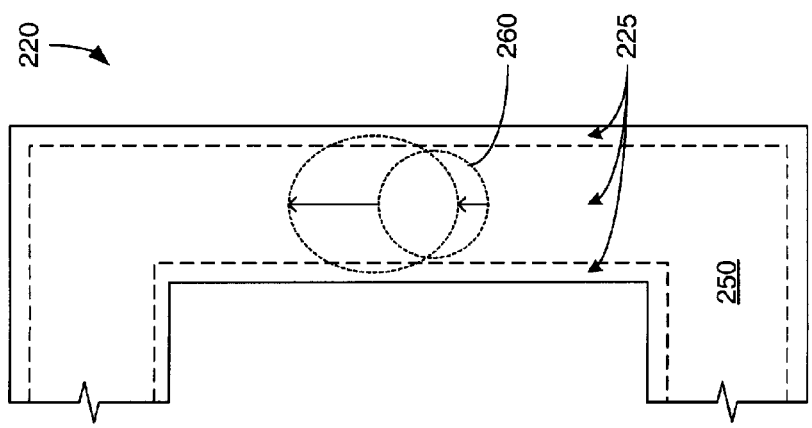

FIGS. 22a, 22b and 22c depict some possible resulting changes in surface area of contact between a tip of a digit and a portion of the touch-sensitive surface 225 as a result of increases in the size of that surface area due to the compressibility of at least the soft tissues at the tip of a digit, and as a result of the various possible forms of "rolling" movement that can arise as a user presses against the touch-sensitive surface 225 and a degree of travel into the touch-sensitive surface 225. In particular, each of FIGS. 22a and 22b depict both the increase in size of that surface area of contact and the shifting of the center of that surface area (one rolling forward of a tip and the other rolling back), either as a result of the flattening out of soft tissues or as a result of a rolling movement of a tip of a digit. FIG. 22c, depicts less of increase in surface area of contact, but also depicts the addition of another surface area of contact as a result of a tip of a relatively lengthy finger nail coming into contact with the touch-sensitive surface 225 as part of a "rolling" movement forward of a tip of a digit that rolled that tip of that relatively lengthy finger nail into that contact.

Figure 23A:
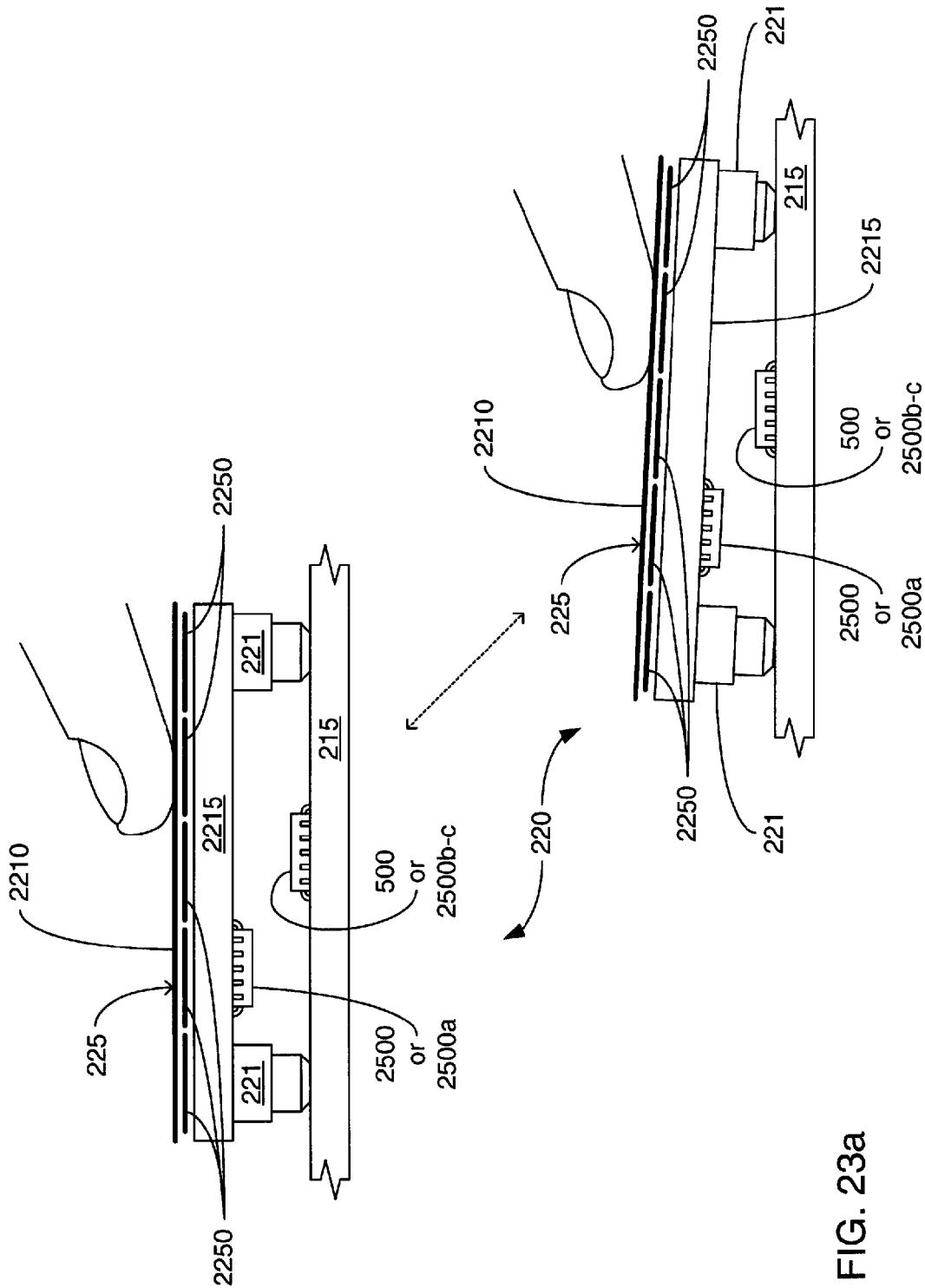
FIGS. 23a and 23b, together, depict mechanical aspects of enabling user selection of a menu item that can exacerbate the possible inaccuracies in user operation of the user interface of FIG. 1 depicted in FIGS. 21a-b and 22a-c.
Figure 23B:
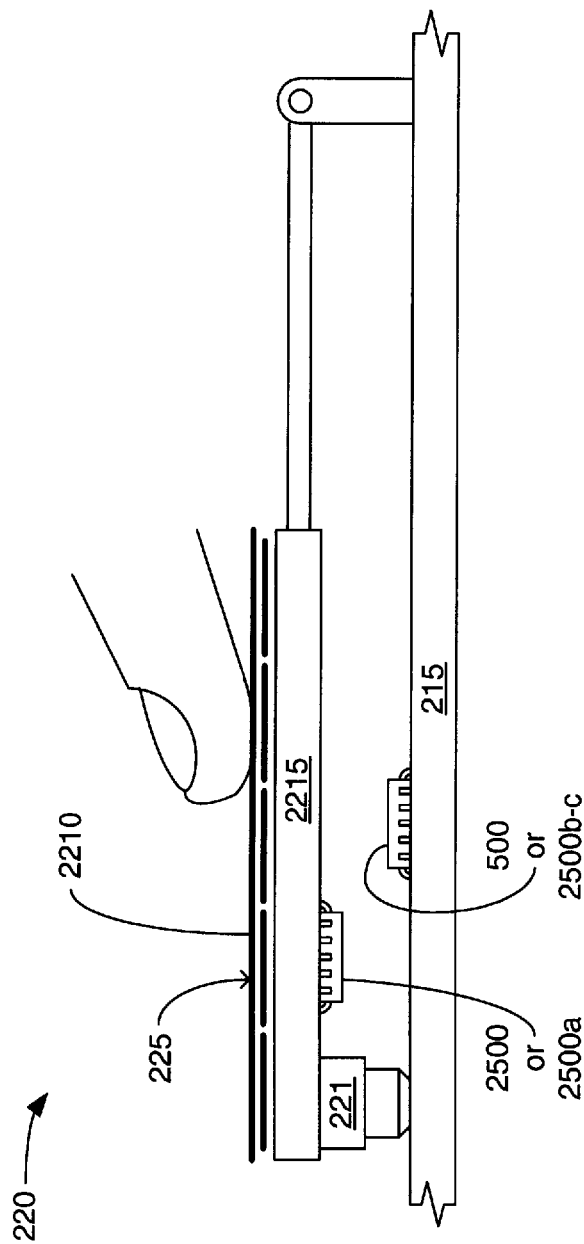

FIGS. 23a and 23b are cross-sectional views depicting more of the components of capacitive sensing variants of the touch sensor 220 than was depicted in the cross-sectional view provided by FIG. 21a. FIG. 23a depicts a cross-sectional view of one form of a capacitive sensing variant of the touch sensor 220 in which the substrate 2215 is put into a form of "floating" contact with the PCB 215 via multiple ones of the selection switches 221, in which the selection switches 221 are of a spring-loaded variety that tends to resist compression, but which allows the touch-sensitive surface 225 to be pressed inward into a casing of whatever device into which the touch sensor 220 is incorporated (as previously discussed with regard to FIGS. 1-2). As depicted, when a user presses against the touch-sensitive surface 225 with the tip of a digit in an effort to select a desired menu item 155, it is possible that less than all of the selection switches 221 employed in providing this "floating" contact between the substrate 2215 and the PCB 215 will respond by giving way to allow even part of the substrate 2215 to be pressed inward. As a result, the substrate 2215 may engage in a kind of "rocking" motion in which a portion of the substrate 2215 is pressed inward by the force applied by the user via that tip of that digit towards the PCB 215. As with the arcuate movements that the tip of a digit tends to make as a result of the earlier-described series of pivotal connections between bones, various "rolling" movements of that tip of that digit relative to the touch-sensitive surface 225 are enabled and/or exacerbated by this possible "rocking" motion of the substrate 2215. Although this depicted form of capacitive sensing variant of the touch sensor 220 could be provided with any of a variety of possible structural guiding members that would restrict the movement of the substrate 2215 relative to the PCB 215 to a linear movement perpendicular to the PCB 215 and perpendicular to the touch-sensitive surface 225, even such a linear path of travel of the substrate 2215 inward toward the PCB 215 as a user exerts greater force can still enable some degree of "rolling" motion of a tip of a digit tending to cause inaccuracies. FIG. 23b depicts a cross-sectional view of another form of a capacitive sensing variant of the touch sensor 220 in which the substrate 2215 is again put into a form of "floating" contact with the PCB 215, but now by a single selection switch 221 and a pivot arm that guides the substrate 2215 into an arcuate motion in any movement caused by a user towards the PCB 215. The depicted pivot arm is preferably relatively lengthy (of course, depending on the available space within the casing of whatever device the touch sensor 220 is incorporated into) to at least somewhat approximate a more perpendicular-like and linear-like inward movement of the touch-sensitive surface 225 from the perspective of a user. However, like the form of capacitive sensing variant of the touch sensor 220 of FIG. 23a, even with a lengthy pivot arm, this alternate form also enables and/or exacerbates various rolling movements of a tip of a digit relative to the touch-sensitive surface 225.

Aside from the undesired motion effects on the positioning of a tip of a digit introduced by the movement of the substrate 2215 relative to the PCB 215 depicted in FIGS. 23a-b (or by still other possible variants of inward movement), where a capacitive sensing variant of the touch sensor 220 is employed, this movement of the substrate 2215 relative to the PCB 215 can enable electrical effects on the accuracy with which capacitance levels of conductive pads and conductive rings are measured, which can lead to inaccuracies in how the current position 260 of a tip of a digit is determined. As depicted in FIGS. 23a-b, there are various electronic components carried by each of the substrate 2215 and the PCB 215, and these components are accompanied by lengths of conductors to join those components to form circuits (for example, either the controller 2500 carried by the substrate 2215 and the controller 500 carried by the PCB 215 where these controllers are co-located within the same device, or the main portion 2500a of the controller 2500 carried by the substrate 2215 and the portion 2500b and/or 2500c carried by the PCB 215 where the controller 2500 is physically split into multiple portions as previously described). With various flows of current through those conductors, with various ground or power planes possibly being included in conveying some of those currents, and with various electronic components extending from one of the substrate 2215 and the PCB 215 towards the other, such movement of one of these towards the other can introduce charges into one or more of the conductive pads 2250, the conductive rings 2270 and/or the conductors used to couple them to the controller 2500. Such charges can result in net increases or decreases (depending on polarity) of the total levels of capacitance present on one or more of the conductive pads 2250 and/or the conductive rings 2270 such that the recurring measurements of capacitance made by the controller 2500 are distorted in a manner that causes the current position 260 of a tip of a digit to appear to move about the racetrack surface 250 as the substrate 2215 is moved inward towards the PCB 215.

Referring back to FIG. 17, to counteract these influences working against a user maintaining a tip of a digit in the same position 260 as they press harder to select a desired menu item and/or working against the accuracy with which the current position 260 of that tip is determined by the controller 2500, the control interaction routine 2450 may be augmented with a sequence of instructions that causes the processing device 2550 to maintain a buffer of recently measured capacitance and/or resistance levels (i.e., a set of measurements taken from the touch sensor 220 that are indicative of the current position 260 of the tip of the digit) from which the current position 260 of a tip of a digit is determined as part of the control interaction data 2455 maintained within the storage 2540 of the controller 2500. Whenever a user applies greater pressure against the touch-sensitive surface 225 to select a desired menu item 155, the controller 2500 is caused to access that buffer to retrieve the capacitive or resistance measurements taken at an earlier time that is at a predetermined amount of time into the past, and is deemed likely to be a time just before the user began to apply that greater pressure.

More precisely, in the case of a capacitive sensing variant of the touch sensor 220, such an augmented form of the control interaction routine 2450 causes the processing device 2550 to always retain a predetermined quantity of the most recent capacitance measurements of at least each of the conductive pads 2250, and perhaps also of the conductive rings 2270, as the processing device 2550 recurringly operates the sensor interface 2520 to measure the capacitances of at least the conductive pads 2250 on a recurring basis, as previously discussed. This predetermined quantity of recurring capacitance measurements is always maintained by the processing device 2550 as part of the control interaction data 2455, and is updated with each new instance of recurringly measuring capacitance. At a time when at least one of the selection switches 221 (referring to FIGS. 13a and 23a-b) provides an indication that a user has exerted a relatively greater amount of force against the touch-sensitive surface 225 to select a desired menu item 155, the control interaction routine 2450 causes the processing device 2550 to access earlier-stored capacitance measurements taken at an earlier time that is a predetermined amount time into the past. That predetermined amount of time is chosen to account for the typical amount of time that is found to pass from when a user begins applying a relatively greater amount of force against the touch-sensitive surface 225 to select a menu item 155 to when the substrate 2215 has moved far enough inward towards the PCB 215 that at least one selector switch 221 is triggered and provides the controller 2500 with an indication that the substrate 2215 has been pressed inward toward the PCB 215. The control interaction routine 2450 then causes the processing device 2550 to determine the position 260 of the tip of the user's digit on the touch-sensitive surface 225 at that earlier time, and the control interaction routine 2450 causes the processing device to convey that earlier position 260 of the tip of the user's digit at that earlier time to the controller 500 for purposes of determining which one of the menu items 155 the user is selecting.

In this way, inaccuracies in the user maintaining the position 260 of the tip of a digit against the touch-sensitive surface 225 as they press harder to select a menu item 155 are not allowed to affect the determination of which one of the menu items 155 the user is attempting to select. Also in this way, any electrical influences that may be exerted on the accuracies of the measurements of capacitance or resistance taken as the substrate 2215 is pressed by a user inward toward the PCB 215 are also not allowed to affect the determination of which one of the menu items 155 the user is attempting to select.

Figure 24:
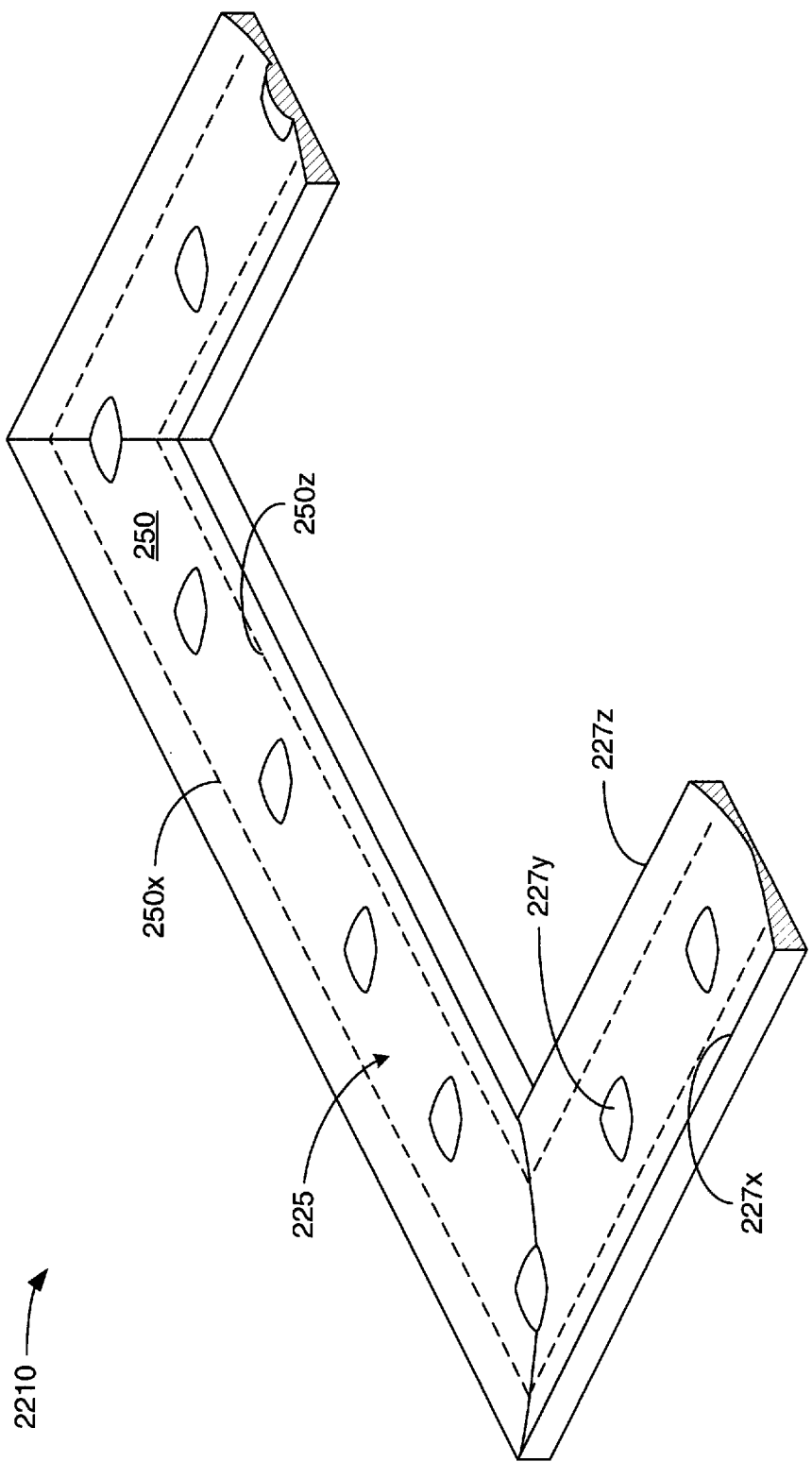
FIG. 24 depicts a possible solution to the possible inaccuracies in user operation of the user interface depicted in FIGS. 21a-b, 22a-c and 23a-b.

FIG. 24 depicts an alternative approach to both enhancing accuracy in determining which manually-operable control and/or control surface is being operated and reducing inaccuracies in a user's operation of the user interface 1000 at the moment the user presses with increased pressure on a portion of the racetrack surface 250 to select a menu item 155 on the racetrack menu 150. FIG. 24 is a perspective view with cross-section of an alternate form of the cover 2210.

This alternate form of the cover 2210 incorporates at least an outer ridge 227x that follows the outer boundary 250x and an inner ridge 227z that follows the inner boundary 250z, thus forming a curving "trough" or "gutter-like" feature in the touch-sensitive surface 225 that follows and provides a tactile guide for a tip of a digit to follow the ring shape configuration of the racetrack surface 250. Through the tactile feel of this "trough" formed by this alternate form of the cover 2210, a user is induced to more consistently keep the tip of a digit better centered between the outer boundary 250x and the inner boundary 250y of the racetrack surface 250 as they move that tip along the path of the racetrack surface 250. Further, the outer ridge 227x and the inner ridge 227z serve to provide a deliberately less pleasant tactile feel at their locations that is likely to induce a user to either more distinctly place a tip of a digit within the trough formed between these two ridges or more distinctly onto other manually-operable controls that may be positioned adjacent the racetrack surface 250 along one or the other of these two ridges. Thus, the provision of the outer ridge 227x and the inner ridge 227z may be effective enough in inducing desired user behavior that obviates the need for providing the conductive rings 2270. Alternatively, the outer ridge 227x and the inner ridge 227z may be provided in conjunction with the conductive rings 2270 to both induce and confirm desired user behavior.

This alternate form of the cover 2210 may further or alternatively incorporate a series of protrusions 227y centered between the outer boundary 250x and the inner boundary 250z, and providing a tactile guide for a tip of a digit to follow the ring shape configuration of the racetrack surface 250. It is preferred that the protrusions 227y have a relatively rounded "bump-like" shape (as depicted) to provide a relatively pleasant tactile feel (at least more of a pleasant tactile feel than the ridges 227x and 227z, if the ridges 227x and 227z are also present) to induce a user to more consistently keep the tip of a digit better centered between the outer boundary 250x and the inner boundary 250z of the racetrack surface 250 as they move that tip along the path of the racetrack surface 250. Further, it is envisioned that the protrusions 227y be positioned along the racetrack surface 250 at positions that correspond to fixed positions along the racetrack menu 150 at which the menu items 155 may or may not be located, depending on the quantity of the menu items 155 positioned along any one of the sides 150a-d of the racetrack menu 150. Thus, in an embodiment of the user interface 1000 that incorporates such an alternate form of the cover 2210 that does incorporate the protrusions 227y (as opposed to incorporating only the ridges 227x and 227z), the placement of the menu items 155 along the racetrack menu 150 would be positioned only at positions along the racetrack menu 150 that correspond to the positions of the protrusions 227y along the racetrack surface 250 to provide a user with a tactile guide that coincides with the position of each one of the menu items 155. The provision of such individual tactile guides for each one of the menu items 155 may also enhance accuracy in maintaining the position 260 of a tip of a digit as a user presses against the touch-sensitive surface 227 with relatively greater force to select a desired one of the menu items 155 as the tactile feel of the one of the protrusions 227y that corresponds with the desired one of the menu items 155 will tend to induce the user to maintain that tip at that same position 260 along the racetrack surface 250 as they carry out the application of that relatively greater force to make a selection.

Figure 25:
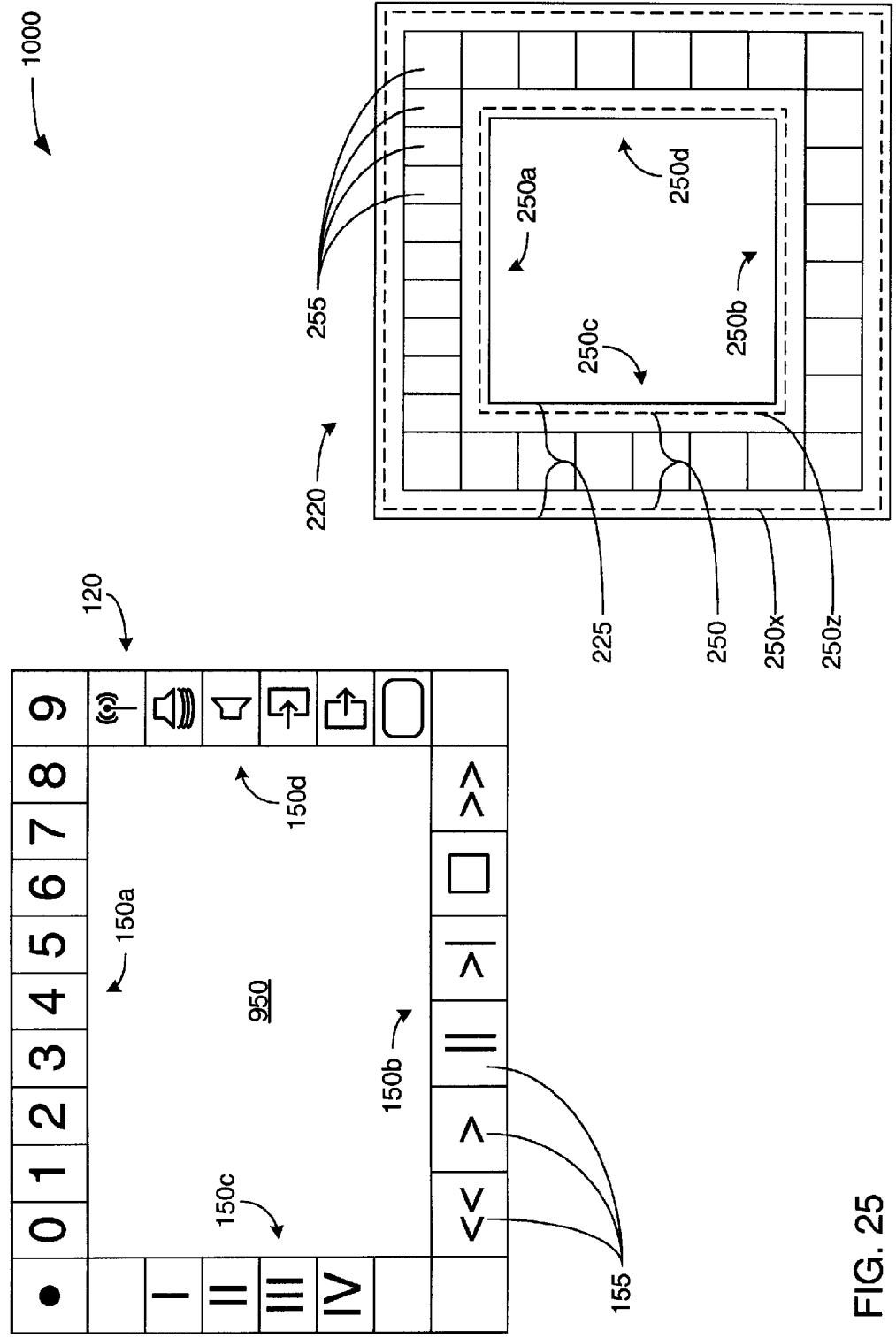
FIG. 25 depicts aspects of an absolute mapping of segments of a racetrack menu to control surfaces of a racetrack surface of the user interface of FIG. 1.

FIG. 25 depicts a default absolute mapping of locations of an example set of displayed menu items 155 along each of the sides 150a-d of the racetrack menu 150 to corresponding ones of the sides 250a-d of the racetrack surface 250 defined on the touch-sensitive surface 225 of the touch sensor 220. It should be noted that in this particular example, a variant of the touch sensor 220 is depicted that has a hole formed through the touch-sensitive surface 225 such that the touch-sensitive surface 225 has a ring shape configuration (akin to what is depicted and discussed with regard to FIG. 10a) to allow other manually-operable controls to be positioned therethrough and surrounded by the touch-sensitive surface 225.

In this absolute mapping, the racetrack menu 150 positioned about the periphery of the display area 950 of the display element 120 is divided up into multiple segments (somewhat akin to what was discussed in regard to FIG. 3d, but the segments of FIG. 25 may or may not be visible to a user) at which menu items 155 may be positioned (these locations being depicted as rectangles following the ring shape of the racetrack menu 150, some of which do have one of the menu items 155 positioned therein). Depending on the manner in which the menu items 155 are drawn, these segments may make up the backgrounds of each of the menu items 155 (thus making them part of the menu items 155), and as per what was discussed with regard to FIG. 3d, may be of alterable color, brightness level and/or degree of transparency. Similarly, at least a majority of the surface area occupied by the racetrack surface 250 defined on the touch-sensitive surface 225 of the touch sensor 220 is divided up into multiple control surfaces 255 (depicted as rectangles following the ring shape path of the racetrack surface 250). It should be noted that where the touch sensor 220 incorporates the conductive rings 2270, or a similar mechanism underlying and defining the outer boundary 250x and the inner boundary 250z of the racetrack surface 250, there may be portions of the surface area of the racetrack surface 250 adjacent the outer boundary 250x and adjacent the inner boundary 250z that are devoted to distinguishing user interaction with the racetrack surface 250 from user interaction with other manually-operable controls (as has been described at length), and which are not incorporated into the control surfaces 255. Otherwise, where there are neither of the conductive rings 2270 and no similar mechanism underlying a portion of the racetrack surface 250, the entirety of the surface area of the racetrack surface 250 may be made up of the control surfaces 255.

As shown in this example absolute mapping, the manner in which the menu items 155 are distributed along the lengths of each of the sides 150a-d of the racetrack menu 150 mirrors the manner in which the control surfaces 255 are distributed along the lengths of corresponding ones of the sides 250a-d of the racetrack surface 250. In other words, generally speaking, except for the ones of the menu items 155 and the control surfaces 255 that are positioned at corners where sides meet, both the menu items 155 and the control surfaces 255 along each of the sides 150a-d and 250a-d are evenly distributed in a manner resulting in equal surface areas provided to each of the menu items 155 and provided to each of the control surfaces 255 positioned within each of the sides 150a-d and 250a-d, respectively. Thus, for example, the menu items 155 of the side 150a each occupy segments of equal-sized surface areas that are equally spaced along that side (except for the ones of the menu items 155 at the corners, which are given greater surface areas, as depicted), and correspondingly, the control surfaces 255 of the side 250a each occupy equal-sized surface areas that are equally spaced along that side (again, except for the ones of the control surfaces 255 at the corners, which are given greater surface areas, as depicted). It can also be seen that differing quantities of the menu items 155 and the control surfaces 255 may be positioned along different ones of the sides 150a-d and 250a-d, respectively, such that the surface areas and distribution for the menu items 155 along one of the sides 150a-d may differ from the surface areas and distribution for the menu items 155 along another of the sides 150a-d, and corresponding differences may occur between control surfaces 255 of different ones of the sides 250a-d. Further, it can also be seen that these correspondences between the manner of distribution of the menu items 155 and the manner of distribution of the control surfaces 255 exists despite a difference in the ratio of the lengths of the sides 150a-b and the sides 150c-d of the racetrack menu 150 versus the ratio of the lengths of the sides 250a-b and the sides 250c-d of the racetrack surface 250. In other words, these correspondences exist despite the racetrack surface 250 having more square-like proportions than the racetrack menu 150, as depicted.

Such an absolute mapping as what is depicted in FIG. 25 is in place at times when there is no tip of a digit detected as overlying the racetrack surface 250 (or at least not overlying the racetrack surface 250 to be determined to be a tip of a digit of a user interacting with the racetrack surface 250). This includes occasions where the user interface 1000 has not been operated, at all, for a period of time sufficient for the racetrack menu 150 to no longer be displayed. As has been previously discussed, the control routine 450 executed by the processing device 550 may cause the processing device 550 to cause the racetrack menu 150 to cease to be displayed on the display element 120 after a predetermined period of time has elapsed since the user interface 1000 was last interacted with by a user.

Regardless of whether the racetrack menu 150 is or is not being displayed, an absolute mapping is employed in preparation for determining where the marker 160 (and perhaps still other markers, such as the additional marker 162 of FIG. 3c) should be displayed along the racetrack menu 150 when it is next detected that a tip of a digit has been placed by a user in contact with the touch-sensitive surface 225 such that it overlies a portion of the racetrack surface 250 (at a position 260, which does not exist until that tip is so positioned). As previously discussed, if a user places a tip of a digit against the touch-sensitive surface 225 at a position overlying the racetrack surface 250 such that they are interacting with the racetrack surface 250, the processing device 550 is caused to operate the output interface 510 (referring back to the possible architecture depicted in FIG. 9) to cause the display the racetrack menu 150 on the display element 120, if the racetrack menu 150 is not already being displayed.

Figure 26A:
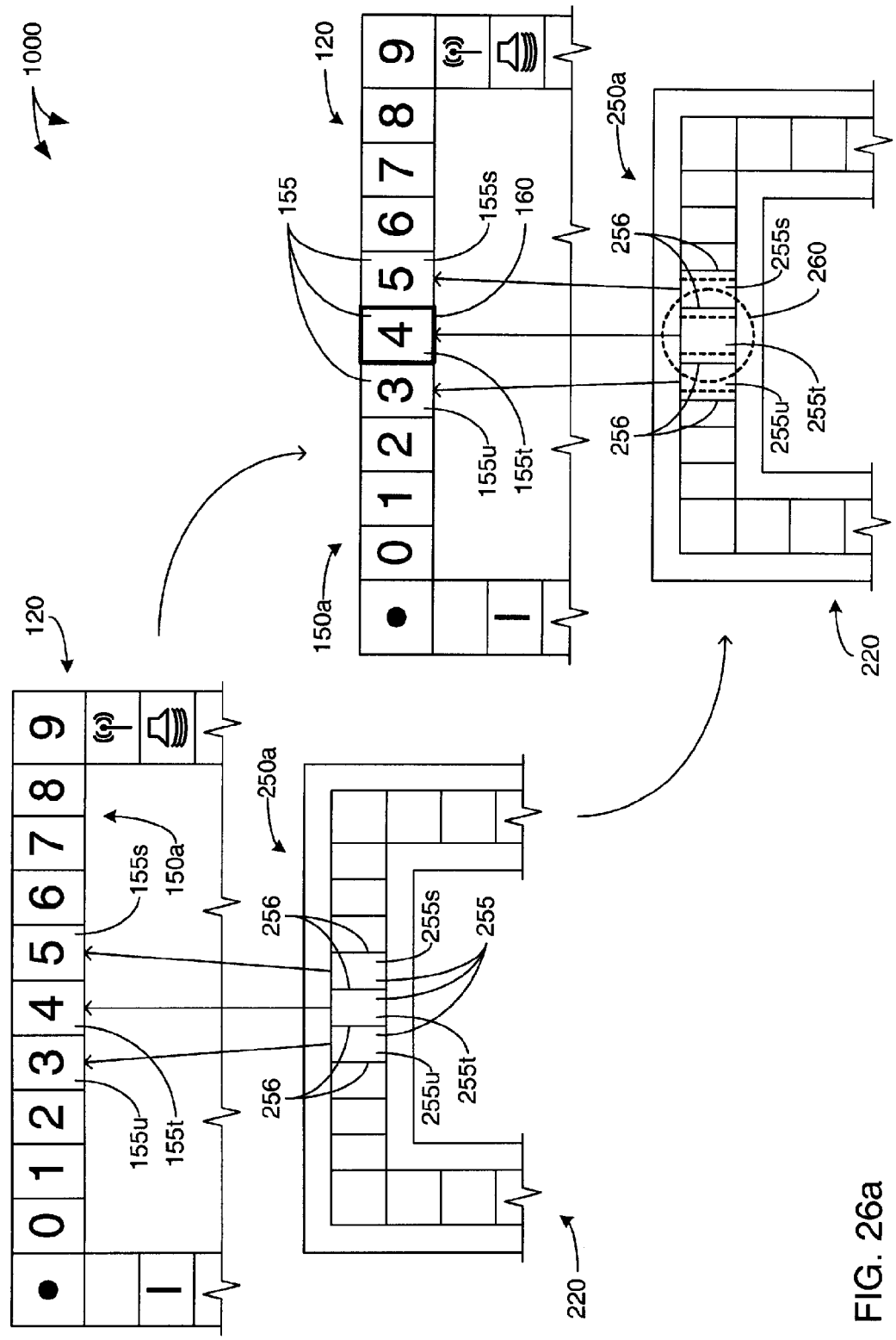
FIGS. 26a and 26b, together, depict aspects of toggling between the absolute mapping of FIG. 25 and variations of a variable mapping.
Figure 26B:
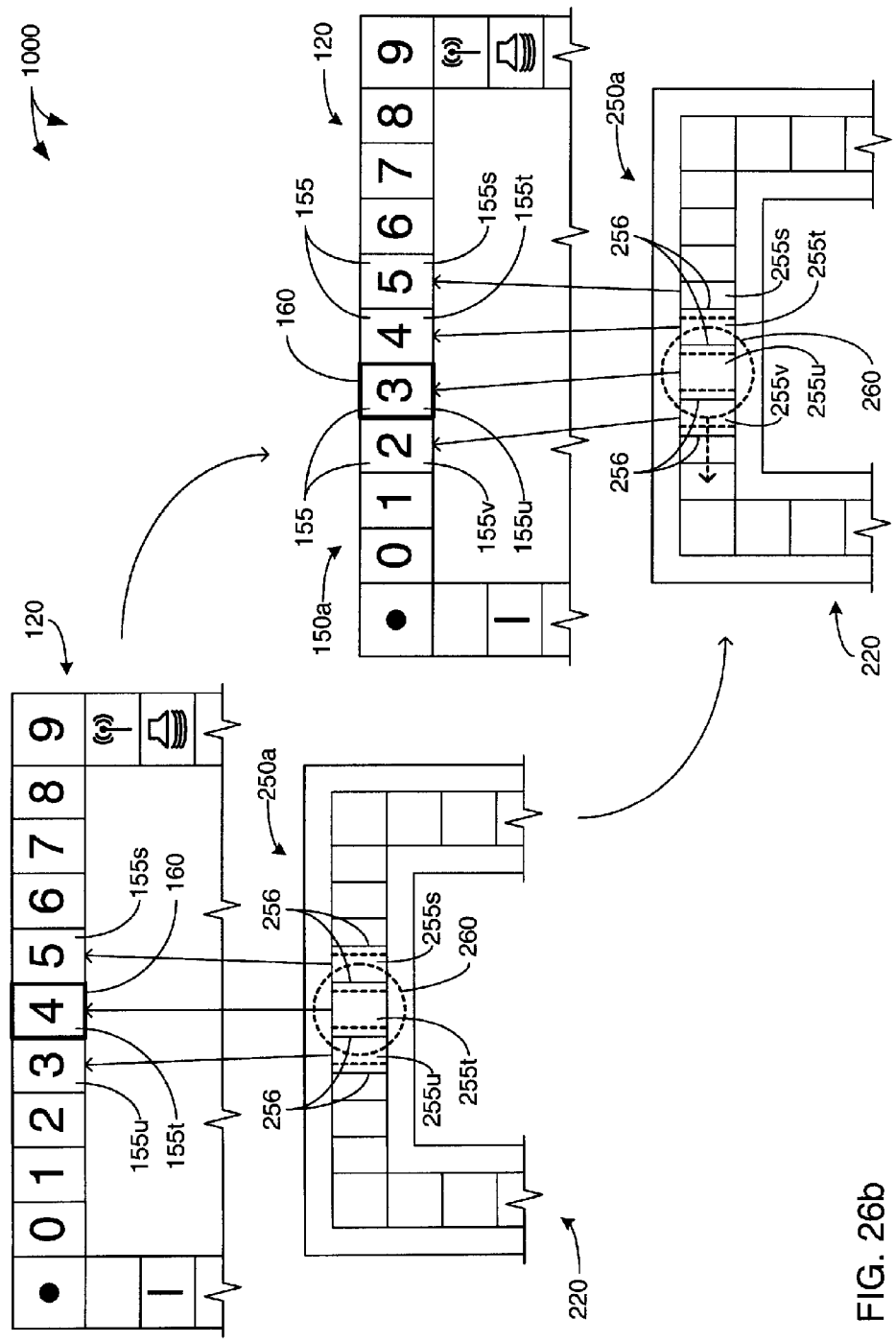

FIGS. 26a and 26b depicted the manner in which the absolute mapping depicted in FIG. 25 is supplanted with an example of variable mapping once the placing of that tip of a user's digit against the touch-sensitive surface 225 in a manner sufficient to interact with the racetrack surface 250 has been detected. More precisely, FIG. 26a depicts a portion of the example of absolute mapping depicted in FIG. 25, but making more clear various details of the absolute mapping of three particular ones of the menu items 155s, 155t and 155u to three particular ones of the control surfaces 255s, 255t and 255u, respectively. The menu items 155s, 155t and 155u are adjacent ones of the menu items 155 having common boundaries between adjacent pairs of them, and correspondingly, the control surfaces 255s, 255t and 255u are adjacent ones of the control surfaces 255 having common boundaries 256 between adjacent pairs of them. Again, as shown in this portion of this example absolute mapping (shown in both FIGS. 25 and 26a), the manner in which the menu items 155 are distributed along the length of the side 150a of the racetrack menu 150 mirrors the manner in which the control surfaces 255 are distributed along the length of the side 250a of the racetrack surface 250. In short, except for the two of the menu items 155 and the two of the control surfaces 255 that are positioned at corners where sides meet, both the menu items 155 and the control surfaces 255 of the sides 150a and 250a, respectively, are evenly distributed in a manner resulting in equal surface areas for the segments of the menu items 155 and the control surfaces 255 along their respective sides. However, FIG. 26a also depicts the change in these distributions for the control surfaces 255 as the change from this absolute mapping to a variable mapping occurs in response to the detection of that placement of that tip of a digit at a position 260 so as to interact with the racetrack surface 250.

More precisely, and as depicted in FIG. 26a, after not interacting with the racetrack surface 250, a user places a tip of a digit at a position 260 that is determined by one or both of the controllers 500 and 2500 to overlie the control surface 255t. In response, the controller 500 causes the display of the marker 160 on the racetrack menu 150 (and causes the racetrack menu 150 to be displayed, if it is not being displayed, already) at the position of the corresponding menu item 155t. Also in response, the controller 500 changes from employing the depicted absolute mapping to employing a variable mapping in which at least the boundaries 256 that the control surface 255t shares with the adjacent control surfaces 255s and 255u are shifted outward from the center of the control surface 255t and partly into the control surfaces 255s and 255u to expand the surface area of the control surface 255t. As also depicted, the boundaries 256 between the control surface 255s and the next adjacent one of the control surfaces 255, and between the control surface 255u and the next adjacent one of the control surfaces 255 (i.e., a control surface 255v) may also be shifted to preserve the quantity of surface area of each of the control surfaces 255s and 255u.

This expanding of the surface area of the control surface 255t is meant to counteract a degree of unsteadiness that some users may have in holding a tip of a digit at the position 260 over the control surface 255t such that the controller 500 may be caused to intermittently determine that the user has moved the position 260 at which they are holding that tip to a new position 260 over one or the other of the control surfaces 255s or 255u, resulting in intermittent movement of the marker 160 from the menu item 155t to one or the other of the menu items 155s or 155u by the controller 500. In other words, expanding the surface area of the control surface 255t increases the distance along the racetrack surface 250 that a user would have to move the position 260 of that tip to cause the position 260 of that tip to overlie either the control surface 255s or the control surface 255u. Thus, movement of the position 260 of that tip off of the control surface 255t to one or the other of the control surfaces 255s or 255u requires a more deliberate act of movement by a user, and is therefore, less likely to happen accidentally (e.g., as a result of a user momentarily not paying attention to how they are moving that tip of that digit, or as a result of a user having somewhat shaky hands).

Moving the other boundaries 256 that separate each of the control surfaces 255s and 255u from the next ones of the control surfaces 255 away from the control surface 255t (including the control surface 255v) to at least somewhat maintain the quantity of surface area occupied by each of the control surfaces 255s and 255u as the surface area of the control surface 255t is expanded may be deemed desirable to more accurately determine when the user has moved that tip to overlie one or the other of the control surfaces 255s or 255u without moving further to either of the next ones of the control surfaces 255. In other words, at least somewhat maintaining the surfaces areas of the control surfaces 255s and 255u avoids having the surface areas of either one of these two control surfaces being reduced to the extent that only a relatively small amount of movement of the position 260 of that tip towards either of the control surfaces 255s or 255u could all too easily result in the position 260 of that tip being interpreted as having passed over one or the other of these two control surfaces and onward towards one of the next ones of the control surfaces 255 following the control surfaces 255s and 255u. As depicted, the boundaries 256 that separate each of the control surfaces 255s and 255u from the next ones of the control surfaces 255 away from the control surface 255t are moved relatively the same distances along the side 250a of the racetrack surface 250 as the boundaries 256 that separate the control surface 255t from each of the control surfaces 255s and 255u. However, in alternate variants, the boundaries 256 that separate each of the control surfaces 255s and 255u from the next ones of the control surfaces 255 may be moved to a lesser degree than the boundaries 256 that separate the control surface 255t from each of the control surfaces 255s and 255u, perhaps to more evenly balance the amount surface area lost by each of the control surfaces 255s and 255u with the amount of surface area lost by each of the next ones of the control surfaces 255 away from the control surface 255t as the surface area of the control surface 255t is expanded.

FIG. 26b depicts the manner in which the variable mapping introduced with FIG. 26a is made to vary as the user who has placed a tip of a digit to overlie the control surface 255t subsequently moves the position 260 of that tip to overlie the control surface 255u. More precisely, after having placed that tip against the touch-sensitive surface 225 of the touch sensor 220 at a position 260 overlying the racetrack surface 250 at the location of the control surface 255t, as depicted in FIG. 26a and repeated in FIG. 26b, the user moves the position 260 of that tip beyond the boundary 256 between the control surfaces 255t and 255u that was shifted outward from the center of the control surface 255t so as to cause the position 260 of that tip to overlie the control surface 255u. In response, the controller 500 causes the marker 160 that was displayed at the location of the menu item 155t to be displayed at the location of the menu item 155u. Also in response, the controller 500 alters the variable mapping in which the control surface 255t was provided with an expanded surface area to cause the control surface 255u to have an expanded surface area. As a result, the boundary that the control surfaces 255t and 255u share is shifted towards the center of the control surface 255t to effect the reduction in surface area of the control surface 255t and the increase in surface area of the control surface 255u. Also, the boundary 256 shared by the control surface 255s and the next one of the control surfaces 255 away from the control surface 255t is returned to the position it occupies when the earlier-depicted absolute mapping is applied. Further, the boundary 256 between the control surface 255u and the next one of the control surfaces 255 away from the control surface 255*t* (i.e., the control surface 255*v*) is moved outward away from the now-expanded control surface 255*u*. In other words, the configuration of relative sizes of surface areas that was centered on the control surface 255*t* is now shifted to be centered on the control surface 255*u* such that the control surface 255*u* now has an expanded surface area and the immediately adjacent control surfaces 255*t* and 255*v* at least somewhat maintain their surface areas (in comparison to what their surface areas are at times when the earlier absolute mapping is employed) with their surface areas being somewhat shifted away from the center of the control surface 255*u*.

Although not specifically depicted in either of FIG. 26*a* or 26*b*, the additional marker 162 introduced and discussed with respect to FIG. 3*c* may also be caused to be displayed by the processing device 550 to provide a user with a more precise indication of the position 260 of that tip along the racetrack surface 250. It should be noted, however, that the indication of the position 260 provided by the additional marker 262 will be relative to the outwardly shifted boundaries 256 of whatever one of the control surfaces 255 is currently expanded, and not relative to where those same ones of the boundaries 256 would otherwise be at a time when an absolute mapping is employed.

FIG. 27 depicts a similar scenario of a sequence of events and accompanying changing in mappings as was depicted across FIGS. 26*a-b*, but involving ones of the control surfaces 255 that are located towards a corner of the racetrack surface, specifically the corner at which the sides 250*a* and 250*c* meet. For the sake of easier understanding, the same designations of 255*s*, 255*t*, 255*u* and 255*v* are reused to denote different ones of the control surfaces 255 that were referred to by these designations in FIGS. 26*a-b*, and the sequence of events is again one in which a user initially positions a tip of a digit to overlie a control surface designated as 255*t* and then moves that tip to a control surface designated as 255*u*. Thus, turning to FIG. 27, after a period of having been determined to not be interacting with the racetrack surface 250 such that the absolute mapping akin to the one introduced in FIG. 25 is employed, a user places a tip of a digit over a control surface 255*t* that is the one of the control surfaces 255 that is located at the corner of the racetrack 250 where the sides 250*a* and 250*c* meet. In response, the processing device 550 shifts the boundaries 256 between the control surfaces 255*t* and each of the control surfaces 255*s* and 255*u* outward from the center of the surface area of the control surface 255*t* and into the surface areas of the control surfaces 255*s* and 255*u*. Further, the processing device 550 may shift the boundaries 256 separating each of the control surfaces 255*s* and 255*u* from the next ones of the control surfaces 255 away from the control surface 255*t* (including the control surface 255*v*) into each of those next ones of the control surfaces 255 to at least somewhat maintain the surface areas of the control surfaces 255*s* and 255*u*.

However, the user next moves the position 260 of that tip from overlying the control surface 255*t* to overlying the control surface 255*u*. In response, the processing device 550 is caused to shift the boundary 256 between the control surfaces 255*t* and 255*u* to expand the surface area of the control surface 255*u* and correspondingly decrease the surface area of the control surface 255*t*. Also in response, the processing device 550 is caused to shift the boundary 256 separating control surface 255*s* from the next one of the control surfaces 255 away from the control surface 255*t* back to the location it occupied at the earlier time when an absolute mapping was employed. Further in response, the processing device 550 is caused to shift the boundary separating the control surface 255*v* from the next one of the control surfaces 255 away from the control surface 255*u* outward from the center of the control surface 255*u* to at least somewhat maintain the surface area of the control surface 255*v* (in comparison to the surface area the control surface 255*v* had at the earlier time when an absolute mapping was employed).

Figure 28:
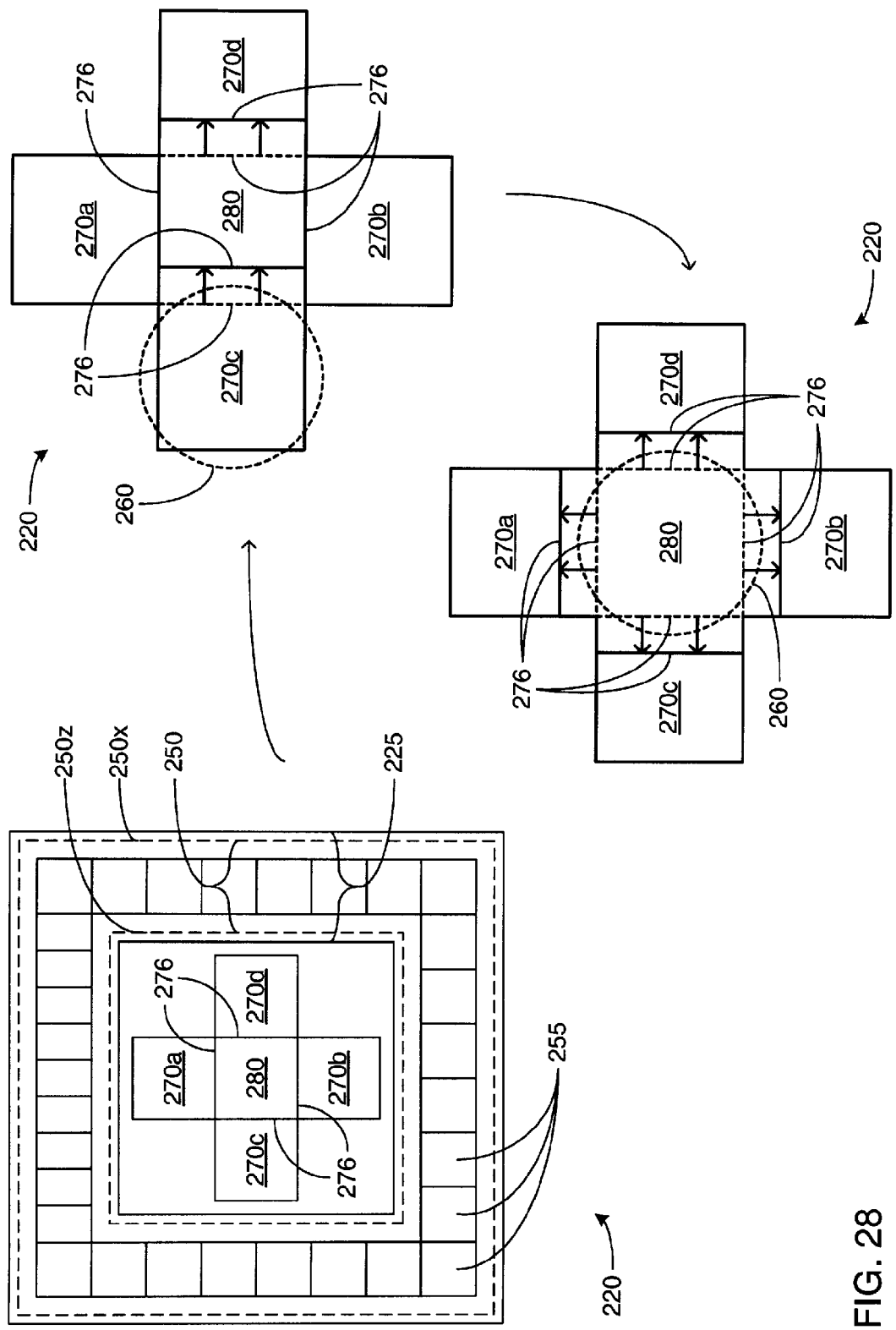
FIG. 28 depicts aspects of an absolute mapping of control surfaces of a form of the variant of the touch sensor of FIG. 10b.

FIG. 28 depicts a similar scenario of a sequence of events and accompanying changing of mappings as was depicted across FIGS. 26*a-b* and 27, but involving control surfaces located within a portion of the touch-sensitive surface 225 surrounded by the racetrack surface 250 in a variant of the touch sensor 220 that is akin to what is depicted in FIG. 10*b* in which the touch-sensitive surface 225 is continuous. In other words, the depiction of such a similar scenario of a sequence of events in FIG. 28 entails control surfaces defined on the touch-sensitive surface 225 of the touch sensor 220 for purposes of providing the equivalent function of earlier-discussed manually-operable controls used to navigate and make selections for an on-screen menu, such as the on-screen menu 170 introduced in FIG. 7*a* (e.g., manually-operable controls such as distinct navigation and selection buttons, a 4-way momentary rocker switch with a momentary center button function, etc.). Thus, turning to FIG. 28, after a period of having been determined to not be interacting with any of the control surfaces 270*a-d* or 280 (that serve as equivalents to separate manually-operable controls having the same designations and introduced in FIG. 7*b*) such that an absolute mapping in which all the control surfaces 270*a-d* and 280 have substantially similar surface areas is employed, a user places a tip of a digit over the control surface 270*c*. In response, the processing device 550 shifts a boundary 276 between the control surfaces 270*c* and 280 outward from the center of the surface area of the control surface 270*c* and into the surface area of the control surface 280. Further, the processing device 550 may shift the boundary 276 separating the control surface 280 from the control surface 270*d* to at least somewhat maintain the surface area of the control surface 280.

However, the user next moves the position 260 of that tip from overlying the control surface 270*c* to overlying the control surface 280. In response, the processing device 550 is caused to shift the boundary 276 between the control surfaces 270*c* and 280 to expand the surface area of the control surface 80 and correspondingly decrease the surface area of the control surface 270*c*. Also in response, the processing device 550 may be caused to also shift the boundaries 276 separating the control surface 280 from each of the control surfaces 270*a* and 270*b* away from the center of the control surface 280. This may be done since the control surface 280 is bordered on four sides by other control surfaces (i.e., the control surfaces 270*a-d*), and therefore, unsteadiness on the part of the user in maintaining the position 260 of that tip so as to overlie the control surface 280 could result in inadvertent movement of that tip towards any one of the four adjacent control surfaces 270*a-d*.

Other implementations are within the scope of the following claims and other claims to which the applicant may be entitled.

The invention claimed is:

1. An apparatus comprising:
   a touch sensor providing a touch-sensitive surface enabling the position of a tip of a digit of a user to be recurringly determined as the user moves the tip across the touch-sensitive surface while keeping the tip in contact with the touch-sensitive surface, and able to detect an increase in pressure exerted against the touch-sensitive surface through the tip to make a selection;

a processing device; and a storage accessible to the processing device and storing a sequence of instructions that when executed by the processing device, causes the processing device to:
- take a set of measurements from the touch sensor indicative of the position of the tip on a recurring basis;
- maintain a predetermined quantity of the most recently taken sets of measurements indicative of the position of the tip in the storage; and
- in response to receiving an indication of an increase in pressure exerted against the touch-sensitive surface through the tip being detected:
  - access one of the sets of measurements indicative of the position of the tip taken at a predetermined amount of time into the past; and
  - employ the one of the sets of measurements to determine a position of the tip at a time prior to the increase in pressure being exerted against the touch-sensitive surface.

2. The apparatus of claim 1, wherein:
the touch sensor employs capacitive sensing technology comprising a plurality of conductive pads underneath the touch-sensitive surface and formed on a substrate to enable the position of a tip of a digit of a user to be recurringly determined;
the substrate is disposed on a casing of a device in a manner that is inwardly movable to permit the touch-sensitive surface to be pressed inward into the casing in response to the increase in pressure exerted by the user through the tip; and
the touch sensor comprises a switch to detect inward movement of the substrate as the indication of the increase in pressure exerted against the touch-sensitive surface through the tip.

3. The apparatus of claim 1, wherein in further response to receiving an indication of an increase in pressure exerted against the touch-sensitive surface through the tip being detected, the processing device is further caused to employ what is determined to be the position of the tip at the time prior to the increase in pressure being exerted against the touch-sensitive surface to determine what menu item of a plurality of menu items was intended to be selected by the user through the exerting of the increase in pressure against the touch-sensitive surface.

4. The apparatus of claim 3, wherein the processing device is caused to display the plurality of menu items on a display element.

5. A method comprising:
recurringly taking a set of measurements from a touch sensor indicative of the position of a tip of a digit of a user on a touch-sensitive surface of the touch sensor as the user moves the tip across the touch-sensitive surface while keeping the tip in contact with the touch-sensitive surface;
maintaining a predetermined quantity of the most recently taken sets of measurements indicative of the position of the tip; and
in response to receiving an indication of an increase in pressure exerted against the touch-sensitive surface through the tip being detected, employing one of the sets of measurements to determine a position of the tip at a time prior to the increase in pressure being exerted against the touch-sensitive surface.

6. The method of claim 5, further comprising:
displaying a menu on a display element in which the menu comprises a plurality of menu items selectable by the user through operation of the touch sensor via the tip; and
further response to receiving an indication of an increase in pressure exerted against the touch-sensitive surface through the tip being detected, employing what is determined to be the position of the tip at the time prior to the increase in pressure being exerted against the touch-sensitive surface to determine what menu item of a plurality of menu items was intended to be selected by the user through the exerting of the increase in pressure against the touch-sensitive surface.

* * * * *